(12) United States Patent
Khoshnevisan et al.

(10) Patent No.: US 12,520,316 B2
(45) Date of Patent: Jan. 6, 2026

(54) CONTROL CHANNEL MONITORING OCCASIONS FOR DIFFERENT NUMEROLOGIES AND SUB-SLOT-BASED CONTROL CHANNELS

(71) Applicant: QUALCOMM Incorporated, San Diego, CA (US)

(72) Inventors: Mostafa Khoshnevisan, San Diego, CA (US); Wei Yang, San Diego, CA (US); Yi Huang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 348 days.

(21) Appl. No.: 18/309,483

(22) Filed: Apr. 28, 2023

(65) Prior Publication Data

US 2024/0365319 A1   Oct. 31, 2024

(51) Int. Cl.
*H04W 72/1273* (2023.01)
*H04L 27/26* (2006.01)
*H04W 72/23* (2023.01)

(52) U.S. Cl.
CPC ... *H04W 72/1273* (2013.01); *H04L 27/26025* (2021.01); *H04W 72/23* (2023.01)

(58) Field of Classification Search
CPC .............. H04W 72/1273; H04W 72/23; H04L 27/26025
See application file for complete search history.

(56) References Cited

U.S. PATENT DOCUMENTS

2019/0342035 A1\* 11/2019 Zhang ................... H04L 5/0055
2024/0072975 A1\* 2/2024 Rastegardoost ...... H04W 72/20

\* cited by examiner

*Primary Examiner* — Noel R Beharry
(74) *Attorney, Agent, or Firm* — Holland & Hart LLP

(57) ABSTRACT

Methods, systems, and devices for wireless communications are described. The method may include a user equipment (UE) receiving, in a first time slot, a downlink control information (DCI) message indicating second time slot or first time subslot for transmitting feedback according to a codebook size. The feedback may be transmitted in a physical uplink control channel (PUCCH) associated with a physical downlink shared channel (PDSCH) scheduled by a physical downlink control channel (PDCCH). Corresponding subcarrier spacings (SCSs) for at least two of the PUCCH, the PDSCH, and the PDCCH may be different. The PUCCH may be scheduled as time subslots whereas both the PDSCH and the PDCCH may be scheduled as time slots. Further, the UE may monitor a set of one or more PDCCH monitoring occasions (PMOs) based on a mapping in accordance with a corresponding SCS, the PUCCH being scheduled as time subslots, or both, for feedback transmission.

29 Claims, 26 Drawing Sheets

Control Signaling 215

DCI Signaling 220

PDCCH Signaling 225

PDSCH Signaling 230

PUCCH Signaling 235

200

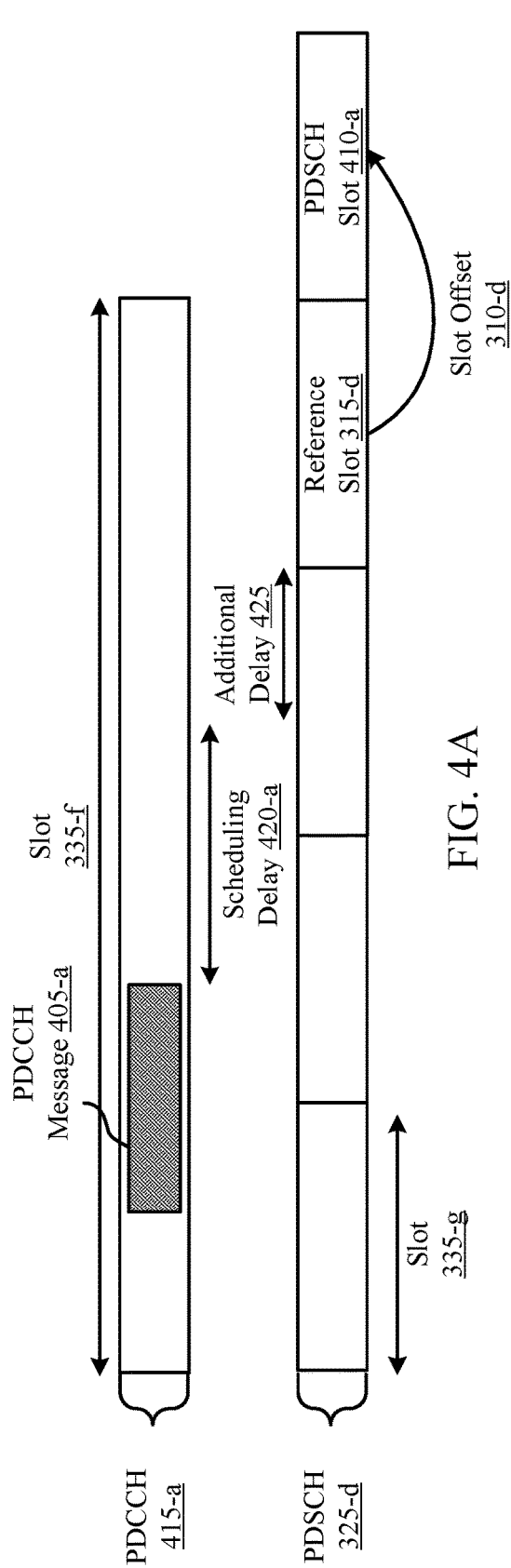
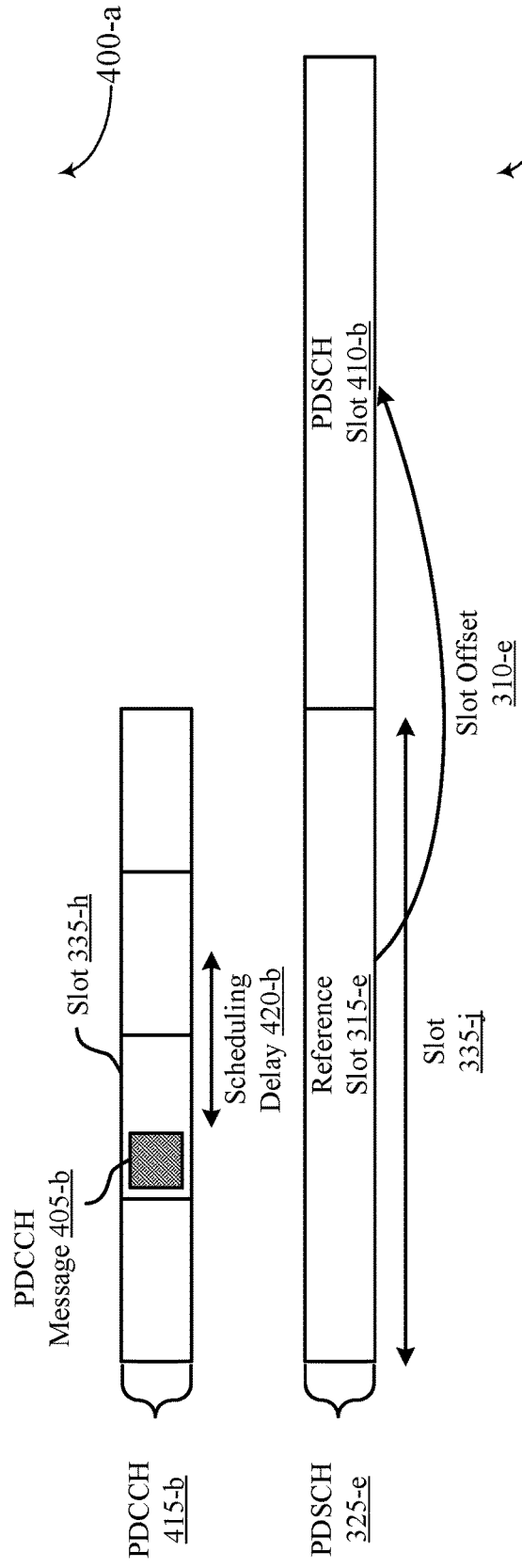
FIG. 4A
FIG. 4B

Considered PMOs 810-a

Not Considered PMOs 815-a

CONTROL CHANNEL MONITORING OCCASIONS FOR DIFFERENT NUMEROLOGIES AND SUB-SLOT-BASED CONTROL CHANNELS

FIELD OF TECHNOLOGY

The following relates to wireless communications, including control channel monitoring occasions for different numerologies and sub-slot-based control channels.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UE). In some examples, a wireless communications system may support one or more wireless devices configured with feedback codebooks.

SUMMARY

The described techniques relate to improved methods, systems, devices, and apparatuses that support control channel monitoring occasions for different numerologies and sub-slot-based control channels. For example, the described techniques provide for a UE to receive, in a first time slot, a downlink control information (DCI) message indicating a second time slot or a first time subslot for the UE to transmit feedback according to a codebook size. In some cases, the feedback may be transmitted in a physical uplink control channel (PUCCH) associated with a physical downlink shared channel (PDSCH) scheduled by a physical downlink control channel (PDCCH). In some cases, corresponding subcarrier spacings (SCSs) for at least two of the PUCCH, the PDSCH, and the PDCCH are different. Additionally, or alternatively, the PUCCH may be scheduled as time subslots and both the PDSCH and the PDCCH are scheduled as time slots.

In some cases, the UE may monitor a set of one or more PDCCH monitoring occasions (PMOs) within at least a subset of a first plurality of time slots that occur before the second time slot or the first time subslot based at least in part on a mapping between the PUCCH, the PDSCH, and the PDCCH in accordance with a corresponding SCS, the PUCCH being scheduled as time subslots, or both.

In some cases, the UE may transmit the feedback according to the codebook size in the second time slot or the first time subslot in response to the DCI message, wherein the codebook size of the feedback is based at least in part on a quantity of the set of one or more PMOs that occur within at least the subset of the first plurality of time slots.

A method for wireless communications at a UE is described. The method may include receiving, in a first time slot, a DCI message indicating a second time slot for the UE to transmit feedback according to a codebook size, where the feedback is to be transmitted in a physical uplink control channel associated with a PDSCH scheduled by a PDCCH, and where corresponding SCSs for at least two of the PUCCH, the PDSCH, and the PDCCH are different, monitoring a set of one or more PMOs within at least a subset of a first set of multiple time slots that occur before the second time slot based on a mapping between the PUCCH, the PDSCH, and the PDCCH in accordance with a corresponding subcarrier spacing, and transmitting the feedback according to the codebook size in the second time slot in response to the DCI message, where the codebook size of the feedback is based on a quantity of the set of one or more PMOs that occur within at least the subset of the first set of multiple time slots.

An apparatus for wireless communications at a UE is described. The apparatus may include a processor, memory coupled with the processor, and instructions stored in the memory. The instructions may be executable by the processor to cause the apparatus to receive, in a first time slot, a DCI message indicating a second time slot for the UE to transmit feedback according to a codebook size, where the feedback is to be transmitted in a PUCCH associated with a PDSCH scheduled by a PDCCH, and where corresponding SCSs for at least two of the PUCCH, the PDSCH, and the PDCCH are different, monitor a set of one or more PMOs within at least a subset of a first set of multiple time slots that occur before the second time slot based on a mapping between the PUCCH, the PDSCH, and the PDCCH in accordance with a corresponding subcarrier spacing, and transmit the feedback according to the codebook size in the second time slot in response to the DCI message, where the codebook size of the feedback is based on a quantity of the set of one or more PMOs that occur within at least the subset of the first set of multiple time slots.

Another apparatus for wireless communications at a UE is described. The apparatus may include means for receiving, in a first time slot, a DCI message indicating a second time slot for the UE to transmit feedback according to a codebook size, where the feedback is to be transmitted in a PUCCH associated with a PDSCH scheduled by a PDCCH, and where corresponding SCSs for at least two of the PUCCH, the PDSCH, and the PDCCH are different, means for monitoring a set of one or more PMOs within at least a subset of a first set of multiple time slots that occur before the second time slot based on a mapping between the PUCCH, the PDSCH, and the PDCCH in accordance with a corresponding subcarrier spacing, and means for transmitting the feedback according to the codebook size in the second time slot in response to the DCI message, where the codebook size of the feedback is based on a quantity of the set of one or more PMOs that occur within at least the subset of the first set of multiple time slots.

A non-transitory computer-readable medium storing code for wireless communications at a UE is described. The code may include instructions executable by a processor to receive, in a first time slot, a DCI message indicating a second time slot for the UE to transmit feedback according to a codebook size, where the feedback is to be transmitted in a PUCCH associated with a PDSCH scheduled by a PDCCH, and where corresponding SCSs for at least two of the PUCCH, the PDSCH, and the PDCCH are different, monitor a set of one or more PMOs within at least a subset of a first set of multiple time slots that occur before the second time slot based on a mapping between the PUCCH, the PDSCH, and the PDCCH in accordance with a corresponding subcarrier spacing, and transmit the feedback according to the codebook size in the second time slot in response to the DCI message, where the codebook size of the feedback is based on a quantity of the set of one or more PMOs that occur within at least the subset of the first set of multiple time slots.

Some examples of the method, apparatuses, and non-transitory computer-readable medium described herein may further include operations, features, means, or instructions for determining a second set of multiple time slots associated with the PUCCH based on a first set of slot offset values, where the second set of multiple time slots occur before the second time slot, determining a third set of multiple time slots associated with the PDSCH based on the mapping between the PUCCH and the PDSCH in accordance with the corresponding subcarrier spacing, and selecting a subset of the third set of multiple time slots based on the subset of the third set of multiple time slots overlapping with one or more of the second set of multiple time slots.

In some examples of the method, apparatuses, and non-transitory computer-readable medium described herein, monitoring the set of one or more PMOs may include operations, features, means, or instructions for determining the first set of multiple time slots associated with the PDCCH based on a second set of slot offset values associated with the PDSCH and selecting at least the subset of the first set of multiple time slots based on at least the subset of the first set of multiple time slots overlapping with one or more of the subset of the third set of multiple time slots.

Some examples of the method, apparatuses, and non-transitory computer-readable medium described herein may further include operations, features, means, or instructions for selecting at least a subset of the set of one or more PMOs based on a last symbol of at least the subset of set of one or more PMOs and a first symbol of the third set of multiple time slots associated with the PDSCH being separated by a threshold quantity of symbols.

In some examples of the method, apparatuses, and non-transitory computer-readable medium described herein, a subcarrier spacing associated with the PDCCH may be less than a subcarrier spacing associated with the PDSCH.

Some examples of the method, apparatuses, and non-transitory computer-readable medium described herein may further include operations, features, means, or instructions for selecting at least a subset of the set of one or more PMOs based on a last symbol of at least the subset of the set of one or more PMOs and a second to last symbol of the third set of multiple time slots associated with the PDSCH being separated by a threshold quantity of symbols.

In some examples of the method, apparatuses, and non-transitory computer-readable medium described herein, a subcarrier spacing associated with the PDCCH may be greater than a subcarrier spacing associated with the PDSCH.

Some examples of the method, apparatuses, and non-transitory computer-readable medium described herein may further include operations, features, means, or instructions for determining a second set of multiple time slots associated with the PUCCH based on a set of slot offset values, where the second set of multiple time slots occur before the second time slot and selecting at least the subset of the first set of multiple time slots based on the subset of the first set of multiple time slots overlapping with one or more of the second set of multiple time slots in accordance with the corresponding subcarrier spacing.

Some examples of the method, apparatuses, and non-transitory computer-readable medium described herein may further include operations, features, means, or instructions for receiving an indication of a set of multiple slot offset values, where the first set of one or more PMOs within at least the subset of the set of multiple time slots that occur before the second time slot may be based on the set of multiple slot offset values.

Some examples of the method, apparatuses, and non-transitory computer-readable medium described herein may further include operations, features, means, or instructions for monitoring, via a first component carrier, the set of one or more PMOs within at least the subset of the first set of multiple time slots and monitoring the PDSCH via a second component carrier and transmitting the PUCCH via a third component carrier.

In some examples of the method, apparatuses, and non-transitory computer-readable medium described herein, at least two of the first component carrier, the second component carrier, and the third component carrier may be associated with different SCSs.

In some examples of the method, apparatuses, and non-transitory computer-readable medium described herein, each entry of the feedback corresponds to a respective PMO of the first set of one or more PMOs.

A method for wireless communications at a UE is described. The method may include receiving, in a first time slot, a DCI message indicating a first time subslot for the UE to transmit feedback according to a codebook size, where the feedback is to be transmitted in a PUCCH associated with a PDSCH scheduled by a PDCCH, and where the PUCCH is scheduled as time subslots, monitoring a set of one or more PMOs within at least a subset of a first set of multiple time slots that occur before the first time subslot based on a mapping between the PUCCH, the PDSCH, and the PDCCH in accordance with the PUCCH being scheduled as time subslots, and transmitting the feedback according to the codebook size in the first time subslot in response to the DCI message, where the codebook size of the feedback is based on a quantity of the set of one or more PMOs that occur within at least the subset of the first set of multiple time slots.

An apparatus for wireless communications at a UE is described. The apparatus may include a processor, memory coupled with the processor, and instructions stored in the memory. The instructions may be executable by the processor to cause the apparatus to receive, in a first time slot, a DCI message indicating a first time subslot for the UE to transmit feedback according to a codebook size, where the feedback is to be transmitted in a PUCCH associated with a PDSCH scheduled by a PDCCH, and where the PUCCH is scheduled as time subslots, monitor a set of one or more PMOs within at least a subset of a first set of multiple time slots that occur before the first time subslot based on a mapping between the PUCCH, the PDSCH, and the PDCCH in accordance with the PUCCH being scheduled as time subslots, and transmit the feedback according to the codebook size in the first time subslot in response to the DCI message, where the codebook size of the feedback is based on a quantity of the set of one or more PMOs that occur within at least the subset of the first set of multiple time slots.

Another apparatus for wireless communications at a UE is described. The apparatus may include means for receiving, in a first time slot, a DCI message indicating a first time subslot for the UE to transmit feedback according to a codebook size, where the feedback is to be transmitted in a PUCCH associated with a PDSCH scheduled by a PDCCH, and where the PUCCH is scheduled as time subslots, means for monitoring a set of one or more PMOs within at least a subset of a first set of multiple time slots that occur before the first time subslot based on a mapping between the PUCCH, the PDSCH, and the PDCCH in accordance with the PUCCH being scheduled as time subslots, and means for transmitting the feedback according to the codebook size in the first time subslot in response to the DCI message, where the codebook size of the feedback is based on a quantity of the set of one or more PMOs that occur within at least the subset of the first set of multiple time slots.

A non-transitory computer-readable medium storing code for wireless communications at a UE is described. The code may include instructions executable by a processor to receive, in a first time slot, a DCI message indicating a first time subslot for the UE to transmit feedback according to a codebook size, where the feedback is to be transmitted in a PUCCH associated with a PDSCH scheduled by a PDCCH, and where the PUCCH is scheduled as time subslots, monitor a set of one or more PMOs within at least a subset of a first set of multiple time slots that occur before the first time subslot based on a mapping between the PUCCH, the PDSCH, and the PDCCH in accordance with the PUCCH being scheduled as time subslots, and transmit the feedback according to the codebook size in the first time subslot in response to the DCI message, where the codebook size of the feedback is based on a quantity of the set of one or more PMOs that occur within at least the subset of the first set of multiple time slots.

Some examples of the method, apparatuses, and non-transitory computer-readable medium described herein may further include operations, features, means, or instructions for determining a first set of multiple time subslots associated with the PUCCH based on a set of subslot offset values, where the first set of multiple time subslots occur before the first time subslot, determining a second set of multiple time slots associated with the PDSCH based on the mapping between the PUCCH and the PDSCH in accordance with the PUCCH being scheduled as time subslots, and selecting a subset of the second set of multiple time slots based on the subset of the second set of multiple time slots overlapping with one or more of the first set of multiple time subslots.

In some examples of the method, apparatuses, and non-transitory computer-readable medium described herein, monitoring the set of one or more PMOs may include operations, features, means, or instructions for determining a first set of multiple time slots associated with the PDCCH based on a set of slot offset values and selecting at least the subset of the first set of multiple time slots based on at least the subset of the first set of multiple time slots overlapping with one or more of the subset of the second set of multiple time slots.

Some examples of the method, apparatuses, and non-transitory computer-readable medium described herein may further include operations, features, means, or instructions for receiving, via a control message, an indication of the set of slot offset values and selecting a subset of the set of slot offset values to determine the first set of multiple time subslots.

Some examples of the method, apparatuses, and non-transitory computer-readable medium described herein may further include operations, features, means, or instructions for selecting at least the subset of the first set of multiple time slots based on a last symbol of at least the set of one or more PDCCH monitoring occasions and a last symbol of a first time subslot associated with the physical uplink channel being separated by a threshold processing time.

Some examples of the method, apparatuses, and non-transitory computer-readable medium described herein may further include operations, features, means, or instructions for selecting at least the subset of the first set of multiple time slots based on a last symbol of at least the subset of the second set of multiple time slots and a last symbol of the first set of multiple time subslots associated with the physical uplink channel being separated by a threshold processing time.

Some examples of the method, apparatuses, and non-transitory computer-readable medium described herein may further include operations, features, means, or instructions for selecting at least the subset of the first set of multiple time slots based on a last symbol of at least one candidate start and length indicator of a slot of the second set of multiple time slots overlaps with a corresponding subslot of the first set of multiple time subslots associated with the physical uplink channel.

Some examples of the method, apparatuses, and non-transitory computer-readable medium described herein may further include operations, features, means, or instructions for determining a first set of multiple time subslots associated with the PUCCH based on a set of subslot offset values, where the first set of multiple time slots occur before the first time subslot and selecting at least the subset of the first set of multiple time slots based on at least the subset of the first set of multiple time slots overlapping with one or more of the subset of the first set of multiple time subslots.

In some examples of the method, apparatuses, and non-transitory computer-readable medium described herein, the selecting may be based on a last symbol of a PMO of the one or more PMOs overlapping with a corresponding time subslot of the first set of multiple time subslots.

Some examples of the method, apparatuses, and non-transitory computer-readable medium described herein may further include operations, features, means, or instructions for receiving an indication of a set of multiple slot offset values, where the first set of one or more PMOs within at least the subset of the first set of multiple time slots that occur before the time subslot may be based on the set of multiple slot offset values.

Some examples of the method, apparatuses, and non-transitory computer-readable medium described herein may further include operations, features, means, or instructions for monitoring, via a first component carrier, the set of one or more PMOs within at least the subset of the first set of multiple time slots and monitoring the PDSCH via a second component carrier and transmitting the PUCCH via a third component carrier.

In some examples of the method, apparatuses, and non-transitory computer-readable medium described herein, the first component carrier and the second component carrier may be same or different.

In some examples of the method, apparatuses, and non-transitory computer-readable medium described herein, each entry of the feedback corresponds to a respective PMO of the first set of one or more PMOs.

In some examples of the method, apparatuses, and non-transitory computer-readable medium described herein, both the PDSCH and the PDCCH may be scheduled as time slots.

BRIEF DESCRIPTION OF THE DRAWINGS

FIGS. 4A and 4B show examples of slot diagrams that support control channel monitoring occasions for different numerologies and sub-slot-based control channels in accordance with one or more aspects of the present disclosure.

DETAILED DESCRIPTION

Figure 1:
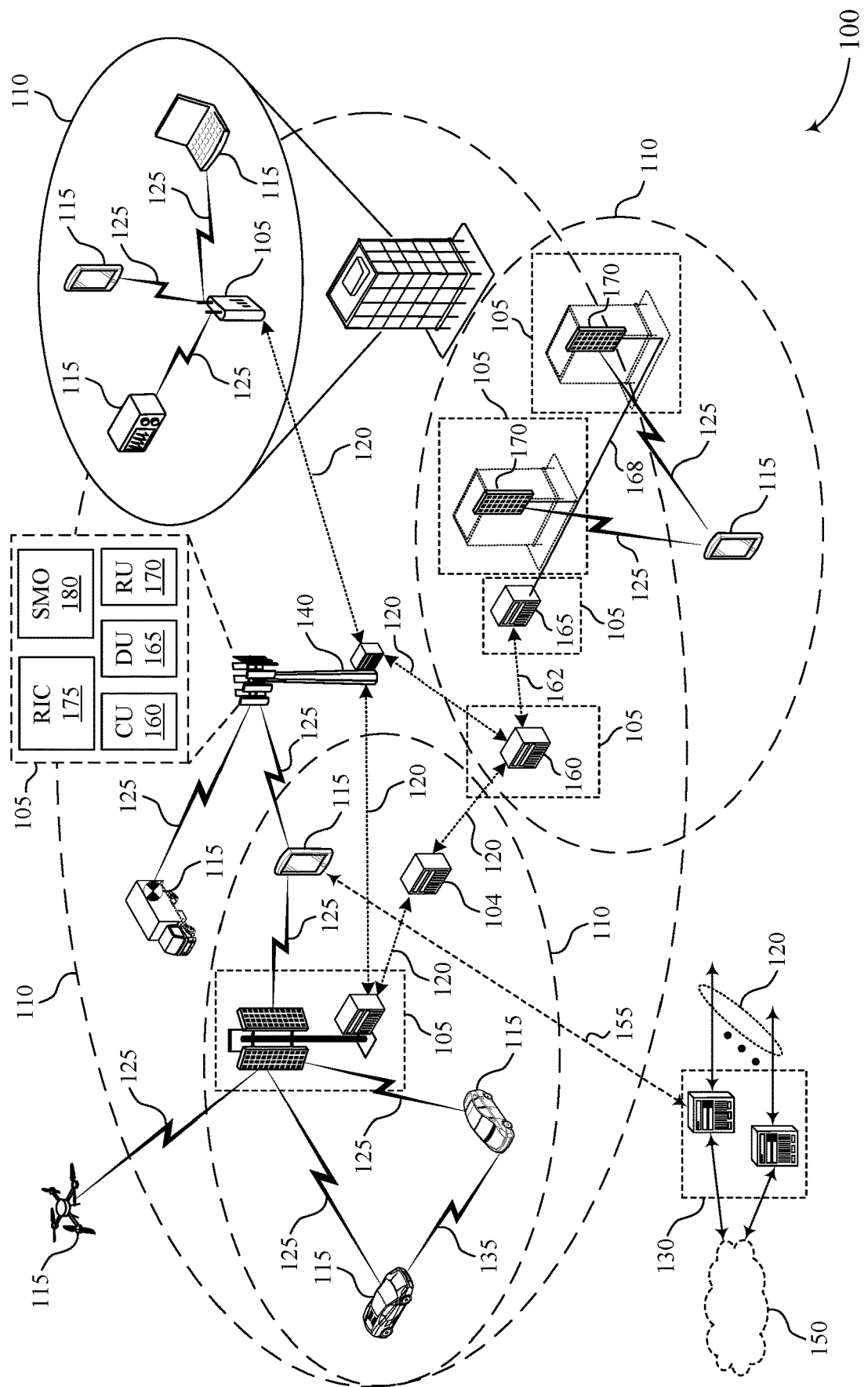
FIG. 1 shows an example of a wireless communications system that supports control channel monitoring occasions for different numerologies and sub-slot-based control channels in accordance with one or more aspects of the present disclosure.

In some wireless communications systems, a user equipment (UE) may transmit feedback for one or more received messages. For example, a UE may receive control signaling (e.g., downlink control information (DCI)) for scheduling data transmissions (e.g., via physical downlink shared channel (PDSCH)), and may transmit a feedback message (e.g., hybrid automatic repeat request (HARQ) acknowledgement (ACK) or negative acknowledgement (NACK)) to indicate successful decoding of the control signaling, data transmissions, or both. In some cases, feedback messages may be transmitted using different codebook types. For example, a UE may transmit a feedback message in a slot using a Type 1 codebook, a Type 2 codebook, or a physical data shared channel monitoring occasion (PMO) based codebook type. Additionally, or alternatively, a UE may switch between these codebook types using slot-based codebook type switching.

In some wireless communications systems, PMO-based codebooks may be implemented to address different numerologies across carriers, subslot-based uplink signaling, or both. For example, a UE may receive, in a first time slot, a DCI message indicating a second time slot or a first time subslot for the UE to transmit feedback according to a codebook size. In some cases, the feedback may be to be transmitted in a PUCCH associated with a PDSCH scheduled by a PDCCH. In some cases, corresponding SCSs for at least two of the PUCCH, the PDSCH, and the PDCCH are different. Additionally, or alternatively, the PUCCH may be scheduled as time subslots and both the PDSCH and the PDCCH are scheduled as time slots.

In some cases, the DCI may include a set of possible slot offset values. For example, the DCI may include a set of $K_1$ offset values from PDSCH slots to HARQ-ACK slots, a set of $K_0$ offset values from PDCCH slots to PDSCH slots, a set of $K'_1$ slot offset values from PDCCH slots to HARQ-ACK slots, or a combination thereof. In some cases, the UE may determine a set of one or more PMOs based on the set of $K_1$ offset values, the set of $K_0$ offset values, the set of $K'_1$ slot offset values, SCSs, slot lengths, or a combination thereof.

In some cases, the UE may monitor the set of one or more PMOs within at least a subset of a first set of time slots that occur before the second time slot or the first time subslot based on a mapping between the PUCCH, the PDSCH, and the PDCCH in accordance with a corresponding SCS, the PUCCH being scheduled as time subslots, or both. In some cases, the UE may identify the PMOs and may transmit the feedback according to the codebook size in the second time slot or the first time subslot in response to the DCI message. In some examples, the codebook size of the feedback may be based on a quantity of the set of one or more PMOs that occur within at least the subset of the first set of time slots.

Aspects of the disclosure are initially described in the context of wireless communications systems. Additional aspects of the disclosure are described in the context of slot diagrams and process flows. Aspects of the disclosure are further illustrated by and described with reference to apparatus diagrams, system diagrams, and flowcharts that relate to control channel monitoring occasions for different numerologies and sub-slot-based control channels.

FIG. 1 shows an example of a wireless communications system 100 that supports control channel monitoring occasions for different numerologies and sub-slot-based control channels in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support control channel monitoring occasions for different numerologies and sub-slot-based control channels as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and SCS may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include an SCS ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported SCS, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on SCS. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking. Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, the UE 115 may receive, in a first time slot from the network entity 105, a DCI message indicating a second time slot or a first time subslot for the UE to transmit feedback according to a codebook size. In some cases, the feedback may be transmitted in a PUCCH associated with a PDSCH scheduled by a PDCCH. In some cases, corresponding SCSs for at least two of the PUCCH, the PDSCH, and the PDCCH are different. Additionally, or alternatively, the PUCCH may be scheduled as time subslots and both the PDSCH and the PDCCH are scheduled as time slots.

In some cases, the UE 115 may monitor a set of one or more PMOs within at least a subset of a first plurality of time slots that occur before the second time slot or the first time subslot based on a mapping between the PUCCH, the PDSCH, and the PDCCH in accordance with a corresponding SCS, the PUCCH being scheduled as time subslots, or both. In some cases, the UE 115 may transmit the feedback to the network entity 105 according to the codebook size in the second time slot or the first time subslot in response to the DCI message, where the codebook size of the feedback is based on a quantity of the set of one or more PMOs that occur within at least the subset of the first plurality of time slots.

Figure 2:
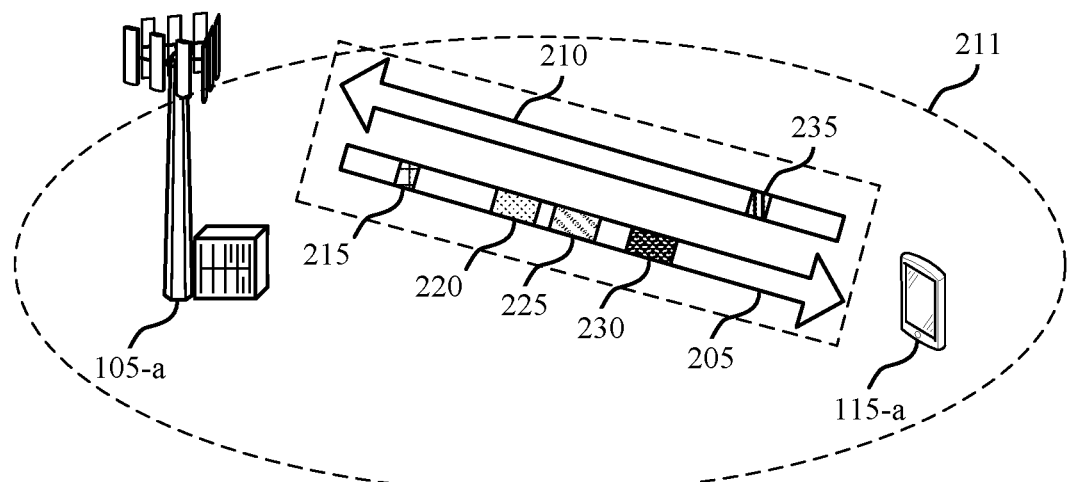
FIG. 2 shows an example of a wireless communications system that supports control channel monitoring occasions for different numerologies and sub-slot-based control channels in accordance with one or more aspects of the present disclosure.

FIG. 2 shows an example of a wireless communications system 200 that supports control channel monitoring occasions for different numerologies and sub-slot-based control channels in accordance with one or more aspects of the present disclosure. The wireless communications system 200 may illustrate an example for implementing one or more aspects of the wireless communications system 100. For example, the wireless communications system 200 may include a network entity 105-a in communication with a UE 115-a using a downlink communication link 205 and an uplink communication link 210, which may be examples of a network entity 105, a UE 115, and one or more communication links 125 as described with reference to FIG. 1. The network entity 105-a may additionally include a serving cell 211, where the serving cell 211 may represent a coverage area 110 described with respect to FIG. 1. For example, the serving cell 211 may represent a serving cell including the network entity 105-a to provide service for one or more UEs 115 including the UE 115-a. In some examples, the wireless communications system 200 may support semi-static PMO-based feedback codebooks for different numerologies and subslot-based PUCCH.

For example, the network entity 105-a may transmit, to the UE 115-a via the downlink communication link 205, control signaling 215, which may be an example of an RRC signal. The control signaling 215 may indicate one or more parameters for configuring the UE 115-a. The network entity 105-a may also transmit DCI signaling 220, PDCCH signaling 225, PDSCH signaling 230 or a combination thereof. For example, the network entity 105-a may transmit one or more DCIs in the DCI signaling 220 to schedule one or more PDCCH data transmissions of the PDCCH signaling 225, or to indicate other control information to the UE 115-a. Additionally, or alternatively, the UE 115-a may transmit, to the network entity 105-a via the uplink communication link 210, PUCCH signaling 235. For example, based on the DCI signaling 220, the PDCCH signaling 225, the PDSCH signaling 230, or a combination thereof, the UE 115-a may transmit feedback, such as one or more HARQ-ACK messages to indicate successful decoding of one or more DCIs and/or PDCCH messages, or to indicate a decoding result of one or more PDSCH messages that are scheduled by the one or more DCIs or PDCCH messages.

In some examples, the UE 115-a may support different codebook types for transmitting feedback (e.g., indicated within the control signaling 215). For example, the UE 115-a may support Type 1 codebooks, Type 2 codebooks, Type 3 codebooks, PMO-based codebooks, among other types of codebooks as described herein, where the UE 115-a may transmit a feedback message (e.g., a HARQ-ACK message) in the PUCCH signaling 235 according to a codebook, where a codebook may map one or more bits of the feedback message to one or more antenna ports or antennas of the UE 115-a.

In some examples, a Type 1 codebook may be determined using semi-static information. For example, a Type 1 codebook may be based on one or more candidate PDSCH occasions, where a PDSCH occasion may be one or more symbols in which the UE 115-a may receive a PDSCH transmission. Specifically, a size of a Type 1 codebook in a slot n may be based on a quantity of candidate PDSCH occasions in a $K_1$ window, or time defined by a $K_1$ value, for each downlink component carrier. In an example, the UE 115-a may determine a set of candidate PDSCH occasions on a per downlink serving cell basis. For example, the UE 115-a may be configured with a set of slot timing offset values, or $K_1$ values, where each of the set of $K_1$ values may represent an offset between a candidate PDSCH occasion and transmission of a feedback message (e.g., a HARQ-ACK response). In some examples, the set of $K_1$ values may be indicated to the UE by RRC signaling or may be a fixed set, and one value from the set of $K_1$ values may be indicated by DCI (e.g., within the DCI signaling 220). In an example, the UE 115-a may be configured with a set of $K_1$ values including {1, 2, 3, 4, 5, 6, 7, 8} if DCI 1_0 is configured and DCI 1_1 is not configured for the serving cell 211. The UE 115-a may receive a DCI within the DCI signaling 220 indicating one or more $K_1$ values of the set of $K_1$ values. Additionally, or alternatively, if DCI format 1_1, DCI format 1_2, or both are configured for the serving cell, the set of $K_1$ values may be provided by a parameter dl-DataToUL-ACK. For example, the UE 115-a may receive a PUCCH configuration within RRC signaling of the control signaling 215 indicating the set of $K_1$ values.

The UE 115-a may consider one or more PDSCH candidates of the set of PDSCH candidates while determining the Type 1 codebook, where each PDSCH candidate may represent a PDSCH time domain resource allocation (TDRA) candidate. For example, each PDSCH TDRA candidate may correspond to a start and length indicator (SLIV) within a slot. In some cases, the UE 115-a may remove PDSCH TDRA candidates that overlap with semi-static uplink symbols (e.g., in time division duplex, or TDD systems) as further described with reference to FIG. 3. The UE 115-a may group the remaining TDRA candidates (e.g., TDRA rows) after removing the overlapping TDRA candidates such that a quantity (e.g., number) of groups is equal to a maximum quantity of non-overlapping SLIVs in the slot. In some cases, the UE 115-a may refrain from grouping the remaining TDRA candidates. For example, if a maximum quantity of PDSCH transmissions that can be received in a slot is 1, then there may be only 1 bit (one PDSCH occasion) per $K_1$ value. In some examples, if a PDSCH transmission is not scheduled (e.g., via DCI or other signaling) for a given candidate PDSCH occasion with HARQ-ACK in a slot n, a bit in a HARQ-ACK feedback message may be set to NACK.

A UE 115-*a* and/or a network entity 105-*a* may determine a Type 2 codebook using dynamic information. For example, a UE 115-*a* may determine a Type 2 codebook based on one or more PMOs (PMOs) and one or more DAIs received via DCI (e.g., within a DCI of the DCI signaling 220 including grant for one or more PDSCH receptions). Specifically, a size of a Type 2 codebook in a slot n may be based on a quantity (e.g., number) of received DCIs indicating to transmit HARQ-ACK in the slot n. Additionally, or alternatively, the Type 2 codebook may be based on a quantity of missing DCIs based on missing DAI values detected by the UE 115-*a*. For example, the order of the one or more PMOs may be used to order received DAIs based on which PMO they are received on. In an example, the UE 115-*a* may receive a first PDCCH DCI in a first PMO indicating a first DAI, and a second PDCCH DCI in a second PMO indicating a second DCI within the DCI signaling 220. The UE 115-*a* may then order the first DAI before the second DAI based on receiving the first DAI within the first PMO. In some examples, the UE 115-*a* may use the value of DAIs after ordering to detect holes corresponding to missing DCIs. For example, the first DAI may have a value of 1, and the second DAI may have a value of 3, and the UE 115-*a* may determine that a DAI of a value of 2 is missing. In some examples, the UE 115-*a* may insert a NACK in a Type 2 codebook corresponding to DAI holes.

A PMO-based codebook may represent a semi-static codebook (e.g., a HARQ-ACK codebook different than a Type 1 codebook) that is based on one or more PMOs based on configured search space sets. For example, a PMO-based codebook may be based on a search space configuration or a PMO configuration received in RRC (e.g., in the control signaling 215). Specifically, the UE 115-*a* may determine a size of a PMO-based codebook in a slot n based on a quantity (e.g., number) of PMOs in a set of slots n−$\{K'_{1,k}\}$, where $K'_1=\{K'_{1,0}, K'_{1,1} \ldots \}$ may represent a set of possible slot offset values from DCI reception to HARQ-ACK transmission. In some examples, each place or location (e.g., bit) of a PMO-based codebook may correspond to one PMO. In some cases, similar to Type 1 codebook size calculation, the UE 115-*a* may omit configured PMOs that overlap with semi-static uplink symbols (e.g., in TDD) when determining the size of a PMO-based codebook. Additionally, or alternatively, the UE 115-*a* may consider PMOs that are configured for monitoring downlink DCI formats that have associated HARQ-ACK messages (e.g., DCI format 1_0/1_1/1_2). For example, if a search space set is configured for monitoring other DCI formats, the UE 115-*a* may not consider the PMOs of that SS set for PMO-based codebooks.

In some examples, the UE 115-*a* may receive a DCI in the DCI signaling 220 in a first PMO, where the DCI may indicate to transmit feedback (e.g., HARQ-ACK feedback) in a slot n. In some cases, the DCI may schedule a PDSCH transmission, where a bit within the feedback (e.g., HARQ-ACK) may be set corresponding to a decoding result of the PDSCH. For example, a bit in a HARQ-ACK may be set of ACK if the corresponding PDSCH is successfully decoded, whereas the bit may be set of a negative ACK (NACK) if the PDSCH is not successfully decoded. Additionally, or alternatively, the DCI may not schedule a PDSCH transmission. For example, the DCI may indicate a semi-persistent scheduling (SPS) release, an SCell dormancy, a transmission configuration indicator (TCI) state change, among other indications. In some examples, the bit in a HARQ-ACK message may be set of ACK or NACK based on a successful or unsuccessful decoding of the DCI. In some examples, if no DCI is received in the first PMO, or DCI received does not indicate to transmit HARQ-Ack in the slot n, then the bit may be set to NACK.

In some examples, the PMO-based codebook may be associated with smaller overhead and may be more robust against missing DCIs (i.e., compared to Type 1 or Type 2 codebooks). Additionally, or alternatively, PMO-based codebooks may be used in cases in which at least two of an SCS of PDCCH, an SCS of PDSCH, or an SCS of PUCCH are different (i.e., different numerologies across carriers). PMO-based codebooks may also be implemented with sub-slot based PUCCH.

As described herein, PMO-based codebooks may be implemented to address different numerologies across carriers, subslot based uplink signaling, or both. For example, the set of possible slot offset values from downlink message reception (e.g., DCI or PDCCH) to feedback transmission (e.g., HARQ-ACK), $K'_1$, may be determined based on the set of $K_1$ values, a set of $K_0$ values, or both. In some cases, the set of possible slot offset values $K'_1$ may be based on a $k'_1$ value (e.g., the slot offset between a downlink message reception to feedback transmission). For example, the DCI may indicate the slot offset (i.e., the $k'_1$ value) between a slot offset between a PDCCH occasion and a feedback message (e.g., a HARQ-ACK response). In such cases, the set of $K_0$ values, a $k_0$ value, or both, may also be indicated, but may not contribute to the construction of the PMO-based codebook. In some cases, the set of PDCCH slots containing the PMOs may be based on the set of $K'_1$ values. For example, the PMO-based codebook may be constructed based on determining the set of PDCCH slots containing the PMOs according to the set of $K'_1$ values to address different numerologies across carriers, subslot based uplink signaling, or both.

Figure 3A:
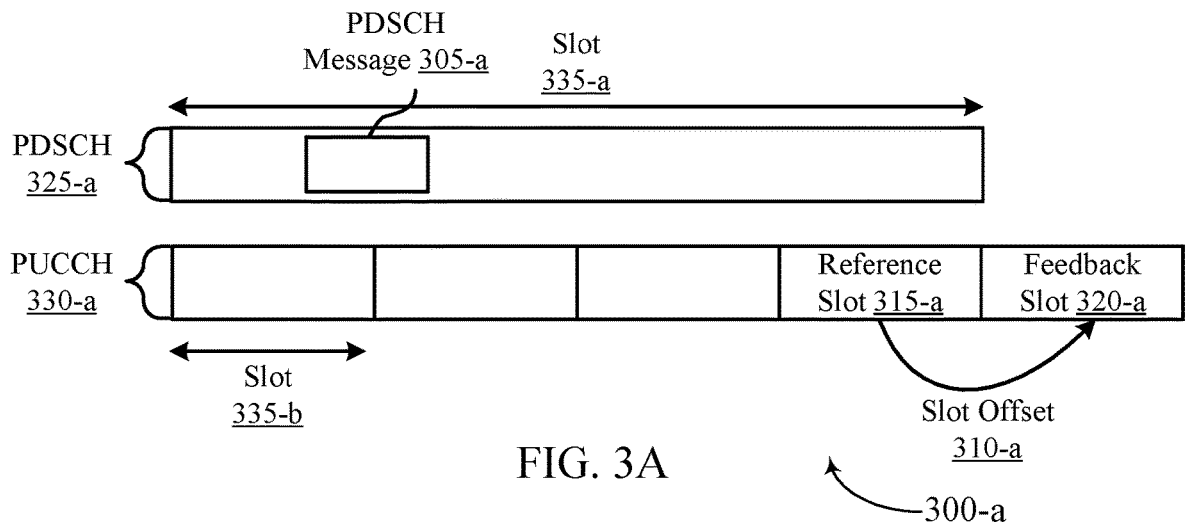
FIGS. 3A, 3B, and 3C show examples of slot diagrams that support control channel monitoring occasions for different numerologies and sub-slot-based control channels in accordance with one or more aspects of the present disclosure.
Figure 3B:
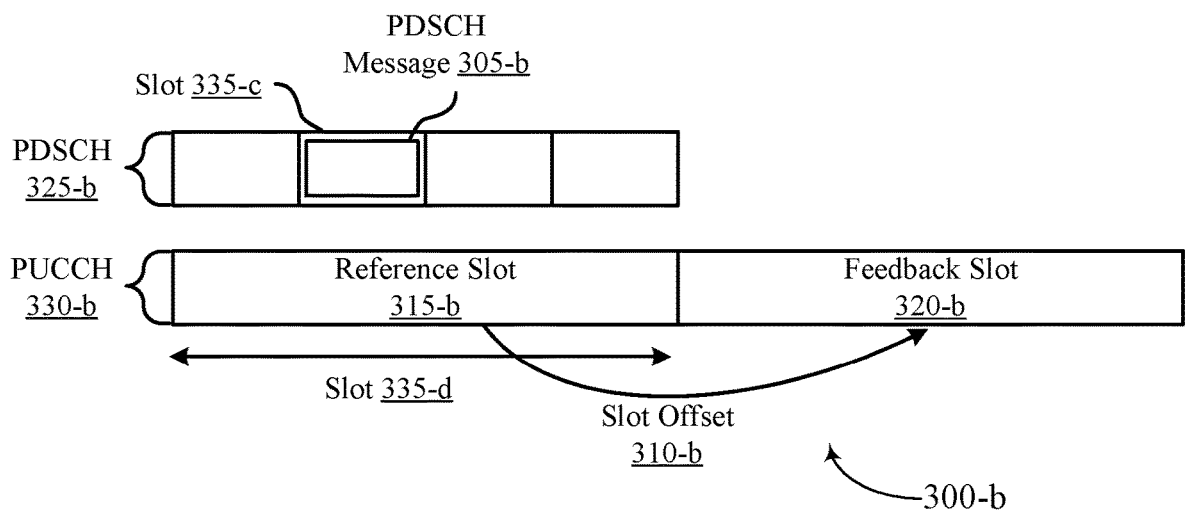
Figure 3C:
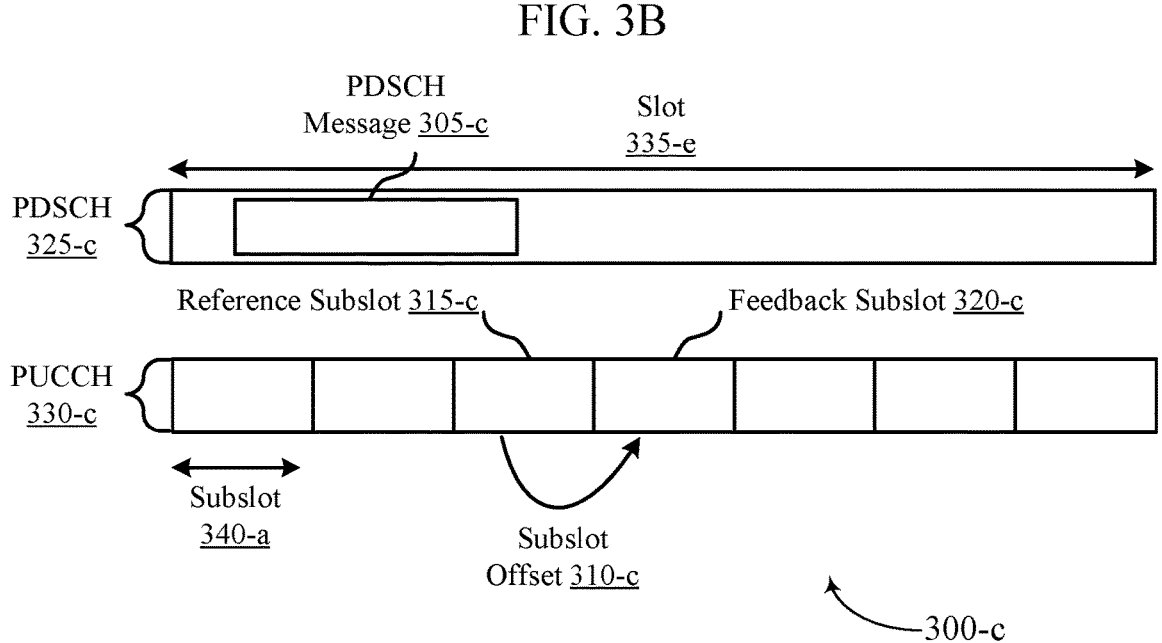

FIGS. 3A, 3B, and 3C each show an example of a slot diagram 300 that supports control channel monitoring occasions for different numerologies and sub-slot-based control channels in accordance with one or more aspects of the present disclosure. In some examples, the slot diagrams 300 (e.g., a slot diagram 300-*a*, a slot diagram 300-*b*, and a slot diagram 300-*c*) may implement or be implemented by aspects of the wireless communications system 100, the wireless communications system 200, or both. For example, the slot diagrams 300 may each be implemented by a network entity 105 or a UE 115, which may be examples of the corresponding devices as described with reference to FIG. 1 and FIG. 2. In some examples of FIGS. 3A, 3B, and 3C, a PDSCH message 305 may be an example of PDSCH signaling 230 as described with reference to FIG. 2. The slot diagrams 300 may support semi-static PMO-based feedback codebooks.

In some cases, a slot offset 310 from a reference slot 315 to a feedback slot 320 may be defined by a $k_1$ value. For example, the slot offset 310 may be an offset from a slot 335 including a PDSCH message 305 corresponding to a HARQ-ACK slot. For example, a DCI scheduling the PDSCH message 305 may indicate the $k_1$ value. Additionally, or alternatively, an RRC message may configure the $k_1$ value of a set of $K_1$ values. For example, an RRC message may configure $K_1$, which may describe all possible $k_1$ values, while the DCI may configure one $k_1$ value. In some cases, the DCI may trigger feedback (e.g., HARQ-ACK), and the $k_1$ value may be the slot offset from a PDCCH slot to a feedback slot (e.g., a HARQ-ACK slot).

In some cases, an SCS of a PDSCH 325 may be different than an SCS of a PUCCH 330. For example, as illustrated by the example of FIG. 3A, a slot 335-a on PDSCH 325-a may be associated with a duration different from, for example, a slot 335-b on PUCCH 330-a. For example, the PDSCH 325-a may be associated with a 30 kHz SCS while the PUCCH 330-a may be associated with a 120 KHz SCS.

In some cases, the slot offset 310-a may correspond to an offset between a reference slot 315-a and a feedback slot 320-a. For example, the reference slot 315-a may correspond to the last uplink slot of the PUCCH 330-a which overlaps with the slot 335-a (e.g., a downlink slot) containing a PDSCH message 305-a. Additionally, or alternatively, the reference slot 315-a may correspond to the last uplink slot of the PUCCH 330-a which overlaps with a downlink slot including a PDCCH message (e.g., when DCI does not schedule PDSCH). In some cases, the slot offset 310-a may be one slot such that the feedback slot 320-a is the slot immediately following the reference slot 315-a.

Additionally, or alternatively, as illustrated by the example of FIG. 3B, a slot 335-c on PDSCH 325-b may be associated with a duration different from, for example, a slot 335-d on PUCCH 330-b. For example, the PDSCH 325-b may be associated with a 120 kHz SCS while the PUCCH 330-b may be associated with a 30 KHz SCS.

In some cases, the slot offset 310-b may correspond to an offset between a reference slot 315-b and a feedback slot 320-b. For example, the reference slot 315-b may correspond to the last uplink slot of the PUCCH 330-b which overlaps with the slot 335-c (e.g., a downlink slot) containing a PDSCH message 305-b. Additionally, or alternatively, the reference slot 315-b may correspond to the last uplink slot of the PUCCH 330-b which overlaps with a downlink slot including a PDCCH message (e.g., when DCI does not schedule PDSCH). In some cases, the slot offset 310-b may be one slot such that the feedback slot 320-b is the slot immediately following the reference slot 315-b.

Additionally, or alternatively, as illustrated by the example of FIG. 3C, a codebook may be configured with subslot-based PUCCH. For example, a subslot offset 310-c may correspond to a number of sub slots (e.g., a subslot 340-a) between a reference subslot 315-c and a feedback subslot 320-c. In some cases, the reference subslot 315-c may correspond to the last uplink subslot in a PUCCH 330-c that overlaps with reception of a PDSCH message 305-c (e.g., in a slot 335-e of PDSCH 325-c). Additionally, or alternatively, the reference subslot 315-c may correspond to the last uplink subslot in the PUCCH 330-c that overlaps with PDCCH reception (i.e., when DCI does not schedule PDSCH). In some cases, the subslot offset 310-c may be one subslot such that the feedback subslot 320-c is the slot immediately following the reference subslot 315-c.

As described herein, a wireless device may be configured with a PMO-based codebook and transmit feedback when at least two component carriers of the PUCCH 330, the PDSCH 325, and a PDCCH are associated with different SCSs or numerologies. Additionally, or alternatively, the wireless device may be configured with a PMO-based codebook and transmit feedback for subslot based uplink signaling (e.g., PUCCH signaling).

FIGS. 4A and 4B each show an example of a slot diagram 400 that supports control channel monitoring occasions for different numerologies and sub-slot-based control channels in accordance with one or more aspects of the present disclosure. In some examples, the slot diagrams 400 (e.g., a slot diagram 400-a and a slot diagram 400-b) may implement or be implemented by aspects of the wireless communications system 100, the wireless communications system 200, or both. For example, the slot diagrams 400 may each be implemented by a network entity 105 or a UE 115, which may be examples of the corresponding devices as described with reference to FIG. 1 and FIG. 2. In some examples of FIGS. 4A and 4B, a PDSCH message 305 may be included in or be an example of PDSCH signaling 230 as described with reference to FIG. 2. The slot diagrams 400 may support semi-static PMO-based feedback codebooks.

As depicted in the example of FIGS. 4A and 4B a slot offset 310 from a reference slot 315 to a PDSCH slot 410 may be defined by a $k_0$ value. For example, the slot offset 310 may be an offset between a slot 335 containing a PDCCH message 405 to a PDSCH slot 410. For example, a DCI scheduling the PDSCH message 305 may indicate the $k_0$ value. In some cases, a time domain resource allocation (TDRA) field of the TCI may indicate a TDRA row or entry including the $k_0$ value, a start and length indicator value (SLIV), a PDSCH mapping type, or a combination thereof. Additionally, or alternatively, an RRC message may configure the $k_0$ value of a set of $K_0$ values. For example, $K_0$ may be based on an RRC configuration of one or more TDRA tables.

In some cases, a first SCS of a cell associated with the PDCCH 415 and a second SCS of a cell associated with the PDSCH 325 may be different. For example, one or more wireless devices may be configured with cross-carrier scheduling with different numerologies.

For example, as illustrated in the example of FIG. 4A, a slot 335-f on PDCCH 415-a (e.g., with 30 kHz SCS) may be associated with a different duration from, for example, a slot 335-g on PDSCH 325-d (e.g., with 120 kHz SCS). In some cases, a slot offset 310-d may be associated with a numerology of a cell associated with the PDSCH 325-d. For example, the slot offset 310-d may correspond to a number of slots on the PDSCH 325-d.

In some examples, the slot offset 310-d may be an offset between a reference slot 315-d and a PDSCH slot 410-a. In some cases, the reference slot 315-d may be the last slot of a component carrier of the PDSCH 325-d that overlaps with the slot 335-f containing a PDCCH message 405-a. In some cases, a scheduling delay 420-a may exist between a last symbol of the PDCCH message 405-a and the beginning of a first symbol of the PDSCH slot 410-a, the reference slot 315-d, or both. For example, the scheduling delay 420-a may be a threshold preparation time associated with a PDSCH message in the PDSCH slot 410-a such that buffering associated with a wireless device is reduced. In some cases, a number of symbols (e.g., 5 symbols) associated with the scheduling delay 420-a may be based on an SCS of the PDCCH 415-a.

In some cases, an additional delay 425 may extend the scheduling delay 420-a. For example, the additional delay 425 may extend the delay to the next available PDSCH slot boundary. For example, when the slot 335-g of the PDSCH 325-d is associated with a shorter duration than the slot 335-f associated with the PDCCH 415-a, the scheduling delay 420-a may be further quantized (e.g., using the granularity of PDSCH slot duration). For example, the additional delay 425 may be implemented when the PDCCH 415-a is associated with a lower SCS than the PDSCH 325-d. In such cases, the reference slot 315-d may not be associated with the scheduling delay 420-a, the additional delay 425, or both.

Additionally, or alternatively, as illustrated in the example of FIG. 4B, a slot 335-*h* on PDCCH 415-*b* (e.g., with 120 kHz SCS) may be associated with a different duration from, for example, a slot 335-*j* on PDSCH 325-*e* (e.g., with 30 kHz SCS). In some cases, a slot offset 310-*e* may be associated with a numerology of a cell associated with the PDSCH 325-*e*. For example, the slot offset 310-*e* may correspond to a number of slots on the PDSCH 325-*e*.

In some examples, the slot offset 310-*e* may be an offset between a reference slot 315-*e* and a PDSCH slot 410-*b*. In some cases, the reference slot 315-*e* may be the last slot of a component carrier of the PDSCH 325-*e* that overlaps with the slot 335-*h* containing a PDCCH message 405-*b*.

In some cases, a scheduling delay 420-*b* may exist between a last symbol of the PDCCH message 405-*b* and the beginning of a first symbol of a PDSCH reception (e.g., in the PDSCH slot 410-*b*), the reference slot 315-*e*, or both. For example, the scheduling delay 420-*b* may be a threshold preparation time associated with a PDSCH message in the PDSCH slot 410-*b* such that buffering associated with a wireless device is reduced. In some cases, a number of symbols (e.g., 14 symbols) associated with the scheduling delay 420-*b* may be based on an SCS of the PDCCH 415-*b*.

In some cases, the scheduling delay 420-*b* may not be extended by the additional delay 425. For example, when the slot 335-*j* of the PDSCH 325-*e* is associated with a longer duration than the slot 335-*h* associated with the PDCCH 415-*b*, further quantization may not be necessary to reach the next PDSCH slot boundary. For example, the additional delay 425 may not be implemented when the PDCCH 415-*b* is associated with a higher SCS than the PDSCH 325-*e*.

As described herein, a wireless device may be configured with a PMO-based codebook and transmit feedback when at least two component carriers of a PUCCH, the PDSCH 325, and the PDCCH 415 are associated with different SCSs or numerologies. Additionally, or alternatively, the wireless device may be configured with a PMO-based codebook and transmit feedback for subslot based uplink signaling.

Figure 5:
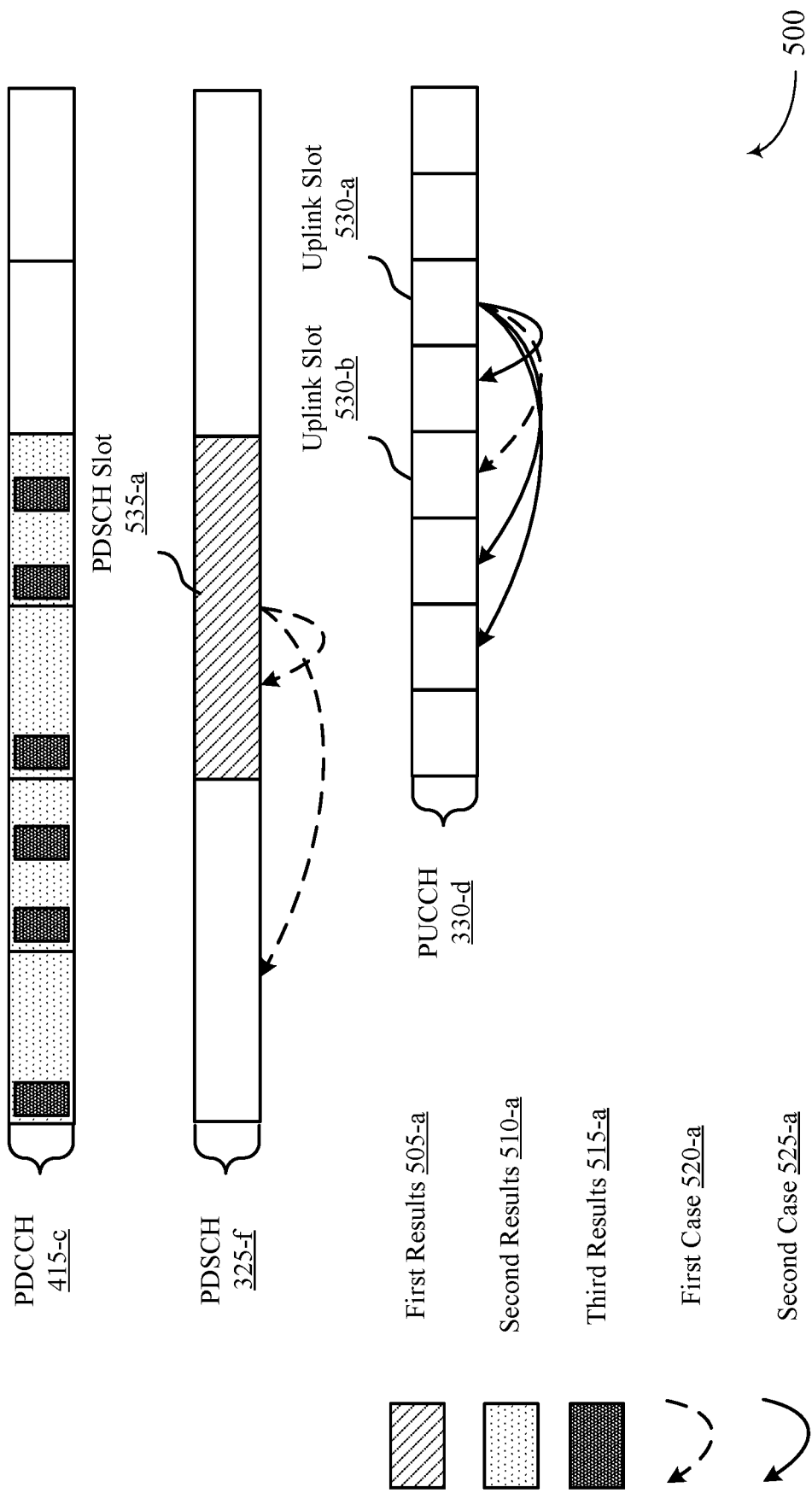
FIG. 5 shows an example of a slot diagram that supports control channel monitoring occasions for different numerologies and sub-slot-based control channels in accordance with one or more aspects of the present disclosure.

FIG. 5 shows an example of a slot diagram 500 that supports control channel monitoring occasions for different numerologies and sub-slot-based control channels in accordance with one or more aspects of the present disclosure. In some examples, the slot diagram 500 may implement or be implemented by aspects of the wireless communications system 100, the wireless communications system 200, or both. For example, the slot diagram 500 may be implemented by a network entity 105 or a UE 115, which may be examples of the corresponding devices as described with reference to FIG. 1 and FIG. 2. The slot diagram 500 may support semi-static PMO-based feedback codebooks.

In some cases, a wireless device may be configured with a PMO-based codebook type. In some cases, the wireless device may determine that feedback (e.g., HARQ-ACK) is scheduled to be transmitted in an uplink slot 530-*a* of a component carrier of PUCCH 330-*d*. For example, the wireless device (e.g., a UE) may receive, in a first time slot, a DCI message indicating a second time slot (e.g., the uplink slot 530-*a*) for the wireless device to transmit feedback according to a codebook size.

In some cases, the feedback may be transmitted in the PUCCH 330-*d* associated with a PDSCH 325-*f* scheduled by a PDCCH 415-*c*. In some cases, corresponding SCSs for at least two of the PUCCH 330-*d*, the PDSCH 325-*f*, and the PDCCH 415-*c* may be different.

For example, a component carrier of PUCCH 330-*d* may be associated with a first SCS or numerology (e.g., 120 kHz or $\mu_{PUCCH}=3$). In some cases, the feedback may be transmitted for a scheduled component carrier (e.g., a component carrier of the PDSCH 325-*f*) associated with a second SCS or numerology (e.g., 30 kHz or $\mu_{PDSCH}=1$). Additionally, or alternatively, the scheduled component carrier may be scheduled by a scheduling component carrier (e.g., a component carrier of the PDCCH 415-*c*) associated with a third SCS or numerology (e.g., 60 kHz or $\mu_{PDCCH}=2$).

In some cases, at least two of the first SCS, the second SCS, and the third SCS are different. For example, the component carrier of the PDCCH 415-*c* and the component carrier of the PDSCH 325-*f* may have a same SCS. In some examples, the component carrier of the PDCCH 415-*c* and the component carrier of the PDSCH 325-*f* may be the same (e.g., self-scheduling). Additionally, or alternatively, component carrier of the PDCCH 415-*c* and the component carrier of the PDSCH 325-*f* may be different.

In some cases, the wireless device (e.g., the UE) may monitor a set of one or more PMOs within at least a subset of a first number of time slots that occur before the second time slot based on a mapping between the PUCCH 330-*d*, the PDSCH 325-*f*, and the PDCCH 415-*c* in accordance with a corresponding SCS. For example, the wireless device may determine a set of PDSCH slots based on a set of slot offset values $K_1$, the first SCS, the second SCS, and the uplink slot 530-*a* (i.e., $n_U$). In some cases, for each $k_1$ value in the $K_1$ set, the wireless device may consider the PDSCH slots which within a PUCCH slot $k_1$ slots before the uplink slot 530-*a* (i.e., $n_U$-$k_1$).

For example, when $K_1=\{1, 2, 3, 4\}$, the wireless device may consider the PDSCH slots within the PUCCH slots given by $n_U$-1, $n_U$-2, etc. In some cases, the first SCS may be larger than the second SCS (i.e., $\mu_{PUCCH} > \mu_{PDSCH}$). In such cases, a PDSCH slot 535-*a* may include a number of PUCCH slots. In some cases, first results 505-*a* may include the PDSCH slot 535-*a* when an uplink slot 530-*b* given by $n_U$-$k_1$ is the last PUCCH slot that overlaps with the PDSCH slot 535-*a*.

In some examples, the uplink slot 530-*b* may be the last PUCCH slot that overlaps with the PDSCH slot 535-*a*, and the PDSCH slot 535-*a* may be included in the first results 505-*a*. For example, the PDSCH slot 535-*a* may be included in the first results when mode $(n_U$-$k_1+1, 2^{\mu_{PUCCH}-\mu_{PDSCH}})=0$. In some cases, a first set of PUCCH slots are included in the first results 505-*a* in a first case 520-*a* while a second set of PUCCH slots are not included in the first results 505-*a* in a second case 525-*a*.

In some cases, the DCI message may not schedule PDSCH. For example, the DCI message may have a corresponding HARQ-ACK such as an SPS release DCI, SCell dormancy, a TCI state change, or the like. In such cases, $k_1$ may correspond to a slot offset from a PDCCH slot to a HARQ-ACK or PUCCH slot. In some cases, the set of PDSCH slots may be determined if $k_0=0$ is included in the $K_0$ set. However, this may not address cases in which the second SCS and the third SCS are different. Accordingly, a wireless device may determine the set of PDCCH slots based on the slot offset values $K_1$, where $K_1$ corresponds to slot offset values from PDCCH to HARQ-ACK. In some cases, the wireless device may determine a set of PDCCH slots based on a set of slot offset values $K_0$, the second SCS, the third SCS, and the first results 505-*a* (e.g., the set of PDSCH slots).

For example, for each pair of $k_0$ values in the $K_0$ set and PDSCH slot (i.e., $N_{PDSCH}$) of the set of PDSCH slots, the wireless device may consider the PDCCH slots that overlap with the PDSCH slots given by $n_{PDSCH}$-$k_0$. For example, when $K_0=\{0, 1\}$, the wireless device may consider the PDCCH slots that overlap with the PDSCH slots given by $n_{PDSCH}$–0 and $n_{PDSCH}$–1. In some cases, the second SCS may be smaller than the third SCS (i.e., $\mu_{PDSCH} < \mu_{PDCCH}$). In such cases, a PDSCH slot may contain a number of PDCCH slots.

In some cases, second results 510-a may include a PDCCH slot when the PDSCH slot given by $n_{PDSCH}$-$k_0$ overlaps with the PDCCH slot. In some cases, a first set of PDSCH slots are included in the second results 510-a in a first case 520-a while a second set of PDSCH slots are not included in the second results 510-a in a second case 525-a. In some cases, PDCCH slots may be determined for multiple pairs (e.g., pairs of ($n_{PDSCH}$, $k_0$)). In such cases, the set of PDCCH slots in the second results 510-a may include the unique PDCCH slots based on considering all pairs (e.g., removing repetitions).

In some cases, the wireless device may determine a set of PMOs in the set of PDCCH slots from the second results 510-a. For example, the wireless device may consider the PMOs that are configured to schedule the PDSCH on a component carrier (i.e., scheduled component carrier). In some examples, the wireless device may determine the feedback codebook based on the set of PMOs (e.g., each place in the codebook corresponds to a PMO). The set of PMOs may be included in third results 515-a.

In some examples, the wireless device may construct the PMO-based codebook based on the set of PMOs included in the third results 515-a. In some cases, the wireless device (e.g., the UE) may transmit the feedback according to the codebook size in the second time slot (e.g., the uplink slot 530-a) in response to the DCI message. In some cases, the codebook size of the feedback may be based on a number of the set of one or more PMOs (e.g., the second results 510-a) that occur within at least the subset of the first number of time slots (e.g., the first results 505-a).

Figure 6:
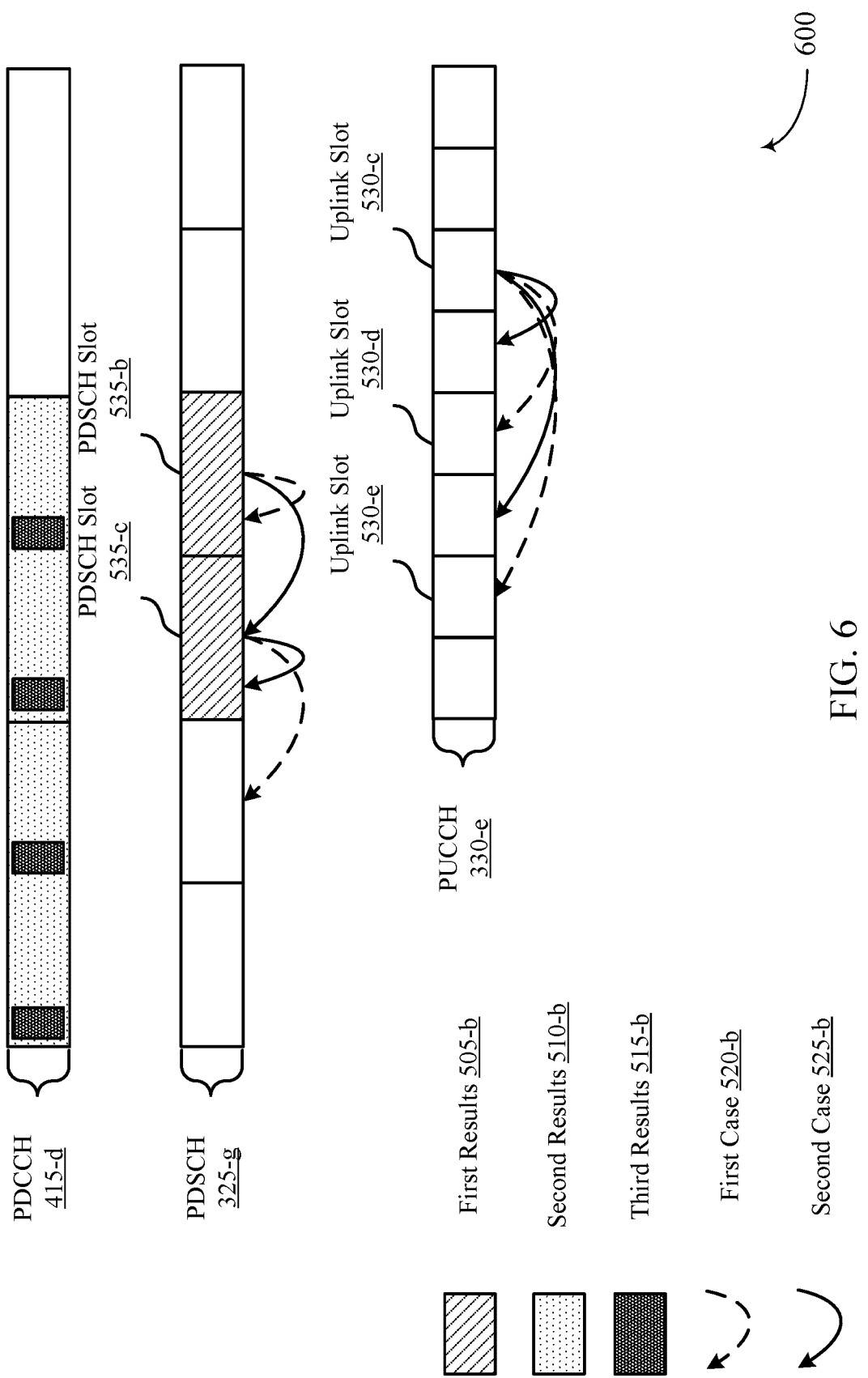
FIG. 6 shows an example of a slot diagram that supports control channel monitoring occasions for different numerologies and sub-slot-based control channels in accordance with one or more aspects of the present disclosure.

FIG. 6 shows an example of a slot diagram 600 that supports control channel monitoring occasions for different numerologies and sub-slot-based control channels in accordance with one or more aspects of the present disclosure. In some examples, the slot diagram 600 may implement or be implemented by aspects of the wireless communications system 100, the wireless communications system 200, or both. For example, the slot diagram 600 may be implemented by a network entity 105 or a UE 115, which may be examples of the corresponding devices as described with reference to FIG. 1 and FIG. 2. The slot diagram 600 may support semi-static PMO-based feedback codebooks.

In some cases, a wireless device may be configured with a PMO-based codebook type. In some cases, the wireless device may determine that feedback (e.g., HARQ-ACK) is scheduled to be transmitted in an uplink slot 530-c of a component carrier of PUCCH 330-e associated with a first SCS or numerology (e.g., 120 kHz or $\mu_{PUCCH}$=3). In some examples, the feedback may be transmitted for a scheduled component carrier (e.g., a component carrier of PDSCH 325-g) associated with a second SCS or numerology (e.g., 60 kHz or $\mu_{PDSCH}$=2). Additionally, or alternatively, the scheduled component carrier may be scheduled by a scheduling component carrier (e.g., a component carrier of PDCCH 415-d) associated with a third SCS or numerology (e.g., 30 KHz or $\mu_{PDCCH}$=1).

In some cases, at least two of the first SCS, the second SCS, and the third SCS are different. For example, the component carrier of the PDCCH 415-d and the component carrier of the PDSCH 325-g may have a same SCS. In some examples, the component carrier of the PDCCH 415-d and the component carrier of the PDSCH 325-g may be the same (e.g., self-scheduling). Additionally, or alternatively, component carrier of the PDCCH 415-d and the component carrier of the PDSCH 325-g may be different. In some examples, the wireless device may determine a set of PDSCH slots based on a set of slot offset values $K_1$, the first SCS, the second SCS, and the uplink slot 530-c (i.e., $n_U$).

In some cases, for each $k_1$ value in the $K_1$ set, the wireless device may consider the PDSCH slots which within a PUCCH slot $k_1$ slots before the uplink slot 530-c (i.e., $n_U$-$k_1$). For example, when $K_1$={1, 2, 3, 4}, the wireless device may consider the PDSCH slots within the PUCCH slots given by $n_U$–1, $n_U$–2, etc. In some cases, the first SCS may be larger than the second SCS (i.e., $\mu_{PUCCH} > \mu_{PDSCH}$). In such cases, a PDSCH slot 535-b, a PDSCH slot 535-c, or both may contain a number of PUCCH slots. In some cases, first results 505-b may include the PDSCH slot 535-b, the PDSCH slot 535-c, or both when an uplink slot 530-d, an uplink slot 530-e, or both given by $n_U$-$k_1$ are the last PUCCH slots that overlap with the PDSCH slot 535-b, the PDSCH slot 535-c, or both.

In some examples, the uplink slot 530-d, the uplink slot 530-e, or both may be the last PUCCH slot that overlaps with the PDSCH slot 535-b, the PDSCH slot 535-c, or both, and the PDSCH slot 535-b, the PDSCH slot 535-c, or both may be included in the first results 505-b. For example, the PDSCH slot 535-b, the PDSCH slot 535-c, or both may be included in the first results when mode ($n_U$-$k_1$+1, $2^{\mu_{PUCCH}-\mu_{PDSCH}}$)=0. In some cases, a first set of PDSCH slots are included in the first results 505-b in a first case 520-b while a second set of PDSCH slots are not included in the first results 505-b in a second case 525-b. In some cases, the wireless device may determine a set of PDCCH slots based on a set of slot offset values $K_0$, the second SCS, the third SCS, and the first results 505-b (e.g., the set of PDSCH slots).

For example, for each pair of $k_0$ values in the $K_0$ set and PDSCH slot (i.e., $n_{PDSCH}$) of the set of PDSCH slots, the wireless device may consider the PDCCH slots that overlap with the PDSCH slots given by $n_{PDSCH}$-$k_0$. For example, when $K_0$={0, 1}, the wireless device may consider the PDCCH slots that overlap with the PDSCH slots given by $n_{PDSCH}$–0 and $n_{PDSCH}$–1. In some cases, the second SCS may be larger than the third SCS (i.e., $\mu_{PDSCH} > \mu_{PDCCH}$). In such cases, a PDCCH slot may contain a number of PDSCH slots.

In some cases, second results 510-b may include a PDCCH slot when the PDSCH slot given by $n_{PDSCH}$-$k_0$ is the last PDSCH slot that overlaps with the PDCCH slot. For example, the PDCCH slot may be included in second results 510-b when mode ($n_{PDSCH}$-$k_0$+1, $2^{\mu_{PDSCH}-\mu_{PDCCH}}$)=0. In some cases, a first set of PDCCH slots may be included in the second results 510-b in a first case 520-b, while a second set of PDCCH slots may not be included in the second results 510-b in a second case 525-b.

In some cases, the UE may determine PDCCH slots for multiple pairs (e.g., pairs of ($n_{PDSCH}$, $K_0$)). In such cases, the set of PDCCH slots in the second results 510-b may include the unique PDCCH slots based on considering all pairs (e.g., removing repetitions). In some cases, the wireless device may determine a set of PMOs in the set of PDCCH slots from the second results 510-b. For example, the wireless device may consider the PMOs that are configured to schedule the PDSCH component carrier (i.e., scheduled component carrier). In some examples, the wireless device may determine the feedback codebook based on the set of PMOs (e.g., each place in the codebook corresponds to a PMO). The set of PMOs may be included in third results

515-*b*. In some examples, the wireless device may construct the PMO-based codebook based on the set of PMOs included in the third results 515-*b*.

Figure 7:
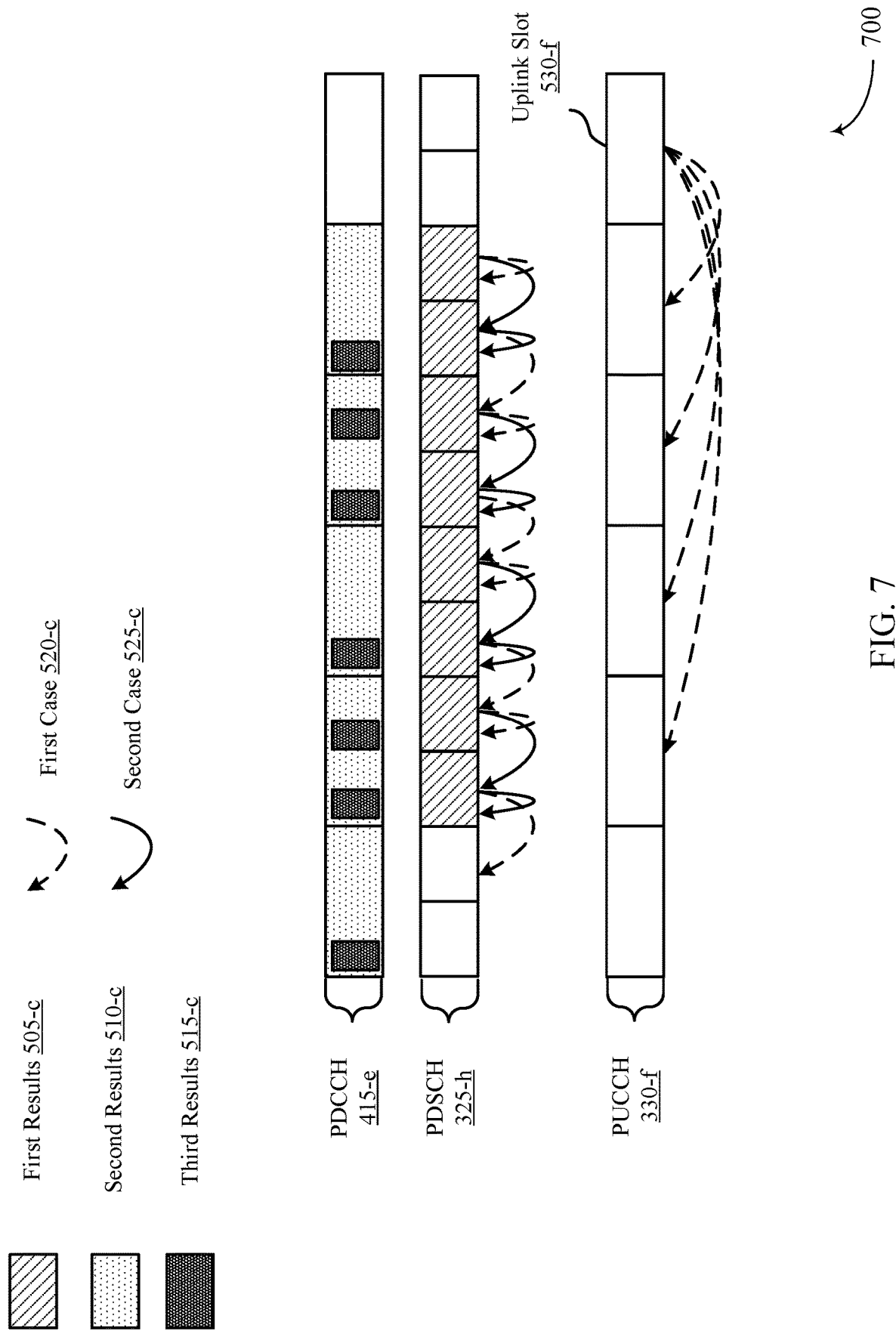
FIG. 7 shows an example of a slot diagram that supports control channel monitoring occasions for different numerologies and sub-slot-based control channels in accordance with one or more aspects of the present disclosure.

FIG. 7 shows an example of a slot diagram 700 that supports control channel monitoring occasions for different numerologies and sub-slot-based control channels in accordance with one or more aspects of the present disclosure. In some examples, the slot diagram 700 may implement or be implemented by aspects of the wireless communications system 100, the wireless communications system 200, or both. For example, the slot diagram 700 may be implemented by a network entity 105 or a UE 115, which may be examples of the corresponding devices as described with reference to FIG. 1 and FIG. 2. The slot diagram 700 may support semi-static PMO-based feedback codebooks.

In some cases, a wireless device may be configured with a PMO-based codebook type. In some cases, the wireless device may determine that feedback (e.g., HARQ-ACK) is scheduled to be transmitted in an uplink slot 530-*f* of a component carrier of PUCCH 330-*f* associated with a first SCS or numerology (e.g., 30 kHz or $\mu_{PUCCH}=1$). In some examples, the feedback may be transmitted for a scheduled component carrier (e.g., a component carrier of PDSCH 325-*h*) associated with a second SCS or numerology (e.g., 60 kHz or $\mu_{PDSCH}=2$). Additionally, or alternatively, the scheduled component carrier may be scheduled by a scheduling component carrier (e.g., a component carrier of PDCCH 415-*e*) associated with a third SCS or numerology (e.g., 30 KHz or $\mu_{PDCCH}=1$).

In some cases, at least two of the first SCS, the second SCS, and the third SCS are different. For example, the component carrier of the PDCCH 415-*e* and the component carrier of the PDSCH 325-*h* may have a same SCS. In some examples, the component carrier of the PDCCH 415-*e* and the component carrier of the PDSCH 325-*h* may be the same (e.g., self-scheduling). Additionally, or alternatively, component carrier of the PDCCH 415-*e* and the component carrier of the PDSCH 325-*h* may be different. In some examples, the wireless device may determine a set of PDSCH slots based on a set of slot offset values $K_1$, the first SCS, the second SCS, and the uplink slot 530-*f* (i.e., $n_U$). In some cases, for each $k_1$ value in the $K_1$ set, the wireless device may consider the PDSCH slots which within a PUCCH slot $k_1$ slots before the uplink slot 530-*f* (i.e., $n_U-k_1$).

For example, when $K_1=\{1, 2, 3, 4\}$, the wireless device may consider the PDSCH slots within the PUCCH slots given by $n_U-1$, $n_U-2$, etc. In some cases, the first SCS may be smaller than the second SCS (i.e., $\mu_{PUCCH}<\mu_{PDSCH}$). In such cases, the uplink slot 530-*f* may contain a number of PDSCH slots. In some cases, first results 505-*c* may include a first set of PDSCH slots when the PUCCH slots given by $n_U-k_1$ overlap with the first set of PDSCH slots. In some cases, the first set of PDSCH slots are included in the first results 505-*c* in a first case 520-*c* while a second set of PDSCH slots are not included in the first results 505-*c* in a second case 525-*c*.

In some cases, the wireless device may determine a set of PDCCH slots based on a set of slot offset values $K_0$, the second SCS, the third SCS, and the first results 505-*c* (e.g., the first set of PDSCH slots). For example, for each pair of $k_0$ values in the $K_0$ set and PDSCH slot (i.e., $n_{PDSCH}$) of the set of PDSCH slots, the wireless device may consider the PDCCH slots that overlap with the PDSCH slots given by $n_{PDSCH}-k_0$. For example, when $K_0=\{0, 1\}$, the wireless device may consider the PDCCH slots that overlap with the PDSCH slots given by $n_{PDSCH}-0$ and $n_{PDSCH}-1$. In some cases, the second SCS may be greater than the third SCS (i.e., $\mu_{PDSCH}>\mu_{PDCCH}$). In such cases, a PDCCH slot may contain a number of PDSCH slots.

In some cases, second results 510-*c* may include a PDCCH slot when the PDSCH slot given by $n_{PDSCH}-k_0$ is the last PDSCH slot that overlaps with the PDCCH slot. For example, the PDCCH slot may be included in second results 510-*c* when mode $(n_{PDSCH}-k_0+1, 2\mu_{PDSCH}-\mu_{PDCCH})=0$. In some cases, a first set of PDCCH slots are included in the second results 510-*c* in a first case 520-*c* while a second set of PDCCH slots are not included in the second results 510-*c* in a second case 525-*c*.

In some cases, PDCCH slots may be determined for multiple pairs (e.g., pairs of $(n_{PDSCH}, K_0)$). In such cases, the set of PDCCH slots in the second results 510-*c* may include the unique PDCCH slots based on considering all pairs (e.g., removing repetitions). In some cases, the wireless device may determine a set of PMOs in the set of PDCCH slots from the second results 510-*c*. For example, the wireless device may consider the PMOs that are configured to schedule the PDSCH component carrier (i.e., scheduled component carrier). In some examples, the wireless device may determine the feedback codebook based on the set of PMOs (e.g., each place in the codebook corresponds to a PMO). The set of PMOs may be included in third results 515-*c*. In some examples, the wireless device may construct the PMO-based codebook based on the set of PMOs included in the third results 515-*c*.

Figure 8A:
FIGS. 8A and 8B show examples of slot diagrams that support control channel monitoring occasions for different numerologies and sub-slot-based control channels in accordance with one or more aspects of the present disclosure.
Figure 8A:
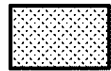
Figure 8A:
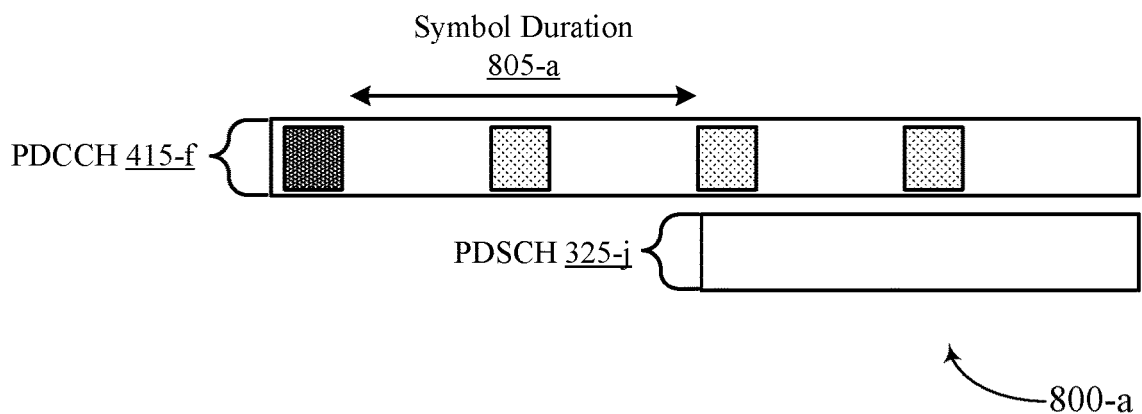
Figure 8B:
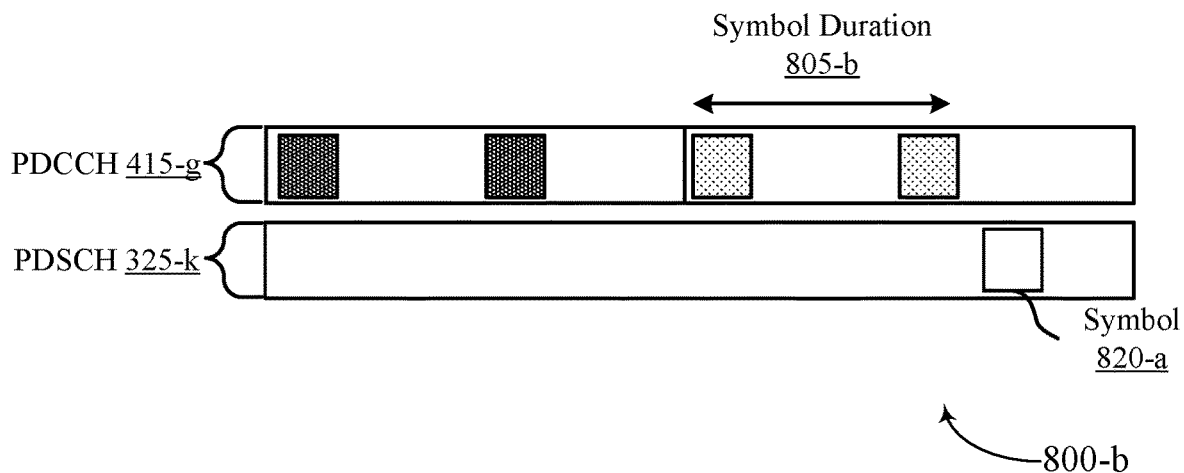

FIGS. 8A and 8B each show an example of a slot diagram 800 that supports control channel monitoring occasions for different numerologies and sub-slot-based control channels in accordance with one or more aspects of the present disclosure. In some examples, the slot diagrams 800 (e.g., a slot diagram 800-*a* and a slot diagram 800-*b*) may implement or be implemented by aspects of the wireless communications system 100, the wireless communications system 200, or both. For example, the slot diagrams 800 may each be implemented by a network entity 105 or a UE 115, which may be examples of the corresponding devices as described with reference to FIG. 1 and FIG. 2. The slot diagrams 800 may support semi-static PMO-based feedback codebooks via PMO pruning.

For example, a wireless device may eliminate a PMO from consideration based on a scheduling delay (e.g., a minimum scheduling delay) when a first SCS associated with PDCCH 415 and a second SCS associated with a PDSCH 325 are different. In some cases, the PMO may not be considered based on a last symbol of the PMO and a first symbol of a PDSCH message (i.e., a potential PDSCH message) are not separated by a threshold number of symbols. For example, the threshold number of symbols may be based on the first SCS of the PDCCH 415 from the end of the last symbol of the PDCCH 415 to the beginning of the first symbol of the PDSCH 325. For example, as illustrated in the example of FIG. 8A, a PDCCH 415-*f* may include a set of considered PMOs 810-*a* and a set of not considered PMOs 815-*a*.

In some cases, the first SCS (i.e., associated with the PDCCH 415-*f*) may be less than the second SCS (i.e., associated with a PDSCH 325-*j*). For example, the first SCS may be 30 kHz (e.g., $\mu_{PDCCH}=1$) while the second SCS may be 60 kHz (e.g., $\mu_{PDSCH}=2$). In some examples, the first symbol of the PDSCH message (i.e., the potential PDSCH message) may be the first symbol of a PDSCH slot. For example, the first symbol of the PDSCH message may be the first symbol of the PDSCH based on an additional delay (e.g., quantization).

In some examples, a PMO may be considered when the PMO is separated from the PDSCH message by a symbol duration 805-*a* (e.g., 5 symbols). For example, the set of considered PMOs 810-*a* may be separated from the PDSCH message by at least the symbol duration 805-*a*. Additionally, or alternatively, as illustrated by the example of FIG. 8B, a PDCCH 415-*g* may include a set of considered PMOs 810-*a* and a set of not considered PMOs 815-*a*.

In some cases, the first SCS (i.e., associated with the PDCCH 415-*g*) may be greater than the second SCS (i.e., associated with a PDSCH 325-*k*). For example, the first SCS may be 60 kHz (e.g., $\mu_{PDCCH}=2$) while the second SCS may be 30 kHz (e.g., $\mu_{PDSCH}=1$). In some examples, the first symbol of the PDSCH message (i.e., the potential PDSCH message) may be the second to last symbol of a PDSCH slot (e.g., a symbol 820-*a*). For example, the first symbol of a PDSCH in a slot may be the symbol 820-*a* based on a threshold duration of the PDSCH (e.g., a minimum duration of 2 symbols). In some examples, a PMO may be considered when the PMO is separated from the PDSCH message by a symbol duration 805-*b* (e.g., 10 symbols). For example, the set of considered PMOs 810-*a* may be separated from the PDSCH message by at least the symbol duration 805-*b*.

In some cases, a PMO may be considered for a number of candidate pairs of ($n_{PDSCH}$, $k_0$). For example, the PMO may be determined to be in the set of not considered PMOs 815-*a* according to a first candidate pair, but the PMO may be determined to be in the set of considered PMOs 810-*a* according to a second candidate pair. For example, two candidate pairs may result in a same PDCCH slot.

Figure 9:
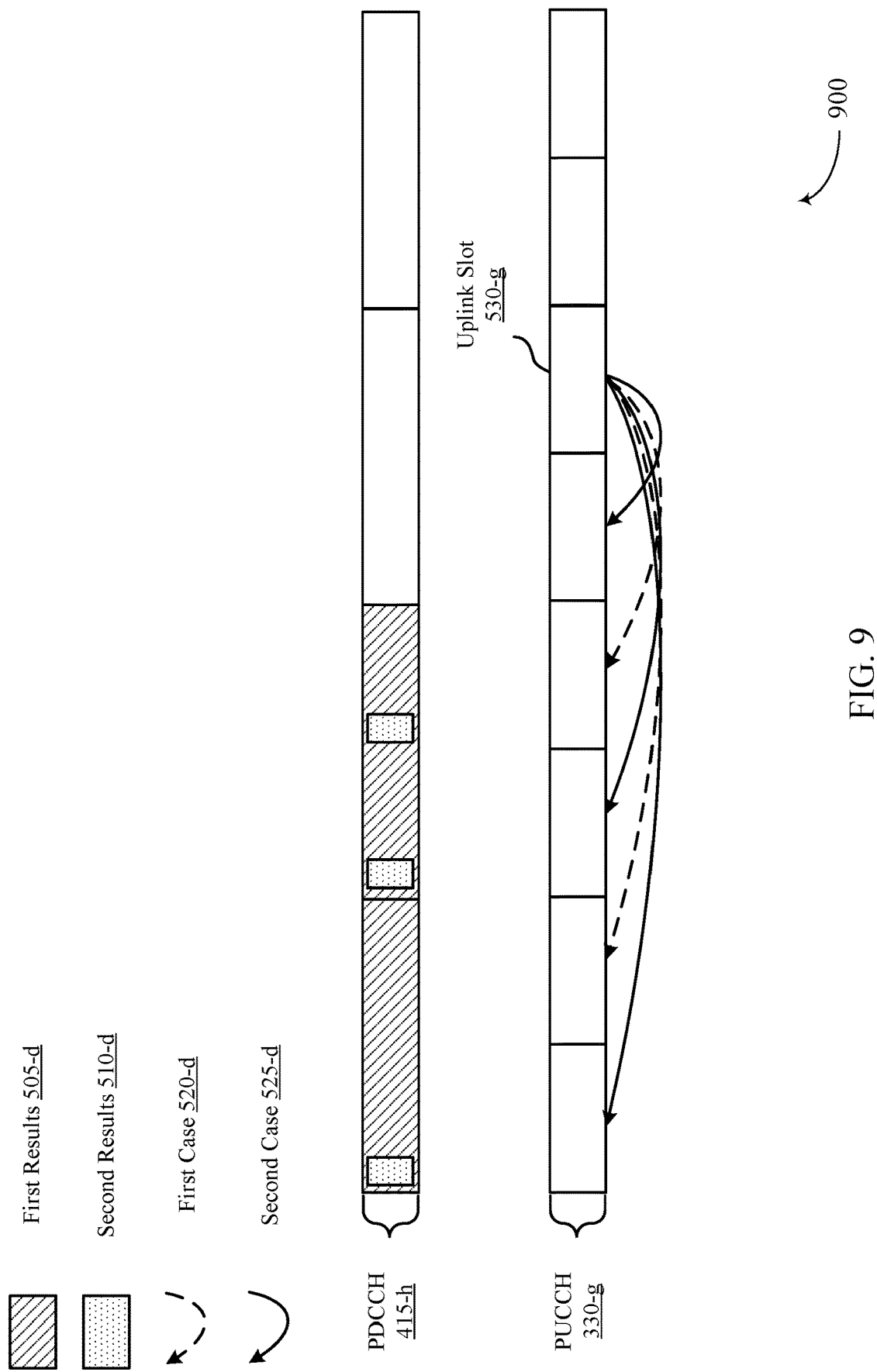
FIG. 9 shows an example of a slot diagram that supports control channel monitoring occasions for different numerologies and sub-slot-based control channels in accordance with one or more aspects of the present disclosure.

FIG. 9 shows an example of a slot diagram 900 that supports control channel monitoring occasions for different numerologies and sub-slot-based control channels in accordance with one or more aspects of the present disclosure. In some examples, the slot diagram 900 may implement or be implemented by aspects of the wireless communications system 100, the wireless communications system 200, or both. For example, the slot diagram 900 may be implemented by a network entity 105 or a UE 115, which may be examples of the corresponding devices as described with reference to FIG. 1 and FIG. 2. The slot diagram 900 may support semi-static PMO-based feedback codebooks.

In some cases, a wireless device may be configured with a PMO-based codebook type. In some cases, the wireless device may determine that feedback (e.g., HARQ-ACK) is scheduled to be transmitted in an uplink slot 530-*g* of a component carrier of PUCCH 330-*g* associated with a first SCS or numerology (e.g., 120 kHz or $\mu_{PUCCH}=3$). In some examples, the feedback may be transmitted for a scheduled component carrier (e.g., a component carrier of PDSCH). Additionally, or alternatively, the scheduled component carrier may be scheduled by a scheduling component carrier (e.g., a component carrier of PDCCH 415-*h*) associated with a second SCS or numerology (e.g., 60 kHz or $\mu_{PDCCH}=2$). In some cases, the first SCS and the second SCS may be different. In some cases, an RRC message may configure a set of slot offset values $K'_1$ from PDCCH to HARQ-ACK. In some cases, the wireless device may determine a set of PDCCH slots based on the set of slot offset values $K'_1$, the first SCS, the second SCS, and the uplink slot 530-*g* (e.g., $n_U$).

For example, for each $k'_1$ value in the $K'_1$ set, the wireless device may consider PDCCH slots within the PUCCH slots given by $n_U-k_1$. For example, when $K'_1=\{1, 2, 3, 4, 5\}$, the wireless device may consider the PDCCH slots that overlap with the PUCCH slots given by $n_U-1$, $n_U-2$, etc. In some cases, the first SCS may be larger than the second SCS (i.e., $\mu_{PUCCH}>\mu_{PDCCH}$). In such cases, a PDCCH slot may contain a number of PUCCH slots.

In some cases, first results 505-*d* may include a PDCCH slot when the PUCCH slot given by $n_U-k'_1$ is the last PUCCH slot that overlaps with the PDCCH slot. For example, the PDCCH slot may be included in first results 505-*d* when mode ($n_U-k_1+1$, $2^{\mu_{PUCCH}-\mu_{PDCCH}}$). In some cases, a first set of PDCCH slots are included in the first results 505-*d* in a first case 520-*d* while a second set of PDCCH slots are not included in the first results 505-*d* in a second case 525-*d*.

In some cases, the wireless device may determine a set of PMOs in the set of PDCCH slots from the first results 505-*d*. For example, the wireless device may consider the PMOs that are configured to schedule the PDSCH component carrier (i.e., scheduled component carrier). In some examples, the wireless device may determine the feedback codebook based on the set of PMOs (e.g., each place in the codebook corresponds to a PMO). The set of PMOs may be included in second results 510-*d*. In some examples, the wireless device may construct the PMO-based codebook based on the set of PMOs included in the second results 510-*d*.

Figure 10:
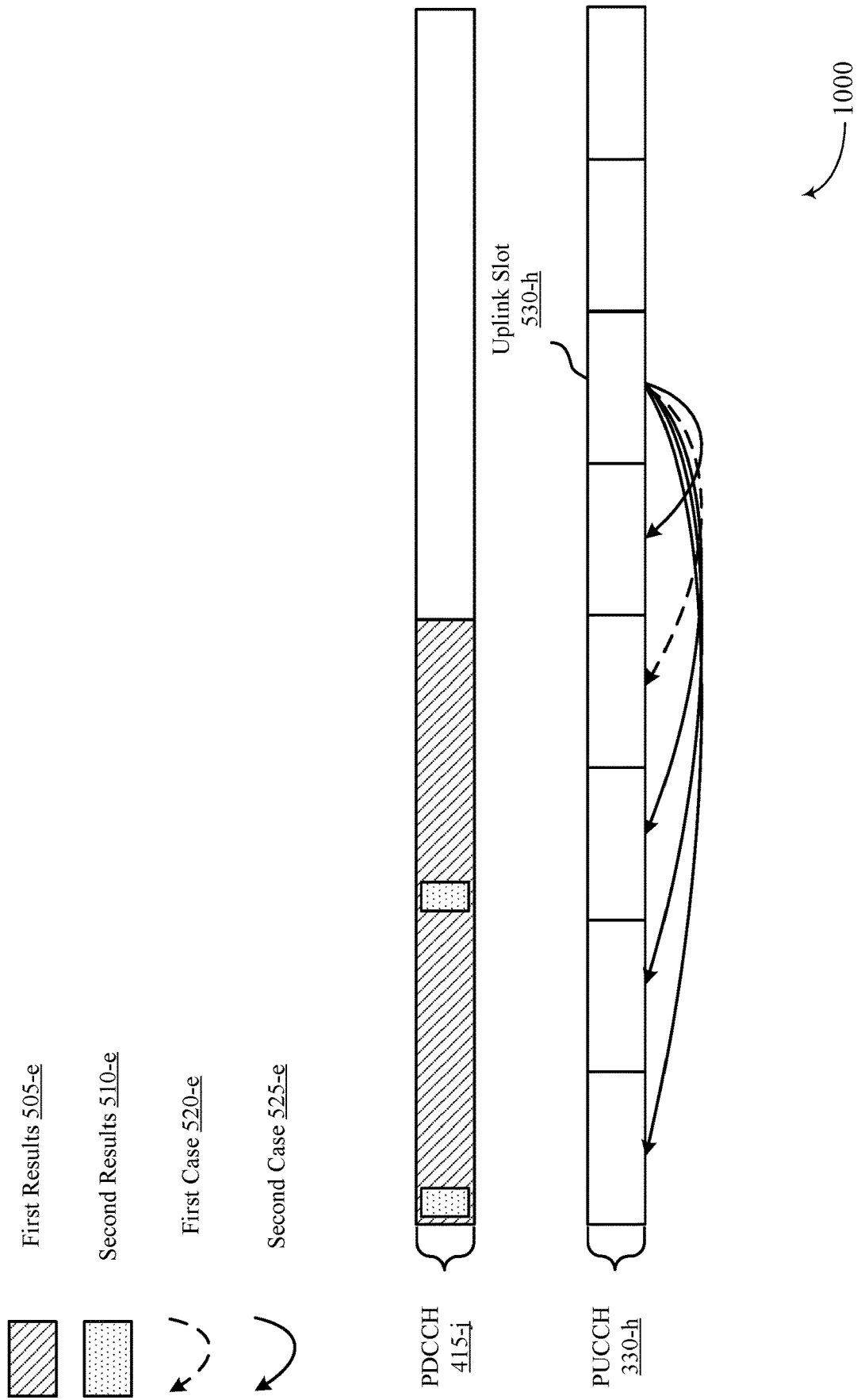
FIG. 10 shows an example of a slot diagram that supports control channel monitoring occasions for different numerologies and sub-slot-based control channels in accordance with one or more aspects of the present disclosure.

FIG. 10 shows an example of a slot diagram 1000 that supports control channel monitoring occasions for different numerologies and sub-slot-based control channels in accordance with one or more aspects of the present disclosure. In some examples, the slot diagram 1000 may implement or be implemented by aspects of the wireless communications system 100, the wireless communications system 200, or both. For example, the slot diagram 1000 may be implemented by a network entity 105 or a UE 115, which may be examples of the corresponding devices as described with reference to FIG. 1 and FIG. 2. The slot diagram 1000 may support semi-static PMO-based feedback codebooks.

In some cases, a wireless device may be configured with a PMO-based codebook type. In some cases, the wireless device may determine that feedback (e.g., HARQ-ACK) is scheduled to be transmitted in an uplink slot 530-*h* of a component carrier of PUCCH 330-*h* associated with a first SCS or numerology (e.g., 120 kHz or $\mu_{PUCCH}=3$). In some examples, the feedback may be transmitted for a scheduled component carrier (e.g., a component carrier of PDSCH). Additionally, or alternatively, the scheduled component carrier may be scheduled by a scheduling component carrier (e.g., a component carrier of PDCCH 415-*j*) associated with a second SCS or numerology (e.g., 30 KHz or $\mu_{PDCCH}=1$). In some cases, the first SCS and the second SCS may be different. In some cases, an RRC message may configure a set of slot offset values $K'_1$ from PDCCH to HARQ-ACK.

In some cases, the wireless device may determine a set of PDCCH slots based on the set of slot offset values KJ, the first SCS, the second SCS, and the uplink slot 530-*h* (e.g., $n_U$). For example, for each $k'_1$ value in the $K'_1$ set, the wireless device may consider PDCCH slots within the PUCCH slots given by $n_U-k_1$. For example, when $K_1=\{1, 2, 3, 4, 5\}$, the wireless device may consider the PDCCH slots that overlap with the PUCCH slots given by $n_U-1$, $n_U-2$, etc.

In some cases, the first SCS may be larger than the second SCS (i.e., $\mu_{PUCCH}>\mu_{PDCCH}$). In such cases, a PDCCH slot may contain a number of PUCCH slots. In some cases, first results 505-*e* may include a PDCCH slot when the PUCCH slot given by $n_U-k'_1$ is the last PUCCH slot that overlaps with the PDCCH slot. For example, the PDCCH slot may be included in first results 505-*e* when mode ($n_U-k_1'+1$, $2^{\mu_{PUCCH}-}$ $\mu^{PDCCH}$). In some cases, a first set of PDCCH slots are included in the first results 505-*e* in a first case 520-*e* while a second set of PDCCH slots are not included in the first results 505-*e* in a second case 525-*e*.

In some cases, the wireless device may determine a set of PMOs in the set of PDCCH slots from the first results 505-*e*. For example, the wireless device may consider the PMOs that are configured to schedule the PDSCH component carrier (i.e., scheduled component carrier). In some examples, the wireless device may determine the feedback codebook based on the set of PMOs (e.g., each place in the codebook corresponds to a PMO). The set of PMOs may be included in second results 510-*e*. In some examples, the wireless device may construct the PMO-based codebook based on the set of PMOs included in the second results 510-*e*.

Figure 11:
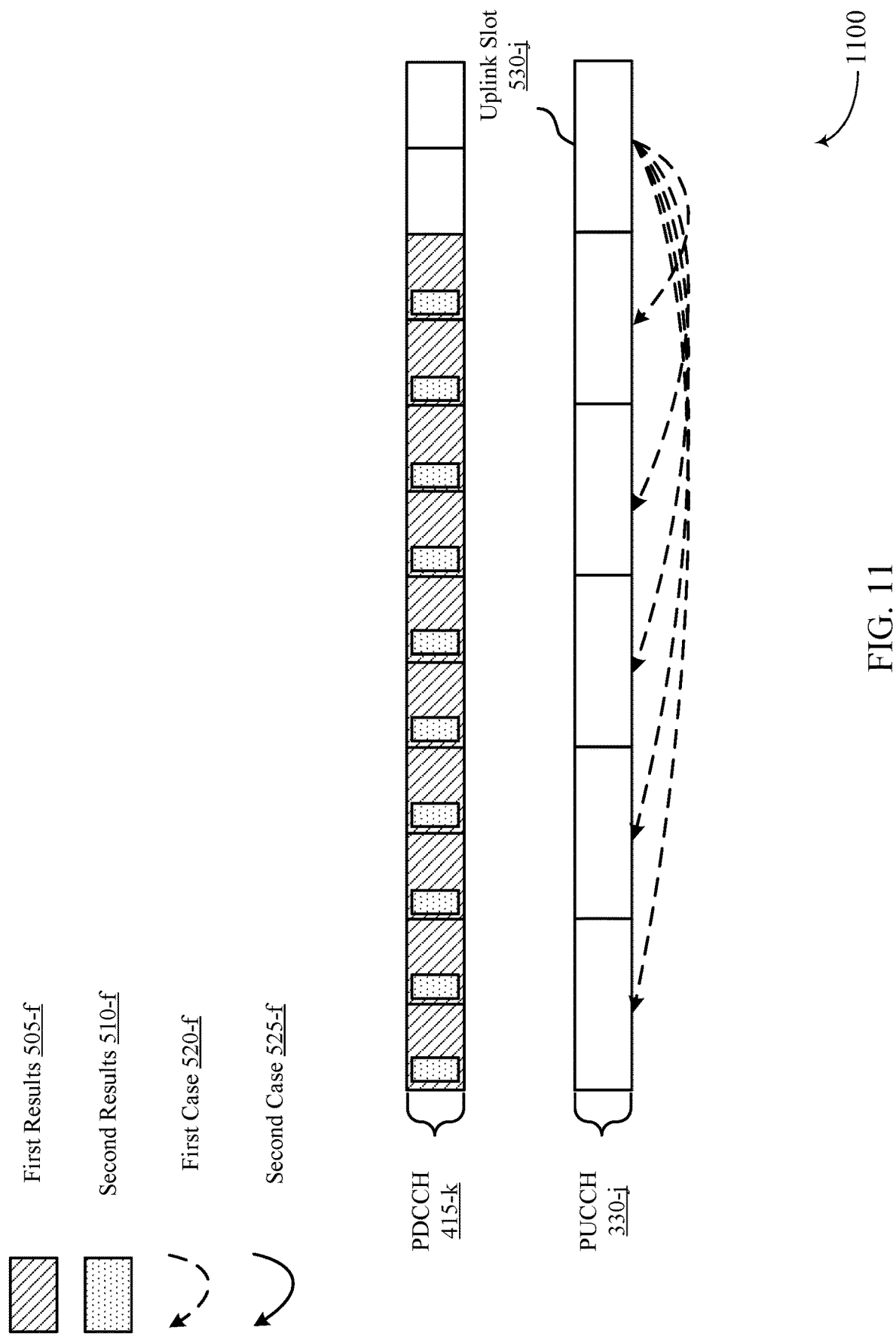
FIG. 11 shows an example of a slot diagram that supports control channel monitoring occasions for different numerologies and sub-slot-based control channels in accordance with one or more aspects of the present disclosure.

FIG. 11 shows an example of a slot diagram 1100 that supports control channel monitoring occasions for different numerologies and sub-slot-based control channels in accordance with one or more aspects of the present disclosure. In some examples, the slot diagram 1100 may implement or be implemented by aspects of the wireless communications system 100, the wireless communications system 200, or both. For example, the slot diagram 1100 may be implemented by a network entity 105 or a UE 115, which may be examples of the corresponding devices as described with reference to FIG. 1 and FIG. 2. The slot diagram 1100 may support semi-static PMO-based feedback codebooks.

In some cases, a wireless device may be configured with a PMO-based codebook type. In some cases, the wireless device may determine that feedback (e.g., HARQ-ACK) is scheduled to be transmitted in an uplink slot 530-*j* of a component carrier of PUCCH 330-*j* associated with a first SCS or numerology (e.g., 60 kHz or $\mu_{PUCCH}=2$). In some examples, the feedback may be transmitted for a scheduled component carrier (e.g., a component carrier of PDSCH). Additionally, or alternatively, the scheduled component carrier may be scheduled by a scheduling component carrier (e.g., a component carrier of PDCCH 415-*k*) associated with a second SCS or numerology (e.g., 120 kHz or $\mu_{PDCCH}=3$). In some cases, the first SCS and the second SCS may be different.

In some cases, an RRC message may configure a set of slot offset values K'$_1$ from PDCCH to HARQ-ACK. In some cases, the wireless device may determine a set of PDCCH slots based on the set of slot offset values K'$_1$, the first SCS, the second SCS, and the uplink slot 530-*j* (e.g., $n_U$). For example, for each k'$_1$ value in the K'$_1$ set, the wireless device may consider PDCCH slots within the PUCCH slots given by $n_U-k'_1$. For example, when K$_1'=\{1, 2, 3, 4, 5\}$, the wireless device may consider the PDCCH slots that overlap with the PUCCH slots given by $n_U-1$, $n_U-2$, etc.

In some cases, the first SCS may be smaller than the second SCS (i.e., $\mu_{PUCCH}<\mu_{PDCCH}$). In such cases, a PUCCH slot may contain a number of PDCCH slots. In some cases, first results 505-*f* may include a PDCCH slot when the PUCCH slot given by $n_U-k'_1$ overlaps with the PDSCH slot. In some cases, a first set of PDCCH slots are included in the first results 505-*f* in a first case 520-*f* while a second set of PDCCH slots are not included in the first results 505-*f* in a second case 525-*f*.

In some cases, the wireless device may determine a set of PMOs in the set of PDCCH slots from the first results 505-*f*. For example, the wireless device may consider the PMOs that are configured to schedule the PDSCH component carrier (i.e., scheduled component carrier). In some examples, the wireless device may determine the feedback codebook based on the set of PMOs (e.g., each place in the codebook corresponds to a PMO). The set of PMOs may be included in second results 510-*f*. In some examples, the wireless device may construct the PMO-based codebook based on the set of PMOs included in the second results 510-*f*.

Figure 12:
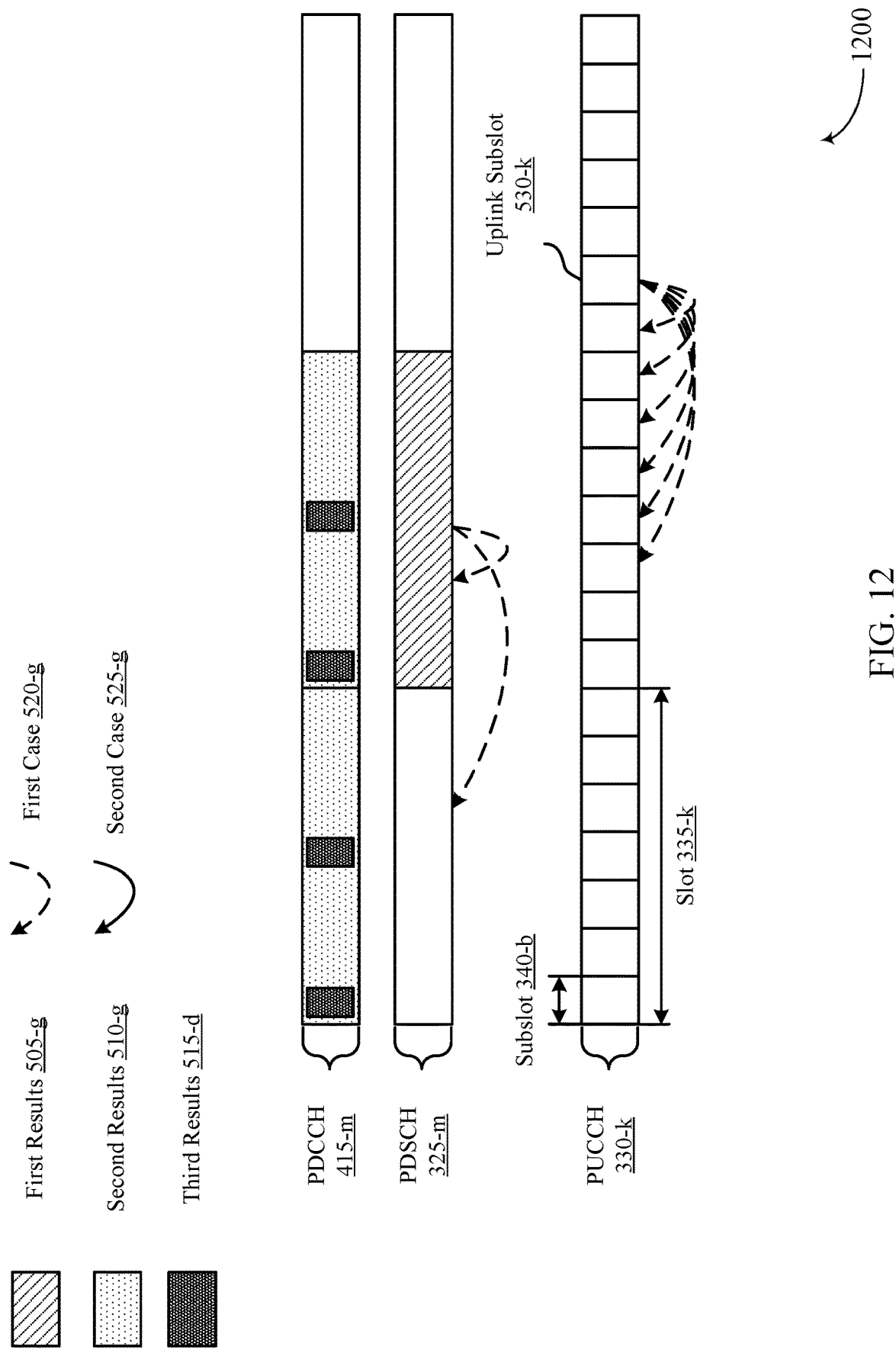
FIG. 12 shows an example of a slot diagram that supports control channel monitoring occasions for different numerologies and sub-slot-based control channels in accordance with one or more aspects of the present disclosure.

FIG. 12 shows an example of a slot diagram 1200 that supports control channel monitoring occasions for different numerologies and sub-slot-based control channels in accordance with one or more aspects of the present disclosure. In some examples, the slot diagram 1200 may implement or be implemented by aspects of the wireless communications system 100, the wireless communications system 200, or both. For example, the slot diagram 1200 may be implemented by a network entity 105 or a UE 115, which may be examples of the corresponding devices as described with reference to FIG. 1 and FIG. 2. The slot diagram 1200 may support semi-static PMO-based feedback codebooks.

In some cases, a wireless device may be configured with a PMO-based codebook type. In some cases, the wireless device may determine that feedback (e.g., HARQ-ACK) is scheduled to be transmitted in an uplink subslot 530-*k* of a component carrier of PUCCH 330-*k*, where subslot-based PUCCH may be configured. For example, the PUCCH 330-*k* may include a slot 335-*k* which includes a subslot 340-*b* (e.g., with a subslot length of 2 symbols). For example, the wireless device (e.g., a UE) may receive, in a first time slot, a DCI message indicating a first time subslot (e.g., the uplink subslot 530-*k*) for the wireless device to transmit feedback according to a codebook size. In some cases, the feedback may be transmitted in the PUCCH 330-*k* associated with a PDSCH 325-*m* scheduled by a PDCCH 415-*m*. In some cases, the PUCCH 330-*k* may be scheduled as time subslots and both the PDSCH 325-*m* and the PDCCH 415-*m* are scheduled as time slots.

In some examples, the component carrier of PDCCH 415-*m* and the component carrier of PDSCH 325-*m* may be the same (e.g., self-scheduling). Additionally, or alternatively, component carrier of the PDCCH 415-*m* and the component carrier of the PDSCH 325-*m* may be different. In some cases, the PUCCH 330-*k*, the PDSCH 325-*m*, and the PDCCH 415-*m* may have a same SCS (e.g., 30 kHz).

In some cases, the wireless device (e.g., the UE) may monitor a set of one or more PMOs within at least a subset of a first number of time slots that occur before the first time subslot based on a mapping between the PUCCH 330-*k*, the PDSCH 325-*m*, and the PDCCH 415-*m* in accordance with the PUCCH being scheduled as time subslots. In some examples, the wireless device may determine a set of PDSCH slots based on a set of subslot offset values K$_1$ and the uplink subslot 530-*k* (i.e., $n_U$).

In some cases, for each k$_1$ value in the K$_1$ set, the wireless device may consider the PDSCH slots which within a PUCCH subslot k$_1$ subslots before the uplink subslot 530-*k* (i.e., $n_U-k_1$). For example, when K$_1=\{2, 3, 4, 5, 6\}$, the wireless device may consider the PDSCH slots that overlap with the PUCCH subslots given by $n_U-1$, $n_U-2$, etc. In some cases, a first set of PUCCH subslots are included in the first results 505-*g* in a first case 520-*g* while a second set of PUCCH subslots are not included in the first results 505-*g* in a second case 525-*g*.

In some cases, the wireless device may determine a set of PDCCH slots based on a set of slot offset values K$_0$ and the first results 505-*g* (e.g., the set of PDSCH slots). For example, for each pair of k$_0$ values in the K$_0$ set and PDSCH slot (i.e., $n_{PDSCH}$) of the set of PDSCH slots, the wireless device may consider the PDCCH slots that overlap with the PDSCH slots given by $n_{PDSCH}$–$k_0$. For example, when $K_0$={0, 1}, the wireless device may consider the PDCCH slots that overlap with the PDSCH slots given by $n_{PDSCH}$–0 and $n_{PDSCH}$–1.

In some cases, the PDCCH 415-$m$ and the PDSCH 325-$m$ may be associated with different SCSs. In such cases, methods illustrated by the examples of FIGS. 5, 6, and 7 may be implemented. In some cases, second results 510-$g$ may include a PDCCH slot when the PDSCH slot given by $n_{PDSCH}$–$k_0$ overlaps with the PDCCH slot. In some cases, a first set of PDSCH slots are included in the second results 510-$g$ in a first case 520-$g$ while a second set of PDSCH slots are not included in the second results 510-$g$ in a second case 525-$g$.

In some cases, PDCCH slots may be determined for multiple pairs (e.g., pairs of ($n_{PDSCH}$, $K_0$)). In such cases, the set of PDCCH slots in the second results 510-$g$ may include the unique PDCCH slots based on considering all pairs (e.g., removing repetitions). In some cases, the wireless device may determine a set of PMOs in the set of PDCCH slots from the second results 510-$g$. For example, the wireless device may consider the PMOs that are configured to schedule the PDSCH component carrier (i.e., scheduled component carrier). In some examples, the wireless device may determine the feedback codebook based on the set of PMOs (e.g., each place in the codebook corresponds to a PMO). The set of PMOs may be included in third results 515-$d$.

In some cases, the DCI message may not schedule PDSCH. For example, the DCI message may have a corresponding HARQ-ACK such as an SPS release DCI, SCell dormancy, a TCI state change, or the like. In such cases, $k_1$ may correspond to a slot offset from a PDCCH slot to a HARQ-ACK or PUCCH subslot. In some cases, the set of PDSCH slots may be determined if $k_0$=0 is included in the $K_0$ set. However, this may not address cases in which the second SCS and the third SCS are different. Accordingly, a wireless device may determine the set of PDCCH slots based on the slot offset values $K_1$, where $K_1$ corresponds to slot offset values from PDCCH to HARQ-ACK.

In some examples, the wireless device may construct the PMO-based codebook based on the set of PMOs included in the third results 515-$d$. In some cases, the wireless device (e.g., the UE) may transmit the feedback according to the codebook size in the first time subslot (e.g., the uplink subslot 530-$k$) in response to the DCI message. In some cases, the codebook size of the feedback may be based on a number of the set of one or more PMOs (e.g., the second results 510-$g$) that occur within at least the subset of the first number of time slots (e.g., the first results 505-$g$).

Figure 13:
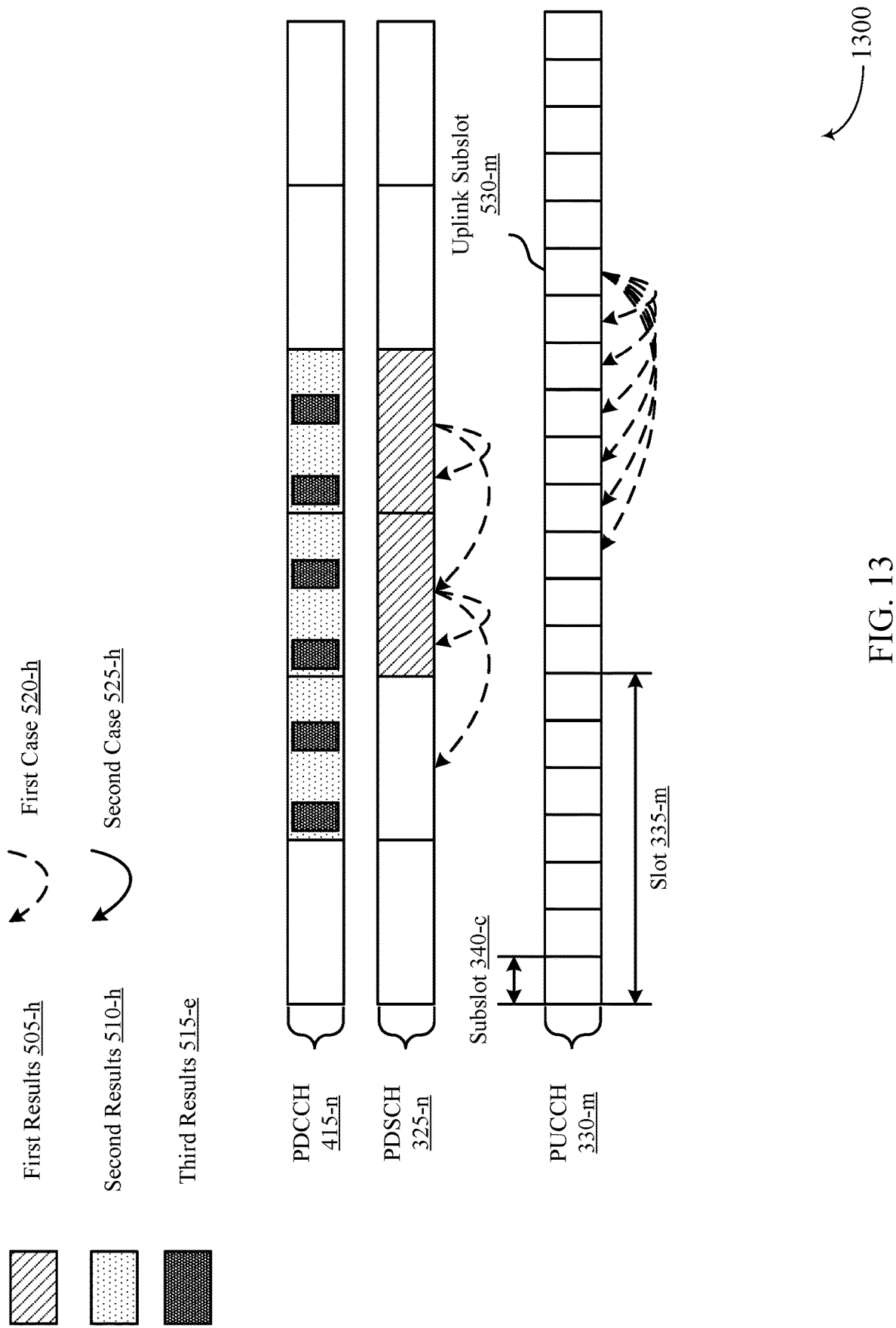
FIG. 13 shows an example of a slot diagram that supports control channel monitoring occasions for different numerologies and sub-slot-based control channels in accordance with one or more aspects of the present disclosure.

FIG. 13 shows an example of a slot diagram 1300 that supports control channel monitoring occasions for different numerologies and sub-slot-based control channels in accordance with one or more aspects of the present disclosure. In some examples, the slot diagram 1300 may implement or be implemented by aspects of the wireless communications system 100, the wireless communications system 200, or both. For example, the slot diagram 1300 may be implemented by a network entity 105 or a UE 115, which may be examples of the corresponding devices as described with reference to FIG. 1 and FIG. 2. The slot diagram 1300 may support semi-static PMO-based feedback codebooks.

In some cases, a wireless device may be configured with a PMO-based codebook type. In some cases, the wireless device may determine that feedback (e.g., HARQ-ACK) is scheduled to be transmitted in an uplink subslot 530-$m$ of a component carrier of PUCCH 330-$m$ where subslot-based PUCCH may be configured. For example, the PUCCH 330-$m$ may include a slot 335-$m$ which includes a subslot 340-$c$ (e.g., with a subslot length of 2 symbols).

In some examples, the component carrier of PDCCH 415-$n$ and the component carrier of PDSCH 325-$n$ may be the same (e.g., self-scheduling). Additionally, or alternatively, component carrier of the PDCCH 415-$n$ and the component carrier of the PDSCH 325-$n$ may be different. In some cases, the PDSCH 325-$n$ and the PDCCH 415-$n$ may have a same SCS (e.g., 30 kHz) while the PCCH may have a different SCS (e.g., 15 kHz). In some cases, the PMO-based codebook may be determined based on the subslot configuration, but not based on the different SCSs of the PUCCH 330-$m$, the PDSCH 325-$n$, or the PDCCH 415-$n$.

In some examples, the wireless device may determine a set of PDSCH slots based on a set of slot offset values $K_1$ and the uplink subslot 530-$m$ (i.e., $n_U$). In some cases, for each $k_1$ value in the $K_1$ set, the wireless device may consider the PDSCH slots which within a PUCCH subslot $k_1$ subslots before the uplink subslot 530-$m$ (i.e., $n_U$–$k_1$). For example, when $K_1$={2, 3, 4, 5, 6}, the wireless device may consider the PDSCH slots that overlap with the PUCCH subslots given by $n_U$–1, $n_U$–2, etc. In some cases, a first set of PUCCH subslots are included in the first results 505-$h$ in a first case 520-$h$ while a second set of PUCCH subslots are not included in the first results 505-$h$ in a second case 525-$h$.

In some cases, the wireless device may determine a set of PDCCH slots based on a set of slot offset values $K_0$ and the first results 505-$h$ (e.g., the set of PDSCH slots). For example, for each pair of $k_0$ values in the $K_0$ set and PDSCH slot (i.e., $n_{PDSCH}$) of the set of PDSCH slots, the wireless device may consider the PDCCH slots that overlap with the PDSCH slots given by $n_{PDSCH}$–$k_0$. For example, when $K_0$={0, 1}, the wireless device may consider the PDCCH slots that overlap with the PDSCH slots given by $n_{PDSCH}$–0 and $n_{PDSCH}$–1. In some cases, the PDCCH 415-$n$ and the PDSCH 325-$n$ may be associated with different SCSs. In such cases, methods illustrated by the examples of FIGS. 5, 6, and 7 may be implemented.

In some cases, second results 510-$h$ may include a PDCCH slot when the PDSCH slot given by $n_{PDSCH}$–$k_0$ overlaps with the PDCCH slot. In some cases, a first set of PDSCH slots are included in the second results 510-$h$ in a first case 520-$h$ while a second set of PDSCH slots are not included in the second results 510-$h$ in a second case 525-$h$. In some cases, PDCCH slots may be determined for multiple pairs (e.g., pairs of ($n_{PDSCH}$, $k_0$)). In such cases, the set of PDCCH slots in the second results 510-$h$ may include the unique PDCCH slots based on considering all pairs (e.g., removing repetitions).

In some cases, the wireless device may determine a set of PMOs in the set of PDCCH slots from the second results 510-$h$. For example, the wireless device may consider the PMOs that are configured to schedule the PDSCH component carrier (i.e., scheduled component carrier). In some examples, the wireless device may determine the feedback codebook based on the set of PMOs (e.g., each place in the codebook corresponds to a PMO). The set of PMOs may be included in third results 515-$e$. In some examples, the wireless device may construct the PMO-based codebook based on the set of PMOs included in the third results 515-$e$.

Figure 14:
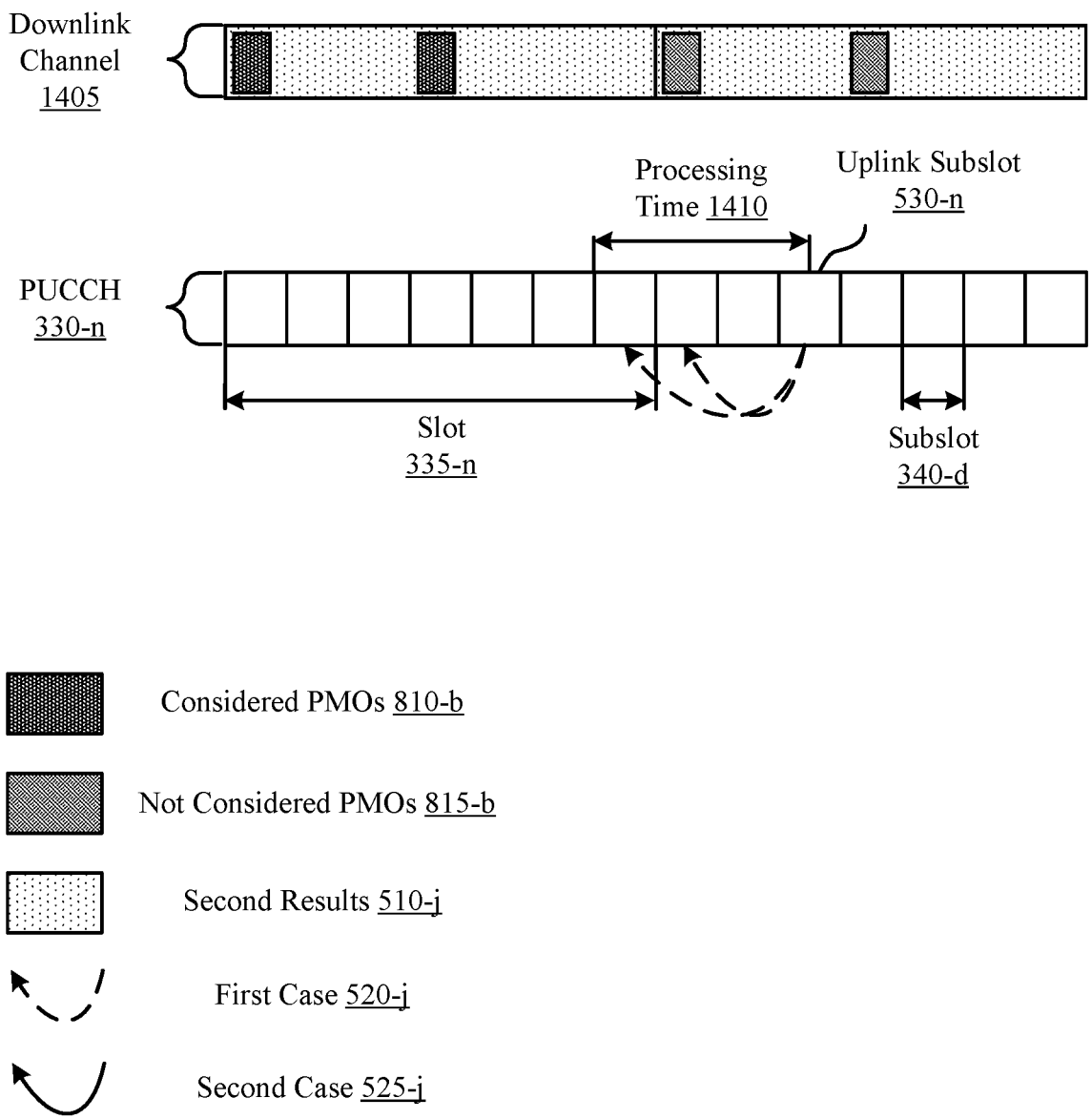
FIG. 14 shows an example of a slot diagram that supports control channel monitoring occasions for different numerologies and sub-slot-based control channels in accordance with one or more aspects of the present disclosure.

FIG. 14 shows an example of a slot diagram 1400 that supports control channel monitoring occasions for different numerologies and sub-slot-based control channels in accordance with one or more aspects of the present disclosure. In some examples, the slot diagram 1400 may implement or be implemented by aspects of the wireless communications system 100, the wireless communications system 200, or both. For example, the slot diagram 1400 may be implemented by a network entity 105 or a UE 115, which may be examples of the corresponding devices as described with reference to FIG. 1 and FIG. 2. The slot diagram 1400 may support semi-static PMO-based feedback codebooks.

In some cases, a wireless device may determine a set of PMOs in a downlink channel 1405 (e.g., PDCCH or PDSCH). For example, the wireless device may be configured to transmit feedback (e.g., HARQ-ACK) in an uplink subslot 530-$n$ of a component carrier of PUCCH 330-$n$. In some cases, the PUCCH 330-$n$ may be configured with subslots. For example, PUCCH 330-$n$ may include a slot 335-$n$ which includes a number of subslots (e.g., a subslot 340-$d$).

In some examples, the wireless device may determine a set of PDSCH slots based on a set of slot offset values $K_1$ and the uplink subslot 530-$n$ (i.e., $n_U$). In some cases, for each $k_1$ value in the $K_1$ set, the wireless device may consider the PDSCH slots which within a PUCCH subslot $k_1$ subslots before the uplink subslot 530-$n$ (i.e., $n_U$-$k_1$). For example, when $K_1=\{2, 3\}$, the wireless device may consider the PDSCH slots that overlap with the PUCCH subslots given by $n_U$-2, $n_U$-3, etc. In some cases, a first set of PUCCH subslots may be included in first results in a first case 520-$j$ while a second set of PUCCH subslots are not included in the first results in a second case 525-$j$.

In some cases, for a given $k_1$ value, the PDSCH slot may be considered when a last symbol of at least one candidate SLIV overlaps with the PUCCH sub-slot given by $n_U$-$k_1$. For example, a PDSCH slot which overlaps with the PUCCH sub-slot given by $n_U$-$k_1$ may not be considered when the last symbol of at least one candidate SLIV does not overlap with the PUCCH sub-slot. For example, the wireless device (e.g., a UE) may select a subset of PDSCH slots from the overlapping slots based on the last symbol of one candidate SLIV of the overlapping slots overlapping with a corresponding subslot of the PUCCH slots given by $n_U$-$k_1$.

In some cases, the PDSCH slot may contain a candidate PDSCH for which feedback (e.g., HARQ-ACK) is reported in the uplink subslot 530-$n$ when the last symbol of the candidate PDSCH overlaps with the PUCCH subslot given by $n_U$-$k_1$. In some examples, the candidate SLIV may represent the candidate PDSCH. For example, a set of SLIVs may be determined based on configured TDRA rows, and the last symbol of a SLIV may correspond to a starting symbol plus length of that SLIV.

In some cases, a wireless device may be configured with a DCI format (e.g., a DCI format 1_2) where a reference for the starting symbol of the SLIV may be the first symbol of the DCI (i.e., rather than a first symbol of a slot). In some cases, the wireless device may determine the set of SLIVs based on a configuration (e.g., referenceOfSLIVDCI-1-2). For example, for each row index with slot offset $K_0$=0 and PDSCH mapping Type B in a set of row indexes of a table for DCI format 1_2, for any PMO in a slot where the wireless device (e.g., the UE) monitors PDCH for DCI format 1_2 and with starting symbol $S_0>0$, if $S+S_0+L\leq 14$ for a first cyclic prefix (e.g., normal cyclic prefix) and $S+S_0+L\leq 12$ for a second cyclic prefix (e.g., extended cyclic prefix), the wireless device may add a new row index in the set of row indexes of the table by replacing the starting symbol S of the row index by $S+S_0$.

In some cases, the wireless device may determine a set of PDCCH slots based on a set of slot offset values $K_0$ and the first results (e.g., the set of PDSCH slots). For example, for each pair of $k_0$ values in the $K_0$ set and PDSCH slot (i.e., $n_{PDSCH}$) of the set of PDSCH slots, the wireless device may consider the PDCCH slots that overlap with the PDSCH slots given by $n_{PDSCH}$-$k_0$. For example, when $K_0=\{0\}$, the wireless device may consider the PDCCH slots that overlap with the PDSCH slots given by $n_{PDSCH}$-0.

However, in some cases, the wireless device may consider a subset of values in the set of slot offset values $K_0$. For example, the set of slot offset values $K_0$ may include a number of values. In some cases, the wireless device may determine a large number of PDCCH slots, and, therefore, a large number of PMOs. In some cases, the large number of PMOs determined by the wireless device may be associated with a large codebook size. In some cases, the large codebook size may result in increased latency and overhead. As described herein, a subset of the set of slot offset values $K_0$ may be fixed (e.g., the wireless device may consider the subset $\{0\}$ or $\{0,1\}$), configured via an RRC message, or the like. For example, an original configuration for the set of slot offset values $K_0$ may include the subset $\{0, 1, 2, 3\}$, but the RRC message may configure the subset $\{0, 1\}$ for subslot based feedback. Additionally, or alternatively, the subset may be based on the subslot length (i.e., 2 symbols, 7 symbols, etc.).

In some cases, second results 510-$j$ may include a PDCCH slot when the PDSCH slot given by $n_{PDSCH}$-$k_0$ overlaps with the PDCCH slot. In some cases, a first set of PDSCH slots are included in the second results 510-$j$ in a first case 520-$j$ while a second set of PDSCH slots are not included in the second results 510-$j$ in a second case 525-$j$. In some cases, PDCCH slots may be determined for multiple pairs (e.g., pairs of ($n_{PDSCH}$, $k_0$)). In such cases, the set of PDCCH slots in the second results 510-$h$ may include the unique PDCCH slots based on considering all pairs (e.g., removing repetitions).

In some cases, the wireless device may determine a set of PMOs in the set of PDCCH slots from the second results 510-$j$. For example, the wireless device may consider the PMOs that are configured to schedule the PDSCH component carrier (i.e., scheduled component carrier). In some examples, the wireless device may determine the feedback codebook based on the set of PMOs (e.g., each place in the codebook corresponds to a PMO). The set of PMOs may be included in third results. In some cases, the set of PMOs may include a set of considered PMOs 810-$b$ and a set of not considered PMOs 815-$b$.

In some examples, a PMO in the set of PMOs may be considered when the last symbol of the PMO is separated from the uplink subslot 530-$n$ (or the last symbol of the uplink subslot 530-$n$) by at least a processing time 1410. In some cases, a PMO in the set of PMOs may not be considered (e.g., when the last symbol of the PMO is not separated from the uplink subslot 530-$n$ by at least the processing time 1410). For example, the processing time 1410 may be a threshold processing time associated with the wireless device (e.g., a minimum processing time for PDSCH). In some cases, the processing time 1410 may be based on a capability of the wireless device or an SCS of the PUCCH 330-$n$ or an SCS of the downlink channel 1405 (e.g., PDSCH, PDCCH). In some examples, the wireless device may construct the PMO-based codebook based on the set of PMOs in the considered PMOs 810-$b$.

Figure 15A:
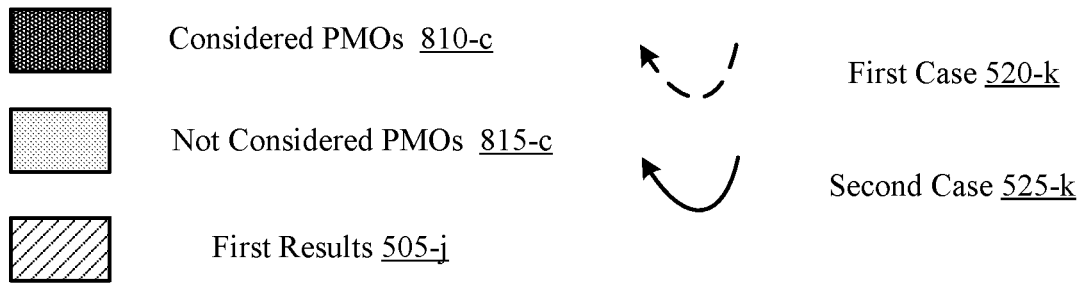
FIGS. 15A and 15B show examples of slot diagrams that support control channel monitoring occasions for different numerologies and sub-slot-based control channels in accordance with one or more aspects of the present disclosure.
Figure 15A:
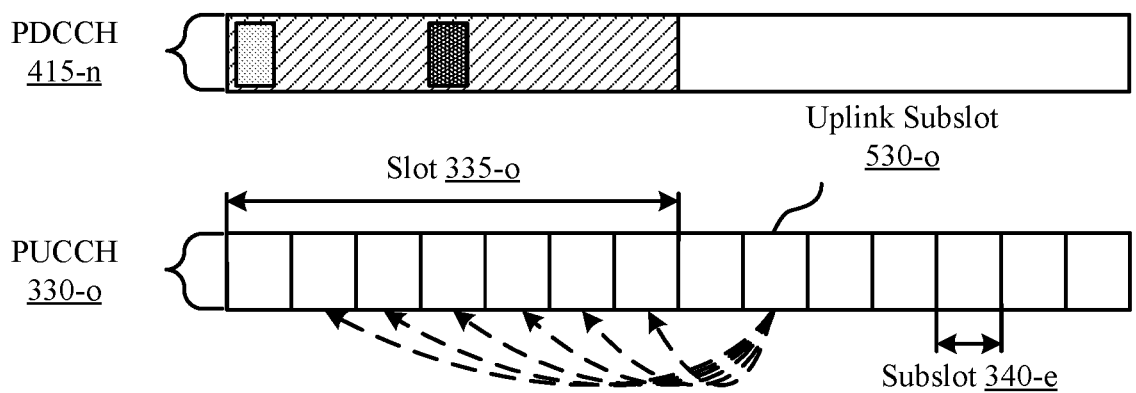
Figure 15B:
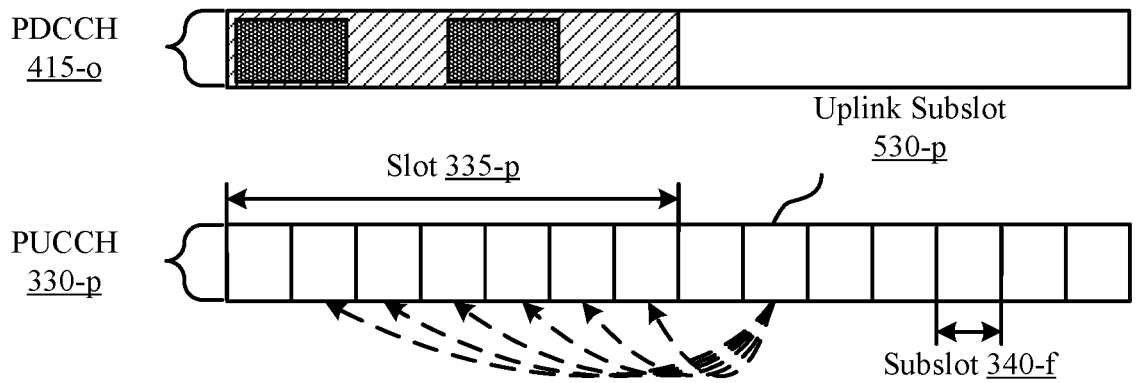

FIGS. 15A and 15B each show examples of a slot diagram 1500 that supports control channel monitoring occasions for different numerologies and sub-slot-based control channels in accordance with one or more aspects of the present disclosure. In some examples, the slot diagrams 1500 (e.g., a slot diagram 1500-$a$ and a slot diagram 1500-$b$) may implement or be implemented by aspects of the wireless communications system 100, the wireless communications system 200, or both. For example, the slot diagrams 1500 may each be implemented by a network entity 105 or a UE 115, which may be examples of the corresponding devices as described with reference to FIG. 1 and FIG. 2. The slot diagrams 1500 may support semi-static PMO-based feedback codebooks.

In some cases, a wireless device may be configured with a PMO-based codebook type. For example, as illustrated in the example of FIG. 15A, the wireless device may determine that feedback (e.g., HARQ-ACK) is scheduled to be transmitted in an uplink subslot 530-$o$ of a component carrier of PUCCH 330-$o$ where subslot-based PUCCH may be configured. For example, the PUCCH 330-$o$ may include a slot 335-$o$ which includes a subslot 340-$e$ (e.g., with a subslot length of 2 symbols). In some examples, a component carrier of PDCCH 415-$n$ and the component carrier of the PUCCH 330-$o$ may be the same (e.g., 30 kHz).

In some cases, an RRC message may configure a set of subslot offset values $K'_1$ from PDCCH to HARQ-ACK. In some cases, the wireless device may determine a set of PDCCH slots based on the set of subslot offset values $K'_1$ and the uplink sub-slot 530-$o$ (e.g., $n_U$). For example, for each $k_1$ value in the $K'_1$ set, the wireless device may consider PDCCH slots that overlap the PUCCH subslots given by $n_U-k_1$. For example, when $K_1=\{2, 3, 4, 5, 6, 7\}$, the wireless device may consider the PDCCH slots that overlap with the PUCCH subslots given by $n_U-2$, $n_U-3$, etc.

In some cases, first results 505-$j$ may include a PDCCH slot when the PUCCH slot given by $n_U-k'_1$ overlaps with the PDCCH slot. In some cases, a first set of PDCCH slots are included in the first results 505-$j$ in a first case 520-$k$ while a second set of PDCCH slots are not included in the first results 505-$j$ in a second case 525-$k$. In some cases, the wireless device may determine a set of PMOs in the set of PDCCH slots from the first results 505-$j$. For example, the wireless device may consider the PMOs that are configured to schedule the PDSCH component carrier (i.e., scheduled component carrier). In some examples, the wireless device may determine the feedback codebook based on the set of PMOs (e.g., each place in the codebook corresponds to a PMO).

In some cases, the wireless device may jointly consider the PDCCH slots given by $n_U-k_1$ and the set of PMOs in the PDCCH slots. For example, the wireless device may consider a PMO in a PDCCH slot overlapping with a PUCCH subslot given by $n_U-k'_1$. For example, the wireless device may consider the PMO based on the last symbol of the PMO overlapping with the PUCCH subslot given by $n_U-k_1$. In some cases, the wireless device may not consider the PMO based on the last symbol of the PMO not overlapping with the PUCCH subslot given by $n_U-k'_1$.

In some cases, the wireless device may identify slots of the PDCCH 415-$n$ which overlap with the PUCCH subslot given by $n_U-k'_1$ and include a last symbol of a PMO which overlaps with the PUCCH subslot (e.g., considered PMOs 810-$c$). Additionally, or alternatively, the wireless device may identify slots of the PDCCH 415-$n$ which overlap with the PUCCH subslot given by $n_U-k'_1$ and do not include a last symbol of a PMO which overlaps with the PUCCH subslot (e.g., not considered PMOs 815-$c$). For example, the PMO may be one symbol length, a CORESET may have one symbol, or both.

Additionally, or alternatively, as illustrated by the example of FIG. 15B, the wireless device may jointly consider the PDCCH slots given by $n_U-k'_1$ and the set of PMOs in the PDCCH slots and identify considered PMOs 810-$c$. In some cases, the considered PMOs 810-$c$ may include the set of PMOs in the PDCCH slots (i.e., the wireless device may not identify the not considered PMOs 815-$c$). For example, the wireless device may determine that feedback (e.g., HARQ-ACK) is scheduled to be transmitted in an uplink subslot 530-$p$ of a component carrier of PUCCH 330-$p$ where subslot-based PUCCH may be configured. For example, the PUCCH 330-$p$ may include a slot 335-$p$ which includes a subslot 340-$f$ (e.g., with a subslot length of 2 symbols).

In some cases, the wireless device may determine a set of PDCCH slots based on a set of subslot offset values $K'_1$ from PDCCH 415-$o$ to HARQ-ACK configured by an RRC message and the uplink subslot 530-$p$ (e.g., $n_U$). For example, for each $k'_1$ value in the $K'_1$ set, the wireless device may consider PDCCH slots that overlap the PUCCH subslots given by $n_U-k_1$. In some cases, first results 505-$j$ may include a PDCCH slot when the PUCCH slot given by $n_U-k'_1$ overlaps with the PDCCH slot.

In some cases, the wireless device may jointly consider the PDCCH slots given by $n_U-k'_1$ and the set of PMOs in the PDCCH slots. For example, the wireless device may consider a PMO in a PDCCH slot overlapping with a PUCCH subslot given by $n_U-k'_1$ where the last symbol of the PMO overlaps with the PUCCH subslot given by $n_U-k'_1$. In some cases, the set of PMOs may include symbols that overlap with the PUCCH subslot given by $n_U-k'_1$. For example, the PMO may be a three symbol PMO, a CORESET may have three symbols, or both. In some examples, the wireless device may construct the PMO-based codebook based on the set of PMOs.

As depicted herein, FIGS. 15A and 15B may have different assumptions. This may change the number of PMOs to be considered based on a CORESET size. For example, in FIG. 15A, only one PMO is considered. While in FIG. 15B, where CORESET duration (or PMO duration) is 3 symbols long, both PMOs may be considered.

Figure 16:
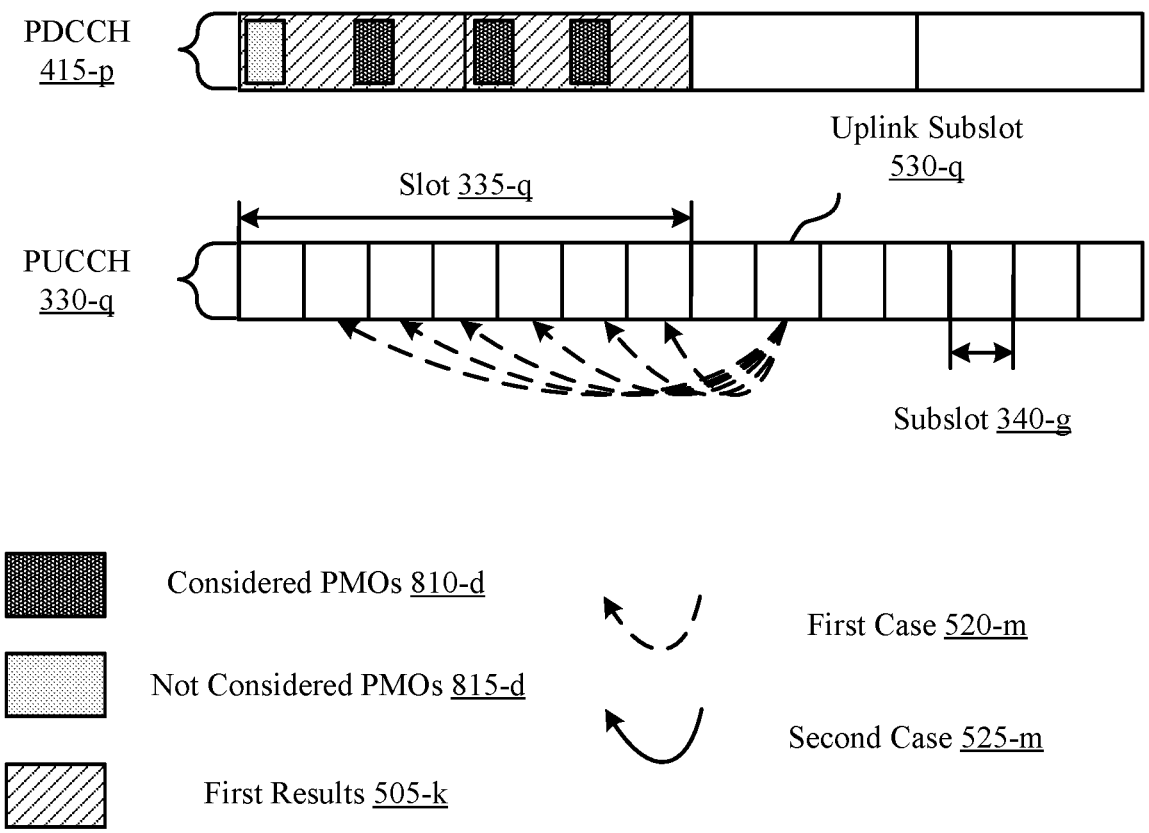
FIG. 16 shows an example of a slot diagram that supports control channel monitoring occasions for different numerologies and sub-slot-based control channels in accordance with one or more aspects of the present disclosure.

FIG. 16 shows an example of a slot diagram 1600 that supports control channel monitoring occasions for different numerologies and sub-slot-based control channels in accordance with one or more aspects of the present disclosure. In some examples, the slot diagram 1600 may implement or be implemented by aspects of the wireless communications system 100, the wireless communications system 200, or both. For example, the slot diagram 1600 may be implemented by a network entity 105 or a UE 115, which may be examples of the corresponding devices as described with reference to FIG. 1 and FIG. 2. The slot diagram 1600 may support semi-static PMO-based feedback codebooks.

In some cases, a wireless device may be configured with a PMO-based codebook type. For example, the wireless device may determine that feedback (e.g., HARQ-ACK) is scheduled to be transmitted in an uplink subslot 530-$q$ of a component carrier of PUCCH 330-$q$ where subslot-based PUCCH may be configured. For example, the PUCCH 330-$q$ may include a slot 335-$q$ which includes a subslot 340-$g$ (e.g., with a subslot length of 2 symbols). In some examples, a component carrier of PDCCH 415-$p$ may be associated with a first SCS (e.g., 30 kHz) and the component carrier of the PUCCH 330-$q$ may be associated with a second SCS (e.g., 15 kHz) where the first SCS and the second SCS are different.

In some cases, an RRC message may configure a set of subslot offset values $K'_1$ from PDCCH to HARQ-ACK. In some cases, the wireless device may determine a set of PDCCH slots based on the set of subslot offset values $K'_1$ and the uplink sub-slot 530-$q$ (e.g., $n_U$). For example, for each $k'_1$ value in the $K'_1$ set, the wireless device may consider PDCCH slots that overlap the PUCCH subslots given by $n_U-k'_1$. For example, when $K_1'=\{2, 3, 4, 5, 6, 7\}$, the wireless device may consider the PDCCH slots that overlap with the PUCCH subslots given by $n_U-2$, $n_U-3$, etc.

In some cases, first results 505-$j$ may include a PDCCH slot when the PUCCH slot given by $n_U-k'_1$ overlaps with the PDCCH slot. In some cases, a first set of PDCCH slots are included in the first results 505-$k$ in a first case 520-$m$ while a second set of PDCCH slots are not included in the first results 505-$k$ in a second case 525-$m$.

In some cases, the wireless device may determine a set of PMOs in the set of PDCCH slots from the first results 505-$k$. For example, the wireless device may consider the PMOs that are configured to schedule the PDSCH component carrier (i.e., scheduled component carrier). In some examples, the wireless device may determine the feedback codebook based on the set of PMOs (e.g., each place in the codebook corresponds to a PMO).

In some cases, the wireless device may jointly consider the PDCCH slots given by $n_U-k'_1$ and the set of PMOs in the PDCCH slots. For example, the wireless device may consider a PMO in a PDCCH slot overlapping with a PUCCH subslot given by $n_U-k'_1$. For example, the wireless device may consider the PMO based on the last symbol of the PMO overlapping with the PUCCH subslot given by $n_U-k_1$.

In some cases, the wireless device may identify slots of the PDCCH 415-$p$ which overlap with the PUCCH subslot given by $n_U-k'_1$ and include a last symbol of a PMO which overlaps with the PUCCH subslot (e.g., considered PMOs 810-$d$). Additionally, or alternatively, the wireless device may identify slots of the PDCCH 415-$p$ which overlap with the PUCCH subslot given by $n_U-k'_1$ and do not include a last symbol of a PMO which overlaps with the PUCCH subslot (e.g., not considered PMOs 815-$d$). For example, the PMO may be one symbol length, a CORESET may have one symbol, or both. In some examples, the wireless device may construct the PMO-based codebook based on the set of PMOs.

Figure 17:
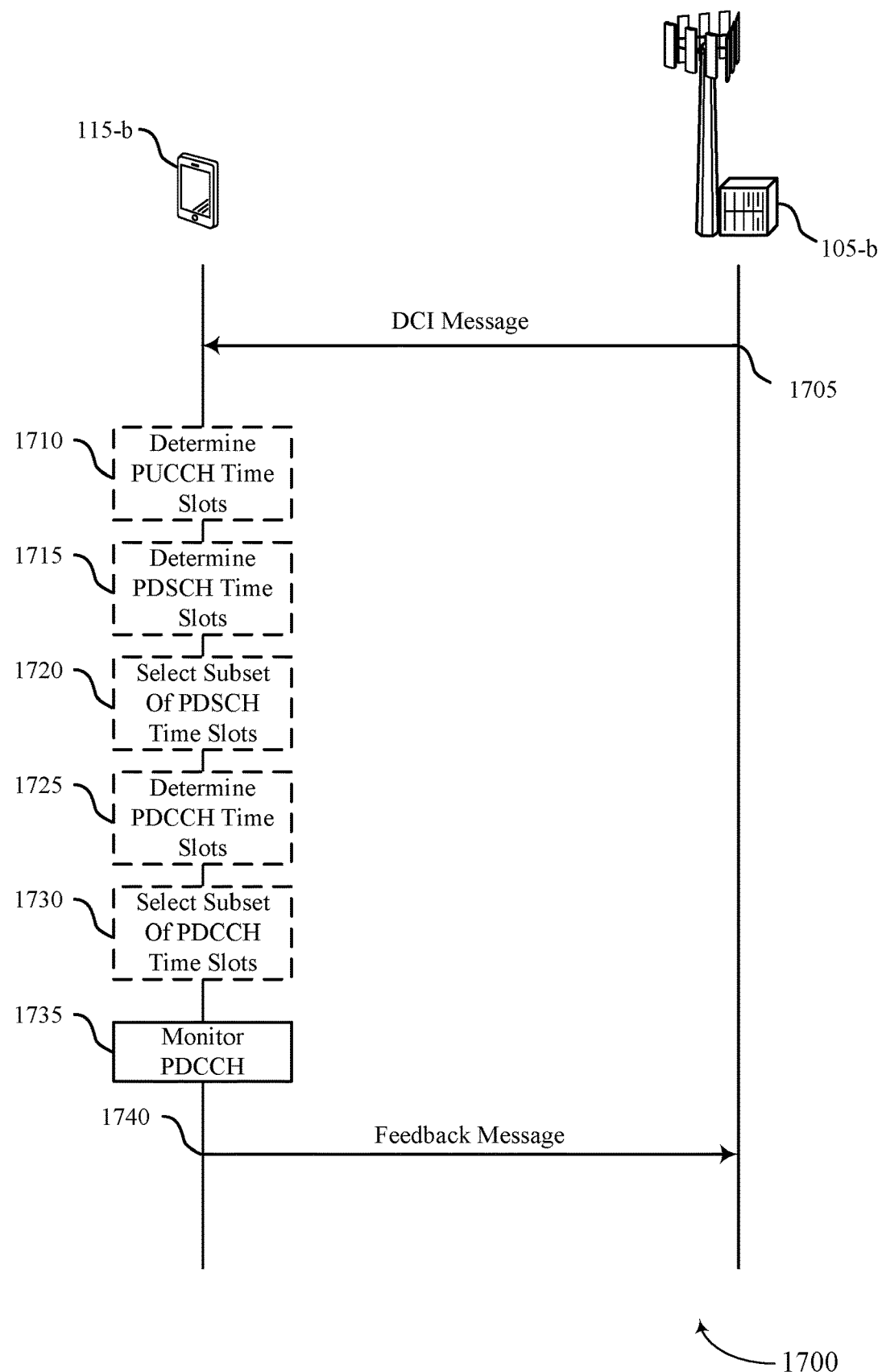
FIG. 17 shows an example of a process flow that supports control channel monitoring occasions for different numerologies and sub-slot-based control channels in accordance with one or more aspects of the present disclosure.

FIG. 17 shows an example of a process flow 1700 that supports control channel monitoring occasions for different numerologies and sub-slot-based control channels in accordance with one or more aspects of the present disclosure. In some examples, the process flow 1700 may implement or be implemented by aspects of the wireless communications system 100, the wireless communications system 200, or both. For example, the process flow 1700 may include a UE 115-$b$ which may be examples of a UE 115 as described with reference to FIGS. 1 and 2. Further, the process flow 1700 may include a network entity 105-$b$ which may be an example of a network entity 105 as described in FIGS. 1 and 2. Alternative examples of the following may be implemented, where some steps are performed in a different order than described or are not performed at all. In some cases, steps may include additional features not mentioned below, or further steps may be added.

At 1705, the UE 115-$b$ may receive a DCI message from the network entity 105-$b$. For example, the UE 115-$b$ may receive the DCI message in a first time slot. In some cases, the DCI message may indicate a second time slot for the UE 115-$b$ to transmit feedback according to a codebook size, wherein the feedback is to be transmitted in a PUCCH associated with a PDSCH scheduled by a PDCCH. In some cases, corresponding SCSs for at least two of the PUCCH, the PDSCH, and the PDCCH are different.

In some cases, the UE 115-$b$ may receive an indication of a number of slot offset values, wherein the first set of one or more PMOs within at least the subset of the number of time slots that occur before the second time slot is based on the number of slot offset values.

At 1710, the UE 115-$b$ may optionally determine PUCCH time slots. For example, the UE 115-$b$ may determine a second number of time slots associated with the PUCCH based on a first set of slot offset values (e.g., $K_1$), wherein the second number of time slots occur before the second time slot. In some cases, the UE 115-$b$ may determine a second number of time slots associated with the PUCCH based on a set of slot offset values (e.g., $K'_1$), wherein the second number of time slots occur before the second time slot.

At 1715, the UE 115-$b$ may optionally determine PDSCH time slots. For example, the UE 115-$b$ may determine a third number of time slots associated with the PDSCH based on the mapping between the PUCCH and the PDSCH in accordance with the corresponding SCS (e.g., $\mu_{PUCCH}$, $\mu_{PDSCH}$).

At 1720, the UE 115-$b$ may optionally select a subset of PDSCH time slots. For example, the UE 115-$b$ may select a subset of the third number of time slots based on the subset of the third number of time slots overlapping with one or more of the second number of time slots.

At 1725, the UE 115-$b$ may optionally determine PDCCH time slots. For example, the UE 115-$b$ may determine the first number of time slots associated with the PDCCH based on a second set of slot offset values associated with the PDSCH (e.g., $K_0$).

At 1730, the UE 115-$b$ may optionally select a subset of PDCCH time slots. For example, the UE 115-$b$ may select at least the subset of the first number of time slots based on at least the subset of the first number of time slots overlapping with one or more of the subset of the third number of time slots. In some cases, the UE 115-$b$ may select at least the subset of the first number of time slots based on a last symbol of at least the subset of the first number of time slots and a first symbol of the third number of time slots associated with the PDSCH being separated by a threshold quantity of symbols. In some cases, an SCS associated with the PDCCH may be less than an SCS associated with the PDSCH.

In some cases, the UE 115-$b$ may select at least the subset of the first number of time slots based on a last symbol of at least the subset of the first number of time slots and a second to last symbol of the third number of time slots associated with the PDSCH being separated by a threshold quantity of symbols. In some cases, the SCS associated with the PDCCH may be greater than the SCS associated with the PDSCH.

In some cases, the UE 115-$b$ may select at least the subset of the first number of time slots based on at least the subset of the first number of time slots overlapping with one or more of the second number of time slots in accordance with the corresponding SCS (e.g., $\mu_{PUCCH}$, $\mu_{PDCCH}$).

At 1735, the UE 115-$b$ may monitor PDCCH. For example, the UE 115-$b$ may monitor a set of one or more PMOs within at least a subset of a first number of time slots that occur before the second time slot based on a mapping between the PUCCH, the PDSCH, and the PDCCH in accordance with a corresponding SCS.

In some cases, the UE 115-$b$ may monitor, via a first component carrier, the set of one or more PMOs within at least the subset of the first number of time slots. Additionally, or alternatively, the UE 115-$b$ may monitor the PDSCH via a second component carrier and the PUCCH via a third component carrier. In some cases, at least two of the first component carrier, the second component carrier, and the third component carrier are associated with different SCSs.

At 1740, the UE 115-b may transmit a feedback message to the network entity 105-b. For example, the UE 115-b may transmit the feedback according to the codebook size in the second time slot in response to the DCI message. In some cases, the codebook size of the feedback is based on a quantity of the set of one or more PMOs that occur within at least the subset of the first number of time slots. In some cases, each entry of the feedback may correspond to a respective PMO of the first set of one or more PMOs.

Figure 18:
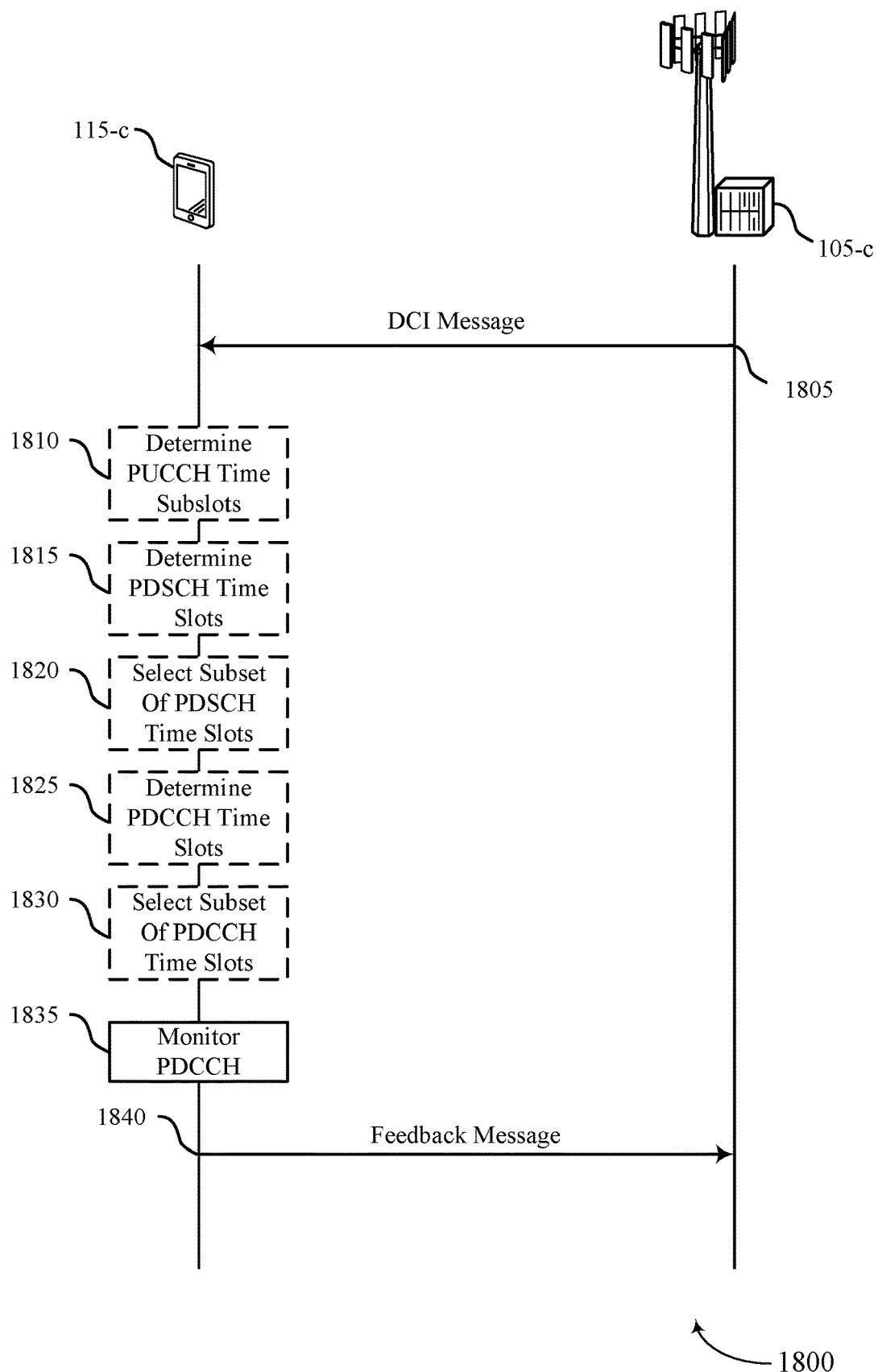
FIG. 18 shows an example of a process flow that supports control channel monitoring occasions for different numerologies and sub-slot-based control channels in accordance with one or more aspects of the present disclosure.

FIG. 18 shows an example of a process flow 1800 that supports control channel monitoring occasions for different numerologies and sub-slot-based control channels in accordance with one or more aspects of the present disclosure. In some examples, the process flow 1800 may implement or be implemented by aspects of the wireless communications system 100, the wireless communications system 200, or both. For example, the process flow 1800 may include a UE 115-c which may be examples of a UE 115 as described with reference to FIGS. 1 and 2. Further, the process flow 1800 may include a network entity 105-c which may be an example of a network entity 105 as described in FIGS. 1 and 2. Alternative examples of the following may be implemented, where some steps are performed in a different order than described or are not performed at all. In some cases, steps may include additional features not mentioned below, or further steps may be added.

At 1805, the UE 115-c may receive a DCI message from the network entity 105-c. For example, the UE 115-c may receive the DCI message in a first time slot. In some cases, the DCI message may indicate a first time subslot for the UE 115-c to transmit feedback according to a codebook size, wherein the feedback is to be transmitted in a PUCCH associated with a PDSCH scheduled by a PDCCH. In some cases, the PUCCH may be scheduled as time subslots and both the PDSCH and the PDCCH may be scheduled as time slots.

In some cases, the UE 115-c may receive, via a control message, an indication of the set of slot offset values. In some cases, the UE 115-c may select a subset of the set of slot offset values to determine the first number of time subslots. In some cases, the UE 115-c may receive an indication of a number of slot offset values, wherein the first set of one or more PMOs within at least the subset of the number of time slots that occur before the time subslot is based on the number of slot offset values.

At 1810, the UE 115-c may optionally determine PUCCH time subslots. For example, the UE 115-c may determine a first number of time subslots associated with the PUCCH based on a set of subslot offset values (e.g., $K_1$), wherein the first number of time subslots occur before the first time subslot. In some cases, the UE 115-c may determine a second number of time slots associated with the PUCCH based on a set of slot offset values (e.g., $K'_1$), wherein the second number of time slots occur before the second time slot.

At 1815, the UE 115-c may optionally determine PDSCH time slots. For example, the UE 115-c may determine a second number of time slots associated with the PDSCH based on the mapping between the PUCCH and the PDSCH in accordance with the PUCCH being scheduled as time subslots.

At 1820, the UE 115-c may optionally select a subset of PDSCH time slots. For example, the UE 115-c may select a subset of the second number of time slots based on the subset of the second number of time slots overlapping with one or more of the first number of time subslots.

At 1825, the UE 115-c may optionally determine PDCCH time slots. For example, the UE 115-c may determine a first number of time slots associated with the PDCCH based on a set of slot offset values (e.g., $K_0$). In some cases, the UE 115-c may determine a first number of time subslots associated with the PUCCH based on a set of subslot offset values (e.g., $K_1$), wherein the first number of time slots occur before the first time subslot.

At 1830, the UE 115-c may optionally select a subset of PDCCH time slots. For example, the UE 115-c may select at least the subset of the first number of time slots based on at least the subset of the first number of time slots overlapping with one or more of the subset of the second number of time slots.

In some cases, the UE 115-c may select at least the subset of the first number of time slots based on a last symbol of at least the subset of the first number of time slots and a last symbol of the first number of time subslots associated with the physical uplink channel being separated by a threshold processing time.

In some cases, the UE 115-c may select at least the subset of the first number of time slots based on a last symbol of at least the subset of the second number of time slots and a last symbol of the first number of time subslots associated with the physical uplink channel being separated by a threshold processing time.

In some cases, the UE 115-c may select at least the subset of the first number of time slots based on a last symbol of at least one candidate start and length indicator of a slot of the second number of time slots overlaps with a corresponding subslot of the first number of time subslots associated with the physical uplink channel.

In some cases, the UE 115-c may select at least the subset of the first number of time slots based on at least the subset of the first number of time slots overlapping with one or more of the subset of the first number of time subslots. In some cases, the selecting may be based on a last symbol of a PMO of the one or more PMOs overlapping with a corresponding time subslot of the first number of time subslots.

At 1835, the UE 115-c may monitor PDCCH. For example, the UE 115-b may monitor a set of one or more PMOs within at least a subset of a first number of time slots that occur before the first time subslot based on a mapping between the PUCCH, the PDSCH, and the PDCCH in accordance with the PUCCH being scheduled as time subslots.

In some cases, the UE 115-c may monitor, via a first component carrier, via a first component carrier, the set of one or more PMOs within at least the subset of the first number of time slots. Additionally, or alternatively, the UE 115-c may monitor the PDSCH via a second component carrier and transmitting the PUCCH via a third component carrier. In some cases, the first component carrier and the second component carrier are same or different.

At 1840, the UE 115-c may transmit a feedback message to the network entity 105-c. For example, the UE 115-c may transmit the feedback according to the codebook size in the first time subslot in response to the DCI message, wherein the codebook size of the feedback is based on a quantity of the set of one or more PMOs that occur within at least the subset of the first number of time slots. In some cases, each entry of the feedback may correspond to a respective PMO of the first set of one or more PMOs.

Figure 19:
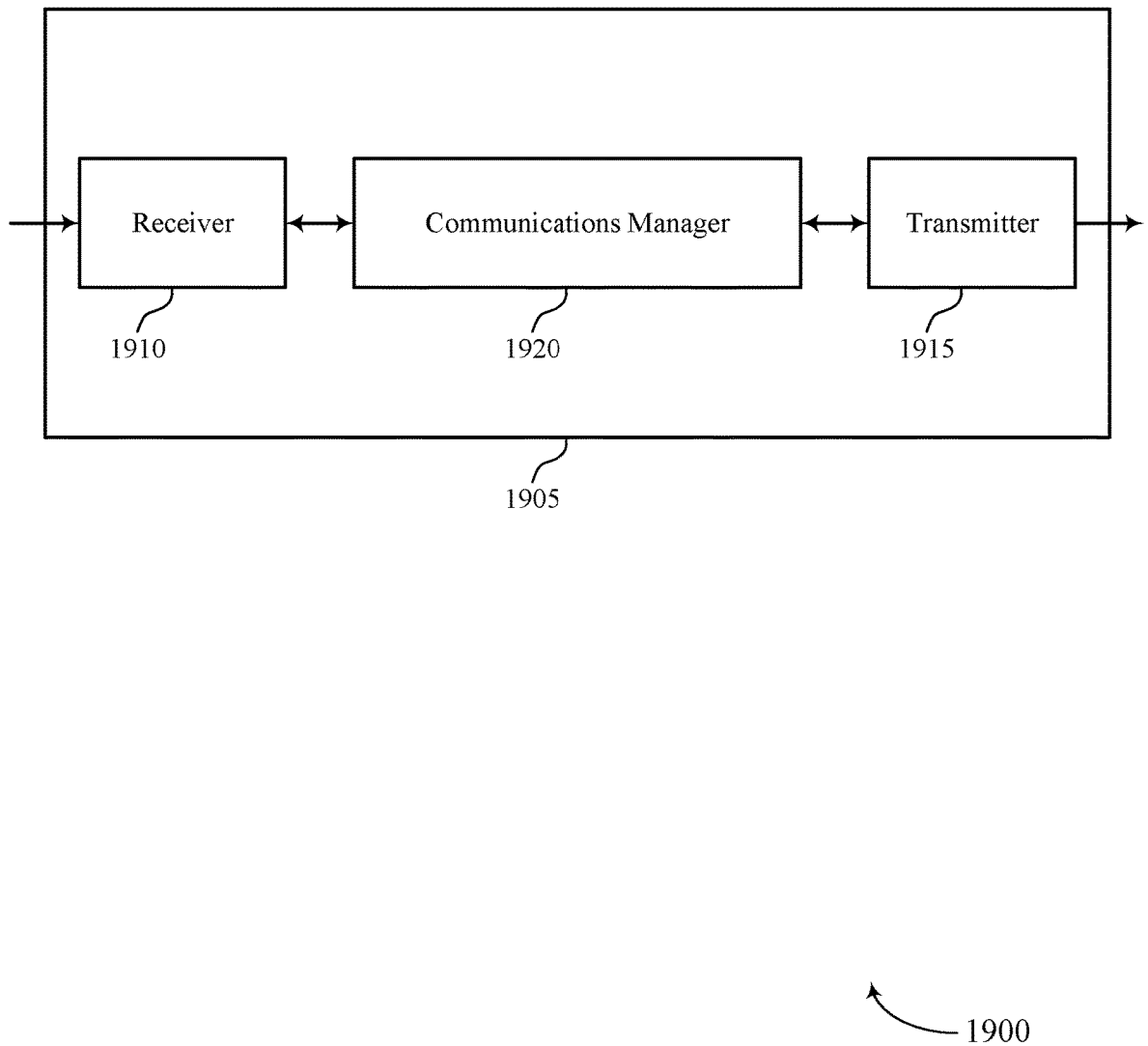
FIGS. 19 and 20 show block diagrams of devices that support control channel monitoring occasions for different numerologies and sub-slot-based control channels in accordance with one or more aspects of the present disclosure.

FIG. 19 shows a block diagram 1900 of a device 1905 that supports control channel monitoring occasions for different numerologies and sub-slot-based control channels in accordance with one or more aspects of the present disclosure. The device 1905 may be an example of aspects of a UE 115 as described herein. The device 1905 may include a receiver 1910, a transmitter 1915, and a communications manager 1920. The device 1905 may also include a processor. Each of these components may be in communication with one another (e.g., via one or more buses).

The receiver 1910 may provide a means for receiving information such as packets, user data, control information, or any combination thereof associated with various information channels (e.g., control channels, data channels, information channels related to control channel monitoring occasions for different numerologies and sub-slot-based control channels). Information may be passed on to other components of the device 1905. The receiver 1910 may utilize a single antenna or a set of multiple antennas.

The transmitter 1915 may provide a means for transmitting signals generated by other components of the device 1905. For example, the transmitter 1915 may transmit information such as packets, user data, control information, or any combination thereof associated with various information channels (e.g., control channels, data channels, information channels related to control channel monitoring occasions for different numerologies and sub-slot-based control channels). In some examples, the transmitter 1915 may be co-located with a receiver 1910 in a transceiver module. The transmitter 1915 may utilize a single antenna or a set of multiple antennas.

The communications manager 1920, the receiver 1910, the transmitter 1915, or various combinations thereof or various components thereof may be examples of means for performing various aspects of control channel monitoring occasions for different numerologies and sub-slot-based control channels as described herein. For example, the communications manager 1920, the receiver 1910, the transmitter 1915, or various combinations or components thereof may support a method for performing one or more of the functions described herein.

In some examples, the communications manager 1920, the receiver 1910, the transmitter 1915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1920, the receiver 1910, the transmitter 1915, or various combinations or components thereof may be implemented in code (e.g., as communications management software or firmware) executed by a processor. If implemented in code executed by a processor, the functions of the communications manager 1920, the receiver 1910, the transmitter 1915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1920 may be configured to perform various operations (e.g., receiving, obtaining, monitoring, outputting, transmitting) using or otherwise in cooperation with the receiver 1910, the transmitter 1915, or both. For example, the communications manager 1920 may receive information from the receiver 1910, send information to the transmitter 1915, or be integrated in combination with the receiver 1910, the transmitter 1915, or both to obtain information, output information, or perform various other operations as described herein.

The communications manager 1920 may support wireless communications at a UE in accordance with examples as disclosed herein. For example, the communications manager 1920 is capable of, configured to, or operable to support a means for receiving, in a first time slot, a DCI message indicating a second time slot for the UE to transmit feedback according to a codebook size, where the feedback is to be transmitted in a PUCCH associated with a PDSCH scheduled by a PDCCH, and where corresponding SCSs for at least two of the PUCCH, the PDSCH, and the PDCCH are different. The communications manager 1920 is capable of, configured to, or operable to support a means for monitoring a set of one or more PMOs within at least a subset of a first set of multiple time slots that occur before the second time slot based on a mapping between the PUCCH, the PDSCH, and the PDCCH in accordance with a corresponding SCS. The communications manager 1920 is capable of, configured to, or operable to support a means for transmitting the feedback according to the codebook size in the second time slot in response to the DCI message, where the codebook size of the feedback is based on a quantity of the set of one or more PMOs that occur within at least the subset of the first set of multiple time slots.

Additionally, or alternatively, the communications manager 1920 may support wireless communications at a UE in accordance with examples as disclosed herein. For example, the communications manager 1920 is capable of, configured to, or operable to support a means for receiving, in a first time slot, a DCI message indicating a first time subslot for the UE to transmit feedback according to a codebook size, where the feedback is to be transmitted in a PUCCH associated with a PDSCH scheduled by a PDCCH, and where the PUCCH is scheduled as time subslots. The communications manager 1920 is capable of, configured to, or operable to support a means for monitoring a set of one or more PMOs within at least a subset of a first set of multiple time slots that occur before the first time subslot based on a mapping between the PUCCH, the PDSCH, and the PDCCH in accordance with the PUCCH being scheduled as time subslots. The communications manager 1920 is capable of, configured to, or operable to support a means for transmitting the feedback according to the codebook size in the first time subslot in response to the DCI message, where the codebook size of the feedback is based on a quantity of the set of one or more PMOs that occur within at least the subset of the first set of multiple time slots.

By including or configuring the communications manager 1920 in accordance with examples as described herein, the device 1905 (e.g., a processor controlling or otherwise coupled with the receiver 1910, the transmitter 1915, the communications manager 1920, or a combination thereof) may support techniques for more efficient utilization of communication resources.

Figure 20:
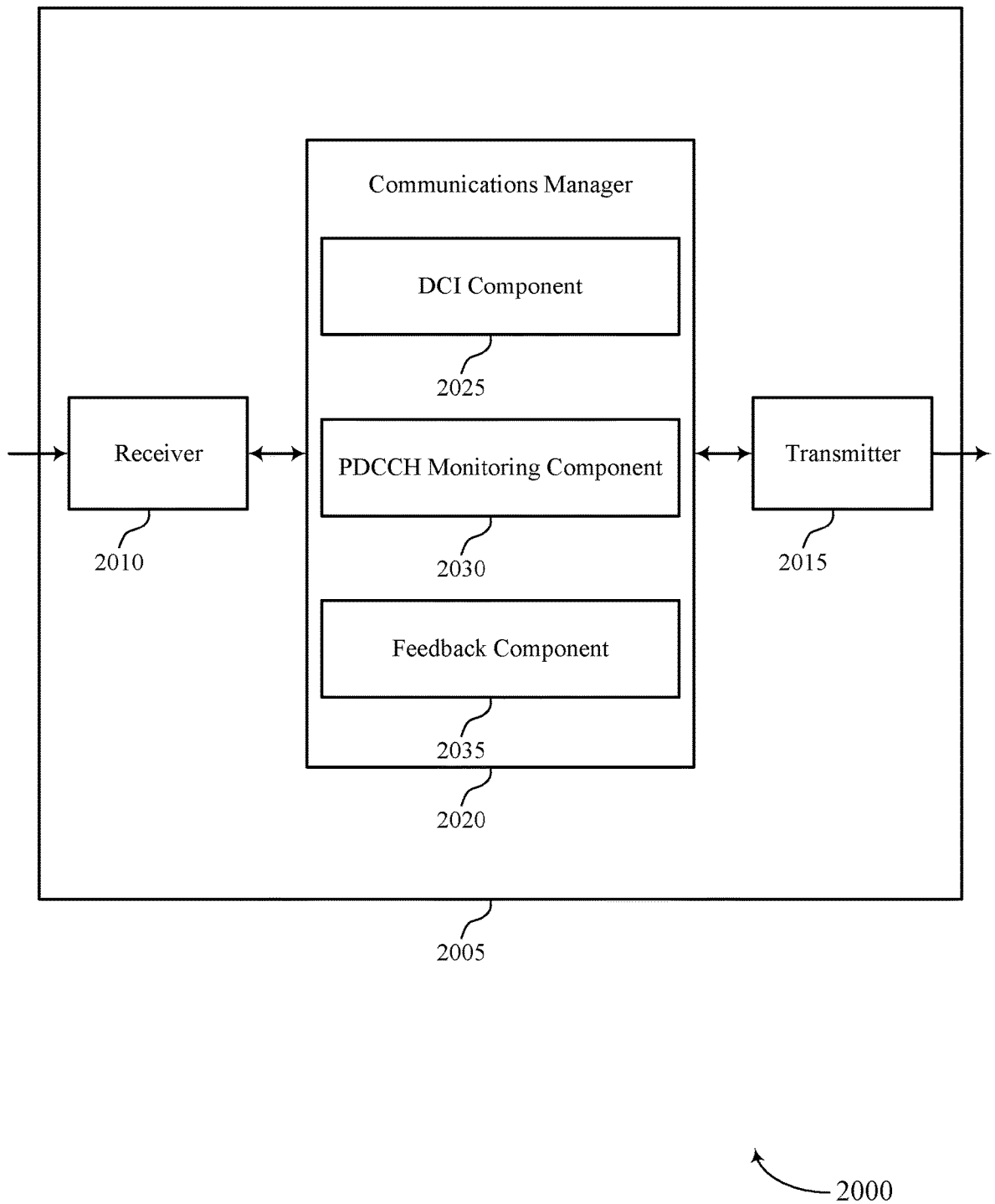

FIG. 20 shows a block diagram 2000 of a device 2005 that supports control channel monitoring occasions for different numerologies and sub-slot-based control channels in accordance with one or more aspects of the present disclosure. The device 2005 may be an example of aspects of a device 1905 or a UE 115 as described herein. The device 2005 may include a receiver 2010, a transmitter 2015, and a communications manager 2020. The device 2005 may also include a processor. Each of these components may be in communication with one another (e.g., via one or more buses).

The receiver 2010 may provide a means for receiving information such as packets, user data, control information, or any combination thereof associated with various information channels (e.g., control channels, data channels, information channels related to control channel monitoring occasions for different numerologies and sub-slot-based control channels). Information may be passed on to other components of the device 2005. The receiver 2010 may utilize a single antenna or a set of multiple antennas.

The transmitter 2015 may provide a means for transmitting signals generated by other components of the device 2005. For example, the transmitter 2015 may transmit information such as packets, user data, control information, or any combination thereof associated with various information channels (e.g., control channels, data channels, information channels related to control channel monitoring occasions for different numerologies and sub-slot-based control channels). In some examples, the transmitter 2015 may be co-located with a receiver 2010 in a transceiver module. The transmitter 2015 may utilize a single antenna or a set of multiple antennas.

The device 2005, or various components thereof, may be an example of means for performing various aspects of control channel monitoring occasions for different numerologies and sub-slot-based control channels as described herein. For example, the communications manager 2020 may include a DCI component 2025, a PDCCH monitoring component 2030, a feedback component 2035, or any combination thereof. The communications manager 2020 may be an example of aspects of a communications manager 1920 as described herein. In some examples, the communications manager 2020, or various components thereof, may be configured to perform various operations (e.g., receiving, obtaining, monitoring, outputting, transmitting) using or otherwise in cooperation with the receiver 2010, the transmitter 2015, or both. For example, the communications manager 2020 may receive information from the receiver 2010, send information to the transmitter 2015, or be integrated in combination with the receiver 2010, the transmitter 2015, or both to obtain information, output information, or perform various other operations as described herein.

The communications manager 2020 may support wireless communications at a UE in accordance with examples as disclosed herein. The DCI component 2025 is capable of, configured to, or operable to support a means for receiving, in a first time slot, a DCI message indicating a second time slot for the UE to transmit feedback according to a codebook size, where the feedback is to be transmitted in a PUCCH associated with a PDSCH scheduled by a PDCCH, and where corresponding SCSs for at least two of the PUCCH, the PDSCH, and the PDCCH are different. The PDCCH monitoring component 2030 is capable of, configured to, or operable to support a means for monitoring a set of one or more PMOs within at least a subset of a first set of multiple time slots that occur before the second time slot based on a mapping between the PUCCH, the PDSCH, and the PDCCH in accordance with a corresponding SCS. The feedback component 2035 is capable of, configured to, or operable to support a means for transmitting the feedback according to the codebook size in the second time slot in response to the DCI message, where the codebook size of the feedback is based on a quantity of the set of one or more PMOs that occur within at least the subset of the first set of multiple time slots.

Additionally, or alternatively, the communications manager 2020 may support wireless communications at a UE in accordance with examples as disclosed herein. The DCI component 2025 is capable of, configured to, or operable to support a means for receiving, in a first time slot, a DCI message indicating a first time subslot for the UE to transmit feedback according to a codebook size, where the feedback is to be transmitted in a PUCCH associated with a PDSCH scheduled by a PDCCH, and where the PUCCH is scheduled as time subslots. The PDCCH monitoring component 2030 is capable of, configured to, or operable to support a means for monitoring a set of one or more PMOs within at least a subset of a first set of multiple time slots that occur before the first time subslot based on a mapping between the PUCCH, the PDSCH, and the PDCCH in accordance with the PUCCH being scheduled as time subslots. The feedback component 2035 is capable of, configured to, or operable to support a means for transmitting the feedback according to the codebook size in the first time subslot in response to the DCI message, where the codebook size of the feedback is based on a quantity of the set of one or more PMOs that occur within at least the subset of the first set of multiple time slots.

Figure 21:
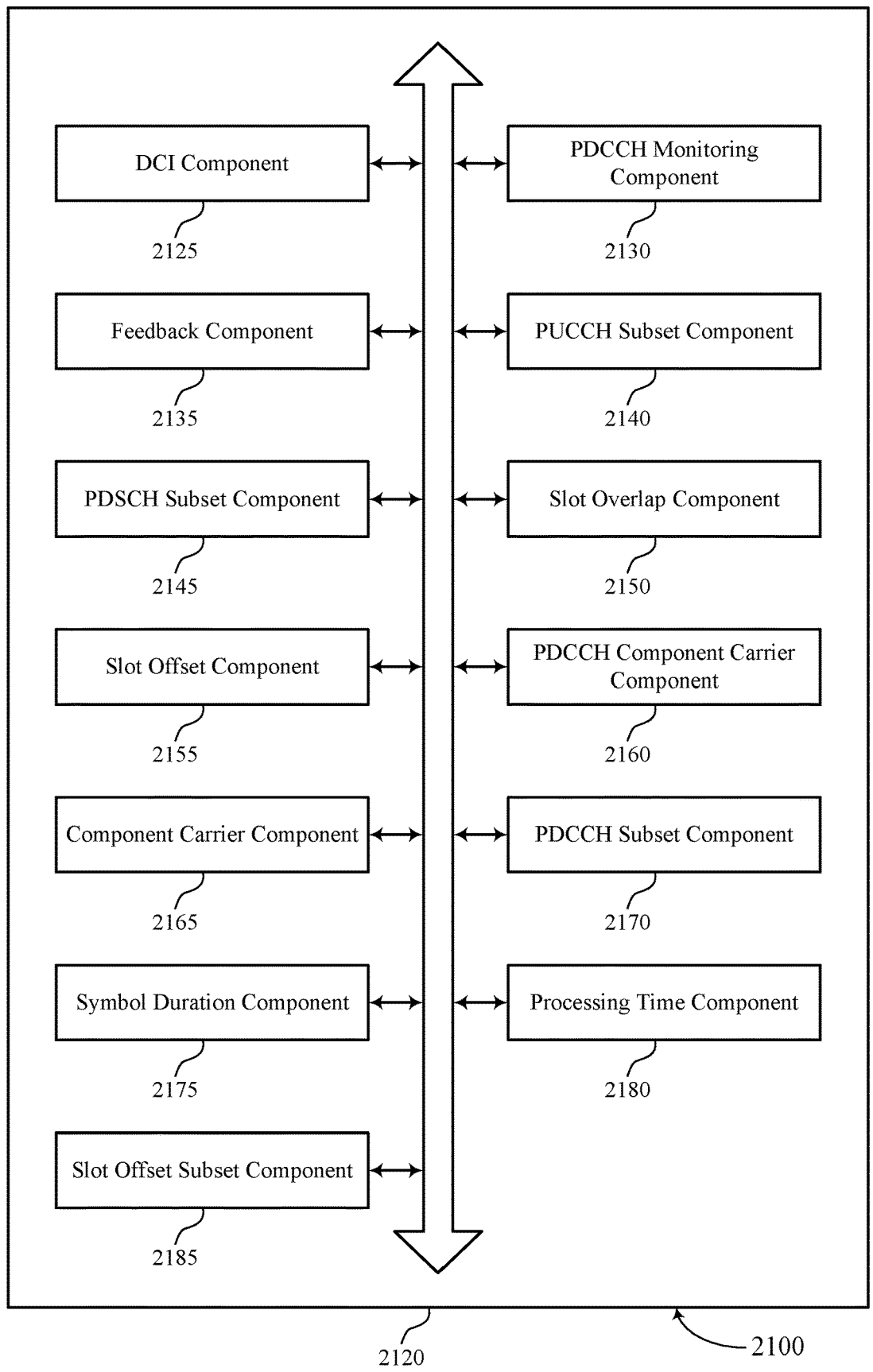
FIG. 21 shows a block diagram of a communications manager that supports control channel monitoring occasions for different numerologies and sub-slot-based control channels in accordance with one or more aspects of the present disclosure.

FIG. 21 shows a block diagram 2100 of a communications manager 2120 that supports control channel monitoring occasions for different numerologies and sub-slot-based control channels in accordance with one or more aspects of the present disclosure. The communications manager 2120 may be an example of aspects of a communications manager 1920, a communications manager 2020, or both, as described herein. The communications manager 2120, or various components thereof, may be an example of means for performing various aspects of control channel monitoring occasions for different numerologies and sub-slot-based control channels as described herein. For example, the communications manager 2120 may include a DCI component 2125, a PDCCH monitoring component 2130, a feedback component 2135, a PUCCH subset component 2140, an PDSCH subset component 2145, a slot overlap component 2150, a slot offset component 2155, a PDCCH component carrier component 2160, a component carrier component 2165, a PDCCH subset component 2170, a symbol duration component 2175, a processing time component 2180, a slot offset subset component 2185, or any combination thereof. Each of these components may communicate, directly or indirectly, with one another (e.g., via one or more buses).

The communications manager 2120 may support wireless communications at a UE in accordance with examples as disclosed herein. The DCI component 2125 is capable of, configured to, or operable to support a means for receiving, in a first time slot, a DCI message indicating a second time slot for the UE to transmit feedback according to a codebook size, where the feedback is to be transmitted in a PUCCH associated with a PDSCH scheduled by a PDCCH, and where corresponding SCSs for at least two of the PUCCH, the PDSCH, and the PDCCH are different. The PDCCH monitoring component 2130 is capable of, configured to, or operable to support a means for monitoring a set of one or more PMOs within at least a subset of a first set of multiple time slots that occur before the second time slot based on a mapping between the PUCCH, the PDSCH, and the PDCCH in accordance with a corresponding SCS. The feedback component 2135 is capable of, configured to, or operable to support a means for transmitting the feedback according to the codebook size in the second time slot in response to the DCI message, where the codebook size of the feedback is based on a quantity of the set of one or more PMOs that occur within at least the subset of the first set of multiple time slots.

In some examples, the PUCCH subset component 2140 is capable of, configured to, or operable to support a means for determining a second set of multiple time slots associated with the PUCCH based on a first set of slot offset values, where the second set of multiple time slots occur before the second time slot. In some examples, the PDSCH subset component 2145 is capable of, configured to, or operable to support a means for determining a third set of multiple time slots associated with the PDSCH based on the mapping between the PUCCH and the PDSCH in accordance with the corresponding SCS. In some examples, the slot overlap component 2150 is capable of, configured to, or operable to support a means for selecting a subset of the third set of multiple time slots based on the subset of the third set of multiple time slots overlapping with one or more of the second set of multiple time slots.

In some examples, to support monitoring the set of one or more PMOs, the PDCCH subset component 2170 is capable of, configured to, or operable to support a means for determining the first set of multiple time slots associated with the PDCCH based on a second set of slot offset values associated with the PDSCH. In some examples, to support monitoring the set of one or more PMOs, the slot overlap component 2150 is capable of, configured to, or operable to support a means for selecting at least the subset of the first set of multiple time slots based on at least the subset of the first set of multiple time slots overlapping with one or more of the subset of the third set of multiple time slots.

In some examples, the symbol duration component 2175 is capable of, configured to, or operable to support a means for selecting at least a subset of the set of one or more PMOs based on a last symbol of at least the subset of the set of one or more PMOs and a first symbol of the third set of multiple time slots associated with the PDSCH being separated by a threshold quantity of symbols.

In some examples, an SCS associated with the PDCCH is less than an SCS associated with the PDSCH.

In some examples, the symbol duration component 2175 is capable of, configured to, or operable to support a means for selecting at least the subset of the set of one or more PMOs on a last symbol of at least the subset of the set of one or more PMOs and a second to last symbol of the third set of multiple time slots associated with the PDSCH being separated by a threshold quantity of symbols.

In some examples, an SCS associated with the PDCCH is greater than an SCS associated with the PDSCH.

In some examples, the PUCCH subset component 2140 is capable of, configured to, or operable to support a means for determining a second set of multiple time slots associated with the PUCCH based on a set of slot offset values, where the second set of multiple time slots occur before the second time slot. In some examples, the slot overlap component 2150 is capable of, configured to, or operable to support a means for selecting at least the subset of the first set of multiple time slots based on at least the subset of the first set of multiple time slots overlapping with one or more of the second set of multiple time slots in accordance with the corresponding SCS.

In some examples, the slot offset component 2155 is capable of, configured to, or operable to support a means for receiving an indication of a set of multiple slot offset values, where the first set of one or more PMOs within at least the subset of the set of multiple time slots that occur before the second time slot is based on the set of multiple slot offset values.

In some examples, the PDCCH component carrier component 2160 is capable of, configured to, or operable to support a means for monitoring, via a first component carrier, the set of one or more PMOs within at least the subset of the first set of multiple time slots. In some examples, the component carrier component 2165 is capable of, configured to, or operable to support a means for monitoring the PDSCH via a second component carrier and transmitting the PUCCH via a third component carrier.

In some examples, at least two of the first component carrier, the second component carrier, and the third component carrier are associated with different SCSs.

In some examples, each entry of the feedback corresponds to a respective PMO of the first set of one or more PMOs.

Additionally, or alternatively, the communications manager 2120 may support wireless communications at a UE in accordance with examples as disclosed herein. In some examples, the DCI component 2125 is capable of, configured to, or operable to support a means for receiving, in a first time slot, a DCI message indicating a first time subslot for the UE to transmit feedback according to a codebook size, where the feedback is to be transmitted in a PUCCH associated with a PDSCH scheduled by a PDCCH, and where the PUCCH is scheduled as time subslots. In some examples, the PDCCH monitoring component 2130 is capable of, configured to, or operable to support a means for monitoring a set of one or more PMOs within at least a subset of a first set of multiple time slots that occur before the first time subslot based on a mapping between the PUCCH, the PDSCH, and the PDCCH in accordance with the PUCCH being scheduled as time subslots. In some examples, the feedback component 2135 is capable of, configured to, or operable to support a means for transmitting the feedback according to the codebook size in the first time subslot in response to the DCI message, where the codebook size of the feedback is based on a quantity of the set of one or more PMOs that occur within at least the subset of the first set of multiple time slots.

In some examples, the PUCCH subset component 2140 is capable of, configured to, or operable to support a means for determining a first set of multiple time subslots associated with the PUCCH based on a set of subslot offset values, where the first set of multiple time subslots occur before the first time subslot. In some examples, the PDSCH subset component 2145 is capable of, configured to, or operable to support a means for determining a second set of multiple time slots associated with the PDSCH based on the mapping between the PUCCH and the PDSCH in accordance with the PUCCH being scheduled as time subslots. In some examples, the slot overlap component 2150 is capable of, configured to, or operable to support a means for selecting a subset of the second set of multiple time slots based on the subset of the second set of multiple time slots overlapping with one or more of the first set of multiple time subslots.

In some examples, to support monitoring the set of one or more PMOs, the PDCCH subset component 2170 is capable of, configured to, or operable to support a means for determining the first set of multiple time slots associated with the PDCCH based on a set of slot offset values. In some examples, to support monitoring the set of one or more PMOs, the slot overlap component 2150 is capable of, configured to, or operable to support a means for selecting at least the subset of the first set of multiple time slots based on at least the subset of the first set of multiple time slots overlapping with one or more of the subset of the second set of multiple time slots.

In some examples, the slot offset component 2155 is capable of, configured to, or operable to support a means for receiving, via a control message, an indication of the set of slot offset values. In some examples, the slot offset subset component 2185 is capable of, configured to, or operable to support a means for selecting a subset of the set of slot offset values to determine the first set of multiple time subslots.

In some examples, the processing time component 2180 is capable of, configured to, or operable to support a means for selecting at least the subset of the set of one or more PMOs based on a last symbol of at least the subset of the set of one or more PMOs and a last symbol of the first set of multiple time subslots associated with the physical uplink channel being separated by a threshold processing time.

In some examples, the processing time component 2180 is capable of, configured to, or operable to support a means for selecting at least the subset of the set of one or more PMOs based on a last symbol of at least the subset of the second set of multiple time slots and a last symbol of the first set of multiple time subslots associated with the physical uplink channel being separated by a threshold processing time.

In some examples, the slot overlap component 2150 is capable of, configured to, or operable to support a means for selecting at least the subset of the first set of multiple time slots based on a last symbol of at least one candidate start and length indicator of a slot of the second set of multiple time slots overlaps with a corresponding subslot of the first set of multiple time subslots associated with the physical uplink channel.

In some examples, the PUCCH subset component 2140 is capable of, configured to, or operable to support a means for determining a first set of multiple time subslots associated with the PUCCH based on a set of subslot offset values, where the first set of multiple time slots occur before the first time subslot. In some examples, the slot overlap component 2150 is capable of, configured to, or operable to support a means for selecting at least the subset of the first set of multiple time slots based on at least the subset of the first set of multiple time slots overlapping with one or more of the subset of the first set of multiple time subslots.

In some examples, the selecting is based on a last symbol of a PMO of the one or more PMOs overlapping with a corresponding time subslot of the first set of multiple time subslots.

In some examples, the slot offset component 2155 is capable of, configured to, or operable to support a means for receiving an indication of a set of multiple slot offset values, where the first set of one or more PMOs within at least the subset of the set of multiple time slots that occur before the time subslot is based on the set of multiple slot offset values.

In some examples, the PDCCH component carrier component 2160 is capable of, configured to, or operable to support a means for monitoring, via a first component carrier, the set of one or more PMOs within at least the subset of the first set of multiple time slots. In some examples, the component carrier component 2165 is capable of, configured to, or operable to support a means for monitoring the PDSCH via a second component carrier and transmitting the PUCCH via a third component carrier.

In some examples, the first component carrier and the second component carrier are same or different.

In some examples, each entry of the feedback corresponds to a respective PMO of the first set of one or more PMOs.

Figure 22:
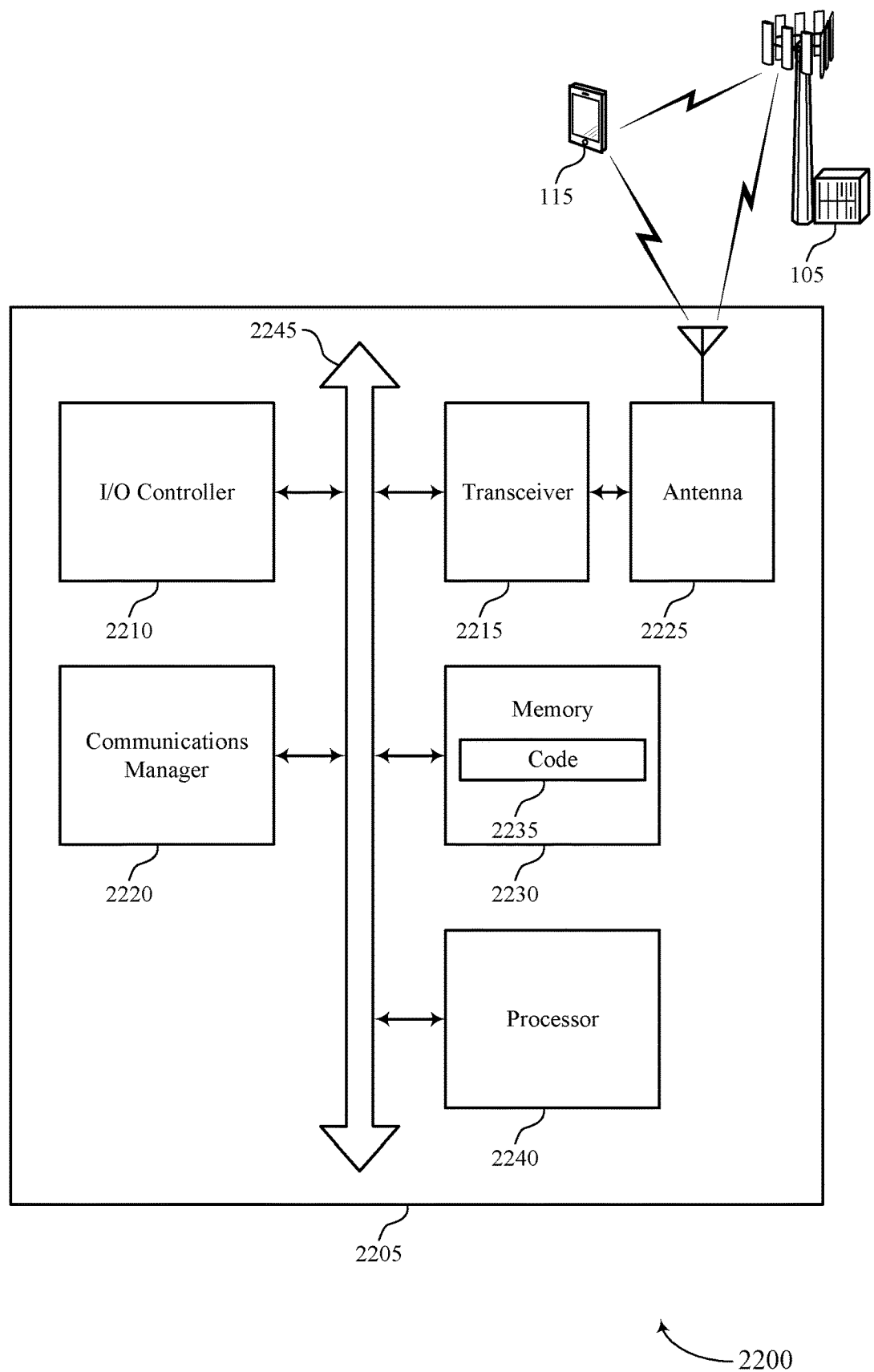
FIG. 22 shows a diagram of a system including a device that supports control channel monitoring occasions for different numerologies and sub-slot-based control channels in accordance with one or more aspects of the present disclosure.

FIG. 22 shows a diagram of a system 2200 including a device 2205 that supports control channel monitoring occasions for different numerologies and sub-slot-based control channels in accordance with one or more aspects of the present disclosure. The device 2205 may be an example of or include the components of a device 1905, a device 2005, or a UE 115 as described herein. The device 2205 may communicate (e.g., wirelessly) with one or more network entities 105, one or more UEs 115, or any combination thereof. The device 2205 may include components for bi-directional voice and data communications including components for transmitting and receiving communications, such as a communications manager 2220, an input/output (I/O) controller 2210, a transceiver 2215, an antenna 2225, a memory 2230, code 2235, and a processor 2240. These components may be in electronic communication or otherwise coupled (e.g., operatively, communicatively, functionally, electronically, electrically) via one or more buses (e.g., a bus 2245).

The I/O controller 2210 may manage input and output signals for the device 2205. The I/O controller 2210 may also manage peripherals not integrated into the device 2205. In some cases, the I/O controller 2210 may represent a physical connection or port to an external peripheral. In some cases, the I/O controller 2210 may utilize an operating system such as iOS®, ANDROID®, MS-DOS®, MS-WINDOWS®, OS/2®, UNIX®, LINUX®, or another known operating system. Additionally or alternatively, the I/O controller 2210 may represent or interact with a modem, a keyboard, a mouse, a touchscreen, or a similar device. In some cases, the I/O controller 2210 may be implemented as part of a processor, such as the processor 2240. In some cases, a user may interact with the device 2205 via the I/O controller 2210 or via hardware components controlled by the I/O controller 2210.

In some cases, the device 2205 may include a single antenna 2225. However, in some other cases, the device 2205 may have more than one antenna 2225, which may be capable of concurrently transmitting or receiving multiple wireless transmissions. The transceiver 2215 may communicate bi-directionally, via the one or more antennas 2225, wired, or wireless links as described herein. For example, the transceiver 2215 may represent a wireless transceiver and may communicate bi-directionally with another wireless transceiver. The transceiver 2215 may also include a modem to modulate the packets, to provide the modulated packets to one or more antennas 2225 for transmission, and to demodulate packets received from the one or more antennas 2225. The transceiver 2215, or the transceiver 2215 and one or more antennas 2225, may be an example of a transmitter 1915, a transmitter 2015, a receiver 1910, a receiver 2010, or any combination thereof or component thereof, as described herein.

The memory 2230 may include random access memory (RAM) and read-only memory (ROM). The memory 2230 may store computer-readable, computer-executable code 2235 including instructions that, when executed by the processor 2240, cause the device 2205 to perform various functions described herein. The code 2235 may be stored in a non-transitory computer-readable medium such as system memory or another type of memory. In some cases, the code 2235 may not be directly executable by the processor 2240 but may cause a computer (e.g., when compiled and executed) to perform functions described herein. In some cases, the memory 2230 may contain, among other things, a basic I/O system (BIOS) which may control basic hardware or software operation such as the interaction with peripheral components or devices.

The processor 2240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2240 may be configured to operate a memory array using a memory controller. In some other cases, a memory controller may be integrated into the processor 2240. The processor 2240 may be configured to execute computer-readable instructions stored in a memory (e.g., the memory 2230) to cause the device 2205 to perform various functions (e.g., functions or tasks supporting control channel monitoring occasions for different numerologies and sub-slot-based control channels). For example, the device 2205 or a component of the device 2205 may include a processor 2240 and memory 2230 coupled with or to the processor 2240, the processor 2240 and memory 2230 configured to perform various functions described herein.

The communications manager 2220 may support wireless communications at a UE in accordance with examples as disclosed herein. For example, the communications manager 2220 is capable of, configured to, or operable to support a means for receiving, in a first time slot, a DCI message indicating a second time slot for the UE to transmit feedback according to a codebook size, where the feedback is to be transmitted in a PUCCH associated with a PDSCH scheduled by a PDCCH, and where corresponding SCSs for at least two of the PUCCH, the PDSCH, and the PDCCH are different. The communications manager 2220 is capable of, configured to, or operable to support a means for monitoring a set of one or more PMOs within at least a subset of a first set of multiple time slots that occur before the second time slot based on a mapping between the PUCCH, the PDSCH, and the PDCCH in accordance with a corresponding SCS. The communications manager 2220 is capable of, configured to, or operable to support a means for transmitting the feedback according to the codebook size in the second time slot in response to the DCI message, where the codebook size of the feedback is based on a quantity of the set of one or more PMOs that occur within at least the subset of the first set of multiple time slots.

Additionally, or alternatively, the communications manager 2220 may support wireless communications at a UE in accordance with examples as disclosed herein. For example, the communications manager 2220 is capable of, configured to, or operable to support a means for receiving, in a first time slot, a DCI message indicating a first time subslot for the UE to transmit feedback according to a codebook size, where the feedback is to be transmitted in a PUCCH associated with a PDSCH scheduled by a PDCCH, and where the PUCCH is scheduled as time subslots. The communications manager 2220 is capable of, configured to, or operable to support a means for monitoring a set of one or more PMOs within at least a subset of a first set of multiple time slots that occur before the first time subslot based on a mapping between the PUCCH, the PDSCH, and the PDCCH in accordance with the PUCCH being scheduled as time subslots. The communications manager 2220 is capable of, configured to, or operable to support a means for transmitting the feedback according to the codebook size in the first time subslot in response to the DCI message, where the codebook size of the feedback is based on a quantity of the set of one or more PMOs that occur within at least the subset of the first set of multiple time slots.

By including or configuring the communications manager 2220 in accordance with examples as described herein, the device 2205 may support techniques for more efficient utilization of communication resources and improved utilization of processing capability.

In some examples, the communications manager 2220 may be configured to perform various operations (e.g., receiving, monitoring, transmitting) using or otherwise in cooperation with the transceiver 2215, the one or more antennas 2225, or any combination thereof. Although the communications manager 2220 is illustrated as a separate component, in some examples, one or more functions described with reference to the communications manager 2220 may be supported by or performed by the processor 2240, the memory 2230, the code 2235, or any combination thereof. For example, the code 2235 may include instructions executable by the processor 2240 to cause the device 2205 to perform various aspects of control channel monitoring occasions for different numerologies and sub-slot-based control channels as described herein, or the processor 2240 and the memory 2230 may be otherwise configured to perform or support such operations.

Figure 23:
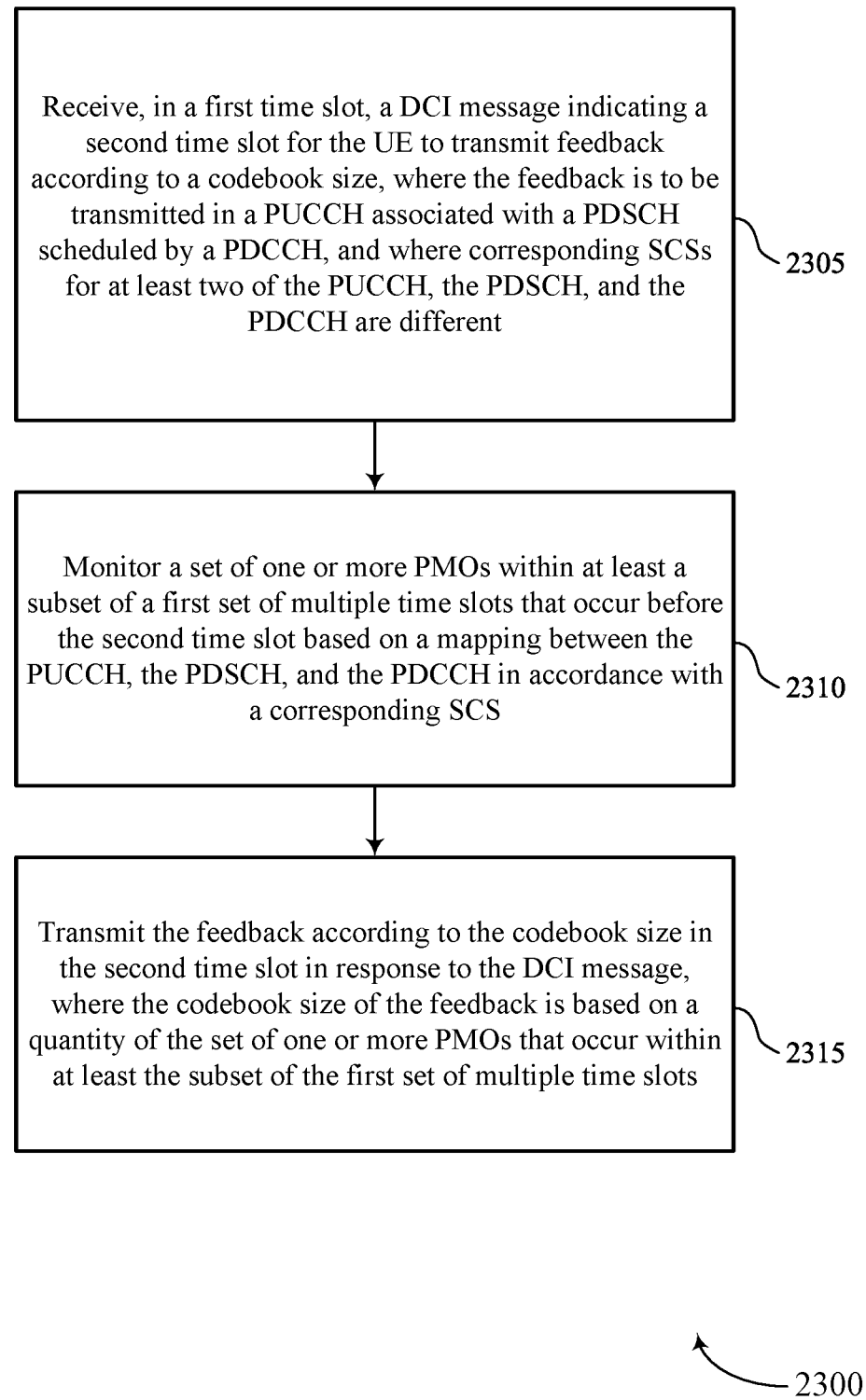
FIGS. 23 through 26 show flowcharts illustrating methods that support control channel monitoring occasions for different numerologies and sub-slot-based control channels in accordance with one or more aspects of the present disclosure.

FIG. 23 shows a flowchart illustrating a method 2300 that supports control channel monitoring occasions for different numerologies and sub-slot-based control channels in accordance with aspects of the present disclosure. The operations of the method 2300 may be implemented by a UE or its components as described herein. For example, the operations of the method 2300 may be performed by a UE 115 as described with reference to FIGS. 1 through 22. In some examples, a UE may execute a set of instructions to control the functional elements of the UE to perform the described functions. Additionally, or alternatively, the UE may perform aspects of the described functions using special-purpose hardware.

At 2305, the method may include receiving, in a first time slot, a DCI message indicating a second time slot for the UE to transmit feedback according to a codebook size, where the feedback is to be transmitted in a PUCCH associated with a PDSCH scheduled by a PDCCH, and where corresponding SCSs for at least two of the PUCCH, the PDSCH, and the PDCCH are different. The operations of 2305 may be performed in accordance with examples as disclosed herein. In some examples, aspects of the operations of 2305 may be performed by a DCI component 2125 as described with reference to FIG. 21.

At 2310, the method may include monitoring a set of one or more PMOs within at least a subset of a first set of multiple time slots that occur before the second time slot based on a mapping between the PUCCH, the PDSCH, and the PDCCH in accordance with a corresponding SCS. The operations of 2310 may be performed in accordance with examples as disclosed herein. In some examples, aspects of the operations of 2310 may be performed by a PDCCH monitoring component 2130 as described with reference to FIG. 21.

At 2315, the method may include transmitting the feedback according to the codebook size in the second time slot in response to the DCI message, where the codebook size of the feedback is based on a quantity of the set of one or more PMOs that occur within at least the subset of the first set of multiple time slots. The operations of 2315 may be performed in accordance with examples as disclosed herein. In some examples, aspects of the operations of 2315 may be performed by a feedback component 2135 as described with reference to FIG. 21.

Figure 24:
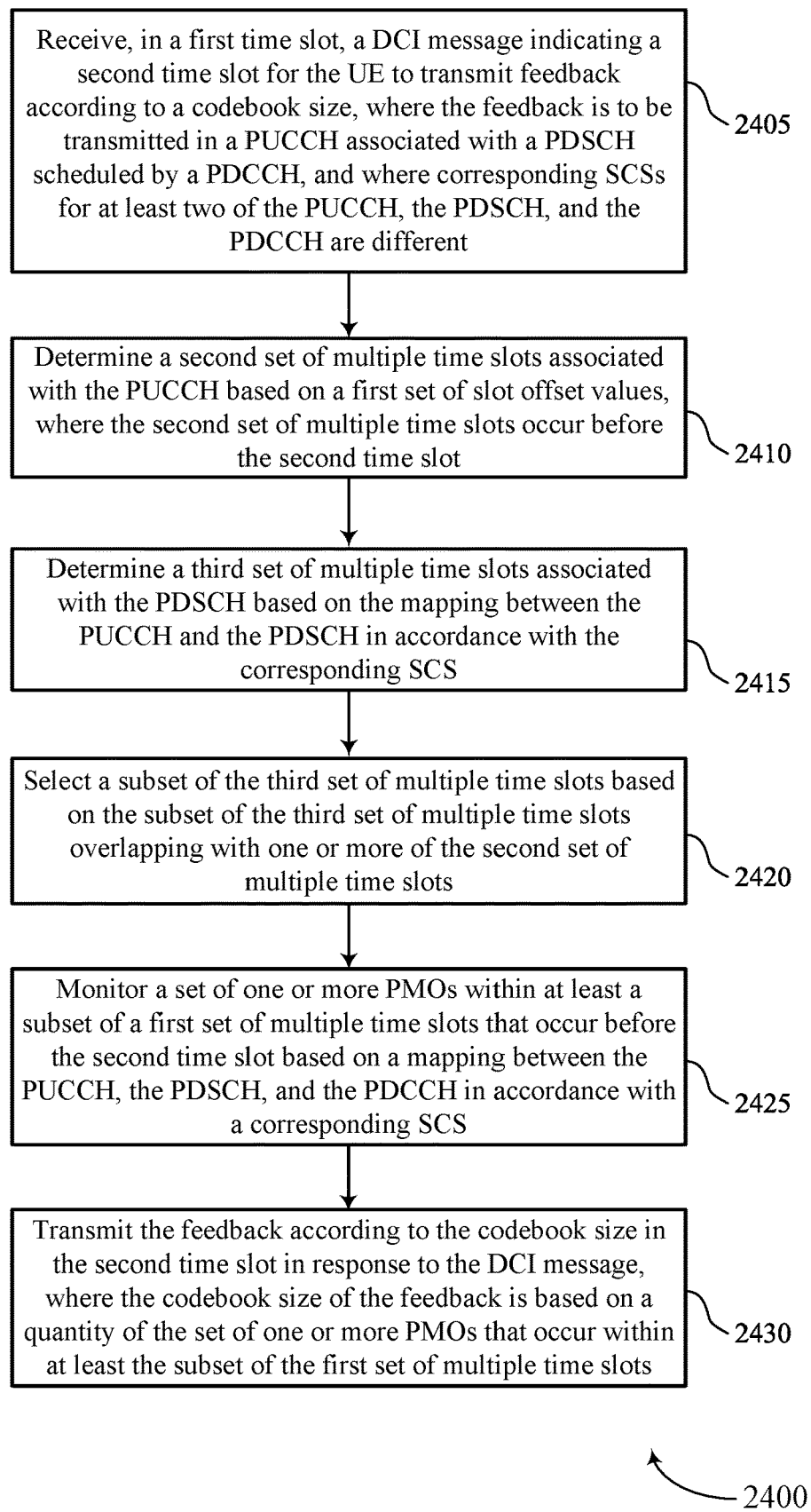

FIG. 24 shows a flowchart illustrating a method 2400 that supports control channel monitoring occasions for different numerologies and sub-slot-based control channels in accordance with aspects of the present disclosure. The operations of the method 2400 may be implemented by a UE or its components as described herein. For example, the operations of the method 2400 may be performed by a UE 115 as described with reference to FIGS. 1 through 22. In some examples, a UE may execute a set of instructions to control the functional elements of the UE to perform the described functions. Additionally, or alternatively, the UE may perform aspects of the described functions using special-purpose hardware.

At 2405, the method may include receiving, in a first time slot, a DCI message indicating a second time slot for the UE to transmit feedback according to a codebook size, where the feedback is to be transmitted in a PUCCH associated with a PDSCH scheduled by a PDCCH, and where corresponding SCSs for at least two of the PUCCH, the PDSCH, and the PDCCH are different. The operations of 2405 may be performed in accordance with examples as disclosed herein. In some examples, aspects of the operations of 2405 may be performed by a DCI component 2125 as described with reference to FIG. 21.

At 2410, the method may include determining a second set of multiple time slots associated with the PUCCH based on a first set of slot offset values, where the second set of multiple time slots occur before the second time slot. The operations of 2410 may be performed in accordance with examples as disclosed herein. In some examples, aspects of the operations of 2410 may be performed by a PUCCH subset component 2140 as described with reference to FIG. 21.

At 2415, the method may include determining a third set of multiple time slots associated with the PDSCH based on the mapping between the PUCCH and the PDSCH in accordance with the corresponding SCS. The operations of 2415 may be performed in accordance with examples as disclosed herein. In some examples, aspects of the operations of 2415 may be performed by an PDSCH subset component 2145 as described with reference to FIG. 21.

At 2420, the method may include selecting a subset of the third set of multiple time slots based on the subset of the third set of multiple time slots overlapping with one or more of the second set of multiple time slots. The operations of 2420 may be performed in accordance with examples as disclosed herein. In some examples, aspects of the operations of 2420 may be performed by a slot overlap component 2150 as described with reference to FIG. 21.

At 2425, the method may include monitoring a set of one or more PMOs within at least a subset of a first set of multiple time slots that occur before the second time slot based on a mapping between the PUCCH, the PDSCH, and the PDCCH in accordance with a corresponding SCS. The operations of 2425 may be performed in accordance with examples as disclosed herein. In some examples, aspects of the operations of 2425 may be performed by a PDCCH monitoring component 2130 as described with reference to FIG. 21.

At 2430, the method may include transmitting the feedback according to the codebook size in the second time slot in response to the DCI message, where the codebook size of the feedback is based on a quantity of the set of one or more PMOs that occur within at least the subset of the first set of multiple time slots. The operations of 2430 may be performed in accordance with examples as disclosed herein. In some examples, aspects of the operations of 2430 may be performed by a feedback component 2135 as described with reference to FIG. 21.

Figure 25:
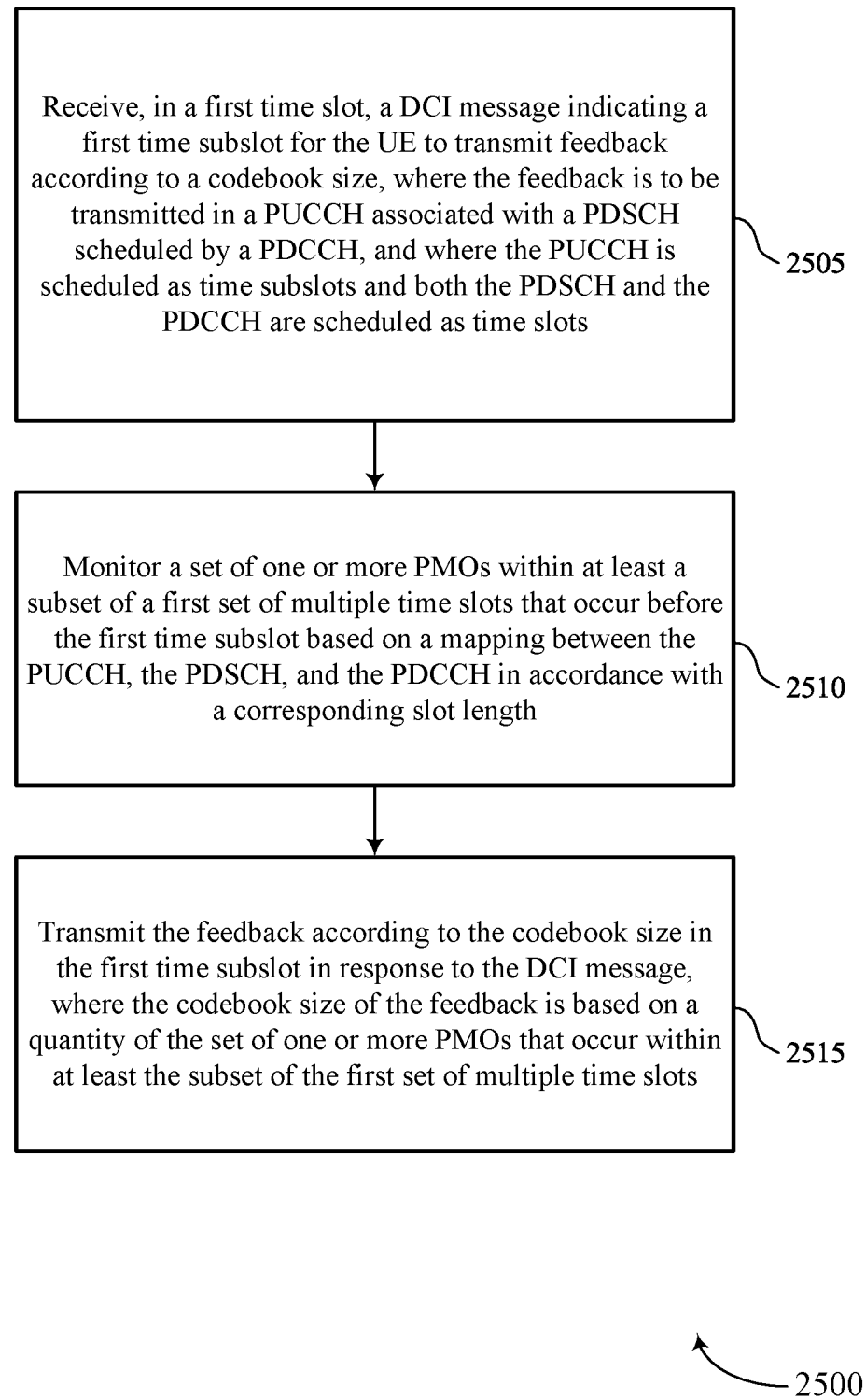

FIG. 25 shows a flowchart illustrating a method 2500 that supports control channel monitoring occasions for different numerologies and sub-slot-based control channels in accordance with aspects of the present disclosure. The operations of the method 2500 may be implemented by a UE or its components as described herein. For example, the operations of the method 2500 may be performed by a UE 115 as described with reference to FIGS. 1 through 22. In some examples, a UE may execute a set of instructions to control the functional elements of the UE to perform the described functions. Additionally, or alternatively, the UE may perform aspects of the described functions using special-purpose hardware.

At 2505, the method may include receiving, in a first time slot, a DCI message indicating a first time subslot for the UE to transmit feedback according to a codebook size, where the feedback is to be transmitted in a PUCCH associated with a PDSCH scheduled by a PDCCH, and where the PUCCH is scheduled as time subslots. The operations of 2505 may be performed in accordance with examples as disclosed herein. In some examples, aspects of the operations of 2505 may be performed by a DCI component 2125 as described with reference to FIG. 21.

At 2510, the method may include monitoring a set of one or more PMOs within at least a subset of a first set of multiple time slots that occur before the first time subslot based on a mapping between the PUCCH, the PDSCH, and the PDCCH in accordance with the PUCCH being scheduled as time subslots. The operations of 2510 may be performed in accordance with examples as disclosed herein. In some examples, aspects of the operations of 2510 may be performed by a PDCCH monitoring component 2130 as described with reference to FIG. 21.

At 2515, the method may include transmitting the feedback according to the codebook size in the first time subslot in response to the DCI message, where the codebook size of the feedback is based on a quantity of the set of one or more PMOs that occur within at least the subset of the first set of multiple time slots. The operations of 2515 may be performed in accordance with examples as disclosed herein. In some examples, aspects of the operations of 2515 may be performed by a feedback component 2135 as described with reference to FIG. 21.

Figure 26:
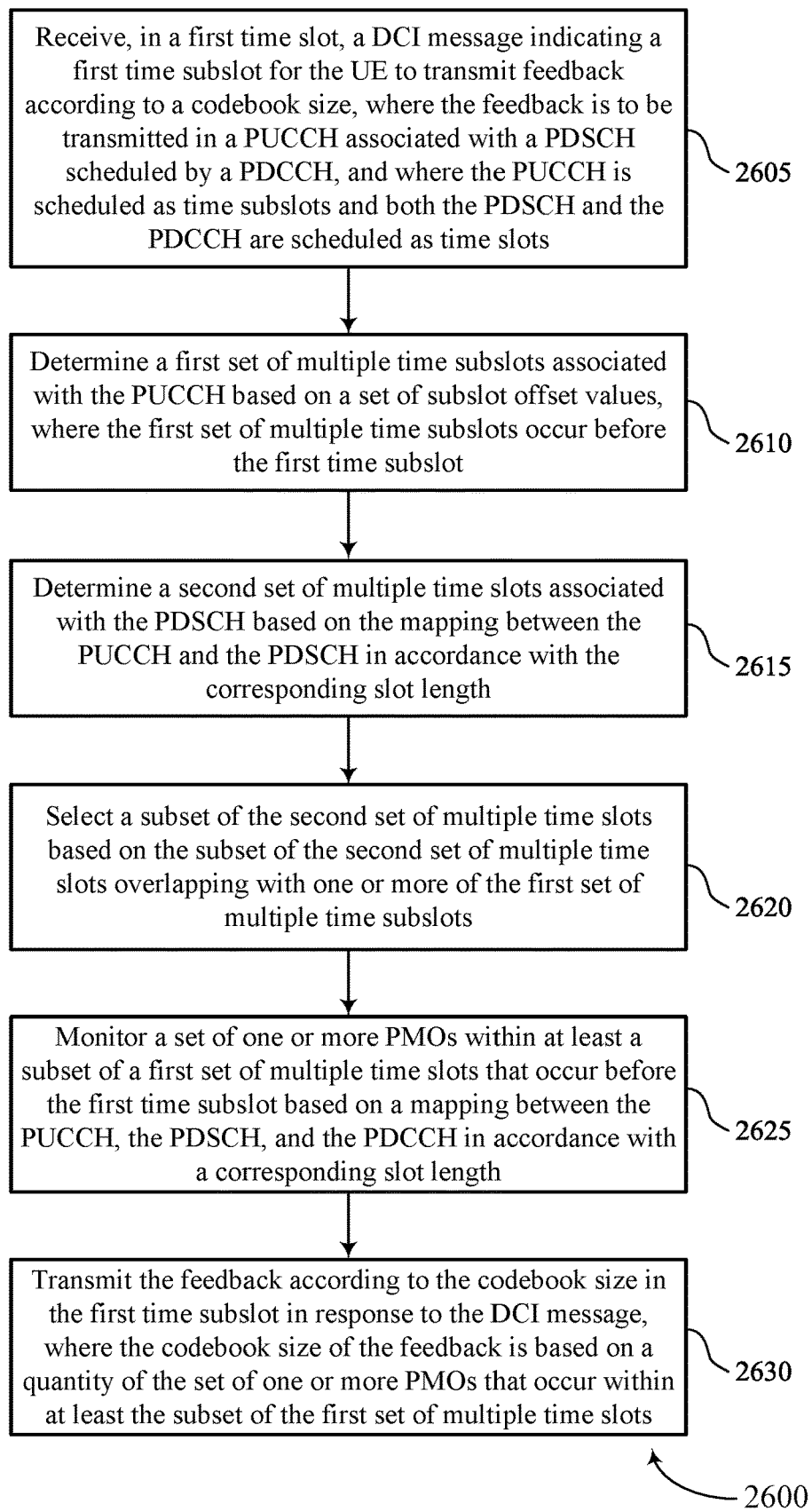

FIG. 26 shows a flowchart illustrating a method 2600 that supports control channel monitoring occasions for different numerologies and sub-slot-based control channels in accordance with aspects of the present disclosure. The operations of the method 2600 may be implemented by a UE or its components as described herein. For example, the operations of the method 2600 may be performed by a UE 115 as described with reference to FIGS. 1 through 22. In some examples, a UE may execute a set of instructions to control the functional elements of the UE to perform the described functions. Additionally, or alternatively, the UE may perform aspects of the described functions using special-purpose hardware.

At 2605, the method may include receiving, in a first time slot, a DCI message indicating a first time subslot for the UE to transmit feedback according to a codebook size, where the feedback is to be transmitted in a PUCCH associated with a PDSCH scheduled by a PDCCH, and where the PUCCH is scheduled as time subslots. The operations of 2605 may be performed in accordance with examples as disclosed herein. In some examples, aspects of the operations of 2605 may be performed by a DCI component 2125 as described with reference to FIG. 21.

At 2610, the method may include determining a first set of multiple time subslots associated with the PUCCH based on a set of subslot offset values, where the first set of multiple time subslots occur before the first time subslot. The operations of 2610 may be performed in accordance with examples as disclosed herein. In some examples, aspects of the operations of 2610 may be performed by a PUCCH subset component 2140 as described with reference to FIG. 21.

At 2615, the method may include determining a second set of multiple time slots associated with the PDSCH based on the mapping between the PUCCH and the PDSCH in accordance with the PUCCH being scheduled as time subslots. The operations of 2615 may be performed in accordance with examples as disclosed herein. In some examples, aspects of the operations of 2615 may be performed by an PDSCH subset component 2145 as described with reference to FIG. 21.

At 2620, the method may include selecting a subset of the second set of multiple time slots based on the subset of the second set of multiple time slots overlapping with one or more of the first set of multiple time subslots. The operations of 2620 may be performed in accordance with examples as disclosed herein. In some examples, aspects of the operations of 2620 may be performed by a slot overlap component 2150 as described with reference to FIG. 21.

At 2625, the method may include monitoring a set of one or more PMOs within at least a subset of a first set of multiple time slots that occur before the first time subslot based on a mapping between the PUCCH, the PDSCH, and the PDCCH in accordance with the PUCCH being scheduled as time subslots. The operations of 2625 may be performed in accordance with examples as disclosed herein. In some examples, aspects of the operations of 2625 may be performed by a PDCCH monitoring component 2130 as described with reference to FIG. 21.

At 2630, the method may include transmitting the feedback according to the codebook size in the first time subslot in response to the DCI message, where the codebook size of the feedback is based on a quantity of the set of one or more PMOs that occur within at least the subset of the first set of multiple time slots. The operations of 2630 may be performed in accordance with examples as disclosed herein. In some examples, aspects of the operations of 2630 may be performed by a feedback component 2135 as described with reference to FIG. 21.

The following provides an overview of aspects of the present disclosure:

Aspect 1: A method for wireless communications at a UE, comprising: receiving, in a first time slot, a DCI message indicating a second time slot for the UE to transmit feedback according to a codebook size, wherein the feedback is to be transmitted in a PUCCH associated with a PDSCH scheduled by a PDCCH, and wherein corresponding SCSs for at least two of the PUCCH, the PDSCH, and the PDCCH are different; monitoring a set of one or more PMOs within at least a subset of a first plurality of time slots that occur before the second time slot based at least in part on a mapping between the PUCCH, the PDSCH, and the PDCCH in accordance with a corresponding subcarrier spacing; and transmitting the feedback according to the codebook size in the second time slot in response to the DCI message, wherein the codebook size of the feedback is based at least in part on a quantity of the set of one or more PMOs that occur within at least the subset of the first plurality of time slots.

Aspect 2: The method of aspect 1, further comprising: determining a second plurality of time slots associated with the PUCCH based at least in part on a first set of slot offset values, wherein the second plurality of time slots occur before the second time slot; determining a third plurality of time slots associated with the PDSCH based at least in part on the mapping between the PUCCH and the PDSCH in accordance with the corresponding subcarrier spacing; and selecting a subset of the third plurality of time slots based at least in part on the subset of the third plurality of time slots overlapping with one or more of the second plurality of time slots.

Aspect 3: The method of aspect 2, wherein monitoring the set of one or more PMOs comprises: determining the first plurality of time slots associated with the PDCCH based at least in part on a second set of slot offset values associated with the PDSCH; and selecting at least the subset of the first plurality of time slots based at least in part on at least the subset of the first plurality of time slots overlapping with one or more of the subset of the third plurality of time slots.

Aspect 4: The method of any of aspects 2 through 3, further comprising: selecting at least a subset of the set of one or more PMOs based at least in part on a last symbol of at least the subset of set of one or more PMOs and a first symbol of the third plurality of time slots associated with the PDSCH being separated by a threshold quantity of symbols.

Aspect 5: The method of aspect 4, wherein a subcarrier spacing associated with the PDCCH is less than a subcarrier spacing associated with the PDSCH.

Aspect 6: The method of any of aspects 2 through 5, further comprising: selecting at least a subset of the set of one or more PMOs based at least in part on a last symbol of at least the subset of the set of one or more PMOs and a second to last symbol of the third plurality of time slots associated with the PDSCH being separated by a threshold quantity of symbols.

Aspect 7: The method of aspect 6, wherein a subcarrier spacing associated with the PDCCH is greater than a subcarrier spacing associated with the PDSCH.

Aspect 8: The method of any of aspects 1 through 7, further comprising: determining a second plurality of time slots associated with the PUCCH based at least in part on a set of slot offset values, wherein the second plurality of time slots occur before the second time slot; and selecting at least the subset of the first plurality of time slots based at least in part on the subset of the first plurality of time slots overlapping with one or more of the second plurality of time slots in accordance with the corresponding subcarrier spacing.

Aspect 9: The method of any of aspects 1 through 8, further comprising: receiving an indication of a plurality of slot offset values, wherein the first set of one or more PMOs within at least the subset of the plurality of time slots that occur before the second time slot is based at least in part on the plurality of slot offset values.

Aspect 10: The method of any of aspects 1 through 9, further comprising: monitoring, via a first component carrier, the set of one or more PMOs within at least the subset of the first plurality of time slots; and monitoring the PDSCH via a second component carrier and transmitting the PUCCH via a third component carrier.

Aspect 11: The method of aspect 10, wherein at least two of the first component carrier, the second component carrier, and the third component carrier are associated with different SCSs.

Aspect 12: The method of any of aspects 1 through 11, wherein each entry of the feedback corresponds to a respective PMO of the first set of one or more PMOs.

Aspect 13: A method for wireless communications at a UE, comprising: receiving, in a first time slot, a DCI message indicating a first time subslot for the UE to transmit feedback according to a codebook size, wherein the feedback is to be transmitted in a PUCCH associated with a PDSCH scheduled by a PDCCH, and wherein the PUCCH is scheduled as time subslots; monitoring a set of one or more PMOs within at least a subset of a first plurality of time slots that occur before the first time subslot based at least in part on a mapping between the PUCCH, the PDSCH, and the PDCCH in accordance with the PUCCH being scheduled as time subslots; and transmitting the feedback according to the codebook size in the first time subslot in response to the DCI message, wherein the codebook size of the feedback is based at least in part on a quantity of the set of one or more PMOs that occur within at least the subset of the first plurality of time slots.

Aspect 14: The method of aspect 13, further comprising: determining a first plurality of time subslots associated with the PUCCH based at least in part on a set of subslot offset values, wherein the first plurality of time subslots occur before the first time subslot; determining a second plurality of time slots associated with the PDSCH based at least in part on the mapping between the PUCCH and the PDSCH in accordance with the PUCCH being scheduled as time subslots; and selecting a subset of the second plurality of time slots based at least in part on the subset of the second plurality of time slots overlapping with one or more of the first plurality of time subslots.

Aspect 15: The method of aspect 14, wherein monitoring the set of one or more PMOs comprises: determining a first plurality of time slots associated with the PDCCH based at least in part on a set of slot offset values; and selecting at least the subset of the first plurality of time slots based at least in part on at least the subset of the first plurality of time slots overlapping with one or more of the subset of the second plurality of time slots.

Aspect 16: The method of aspect 15, further comprising: receiving, via a control message, an indication of the set of slot offset values; and selecting a subset of the set of slot offset values to determine the first plurality of time subslots.

Aspect 17: The method of any of aspects 14 through 16, further comprising: selecting at least the subset of the first plurality of time slots based at least in part on a last symbol of at least the set of one or more PDCCH monitoring occasions and a last symbol of a first time subslot associated with the physical uplink channel being separated by a threshold processing time.

Aspect 18: The method of any of aspects 14 through 17, further comprising: selecting at least the subset of the first plurality of time slots based at least in part on a last symbol of at least the subset of the second plurality of time slots and a last symbol of the first plurality of time subslots associated with the physical uplink channel being separated by a threshold processing time.

Aspect 19: The method of any of aspects 14 through 18, further comprising: selecting at least the subset of the first plurality of time slots based at least in part on a last symbol of at least one candidate start and length indicator of a slot of the second plurality of time slots overlaps with a corresponding subslot of the first plurality of time subslots associated with the physical uplink channel.

Aspect 20: The method of any of aspects 13 through 19, further comprising: determining a first plurality of time subslots associated with the PUCCH based at least in part on a set of subslot offset values, wherein the first plurality of time slots occur before the first time subslot; and selecting at least the subset of the first plurality of time slots based at least in part on at least the subset of the first plurality of time slots overlapping with one or more of the subset of the first plurality of time subslots.

Aspect 21: The method of aspect 20, wherein the selecting is based at least in part on a last symbol of a PMO of the one or more PMOs overlapping with a corresponding time subslot of the first plurality of time subslots.

Aspect 22: The method of any of aspects 13 through 21, further comprising: receiving an indication of a plurality of slot offset values, wherein the first set of one or more PMOs within at least the subset of the first plurality of time slots that occur before the time subslot is based at least in part on the plurality of slot offset values.

Aspect 23: The method of any of aspects 13 through 22, further comprising: monitoring, via a first component carrier, the set of one or more PMOs within at least the subset of the first plurality of time slots; and monitoring the PDSCH via a second component carrier and transmitting the PUCCH via a third component carrier.

Aspect 24: The method of aspect 23, wherein the first component carrier and the second component carrier are same or different.

Aspect 25: The method of any of aspects 13 through 24, wherein each entry of the feedback corresponds to a respective PMO of the first set of one or more PMOs.

Aspect 26: The method of any of aspects 13 through 25, wherein both the PDSCH and the PDCCH are scheduled as time slots.

Aspect 27: An apparatus for wireless communications at a UE, comprising a processor; memory coupled with the processor; and instructions stored in the memory and executable by the processor to cause the apparatus to perform a method of any of aspects 1 through 12.

Aspect 28: An apparatus for wireless communications at a UE, comprising at least one means for performing a method of any of aspects 1 through 12.

Aspect 29: A non-transitory computer-readable medium storing code for wireless communications at a UE, the code comprising instructions executable by a processor to perform a method of any of aspects 1 through 12.

Aspect 30: An apparatus for wireless communications at a UE, comprising a processor; memory coupled with the processor; and instructions stored in the memory and executable by the processor to cause the apparatus to perform a method of any of aspects 13 through 26.

Aspect 31: An apparatus for wireless communications at a UE, comprising at least one means for performing a method of any of aspects 13 through 26.

Aspect 32: A non-transitory computer-readable medium storing code for wireless communications at a UE, the code comprising instructions executable by a processor to perform a method of any of aspects 13 through 26. It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   a processor;
   memory coupled with the processor; and
   instructions stored in the memory and executable by the
      processor to cause the apparatus to:

receive, in a first time slot, a downlink control information message indicating a second time slot for the UE to transmit feedback according to a codebook size, wherein the feedback is to be transmitted in a physical uplink control channel associated with a physical downlink shared channel scheduled by a physical downlink control channel, and wherein corresponding subcarrier spacings for at least two of the physical uplink control channel, the physical downlink shared channel, and the physical downlink control channel are different;

monitor a set of one or more physical downlink control channel monitoring occasions within at least a subset of a first plurality of time slots that occur before the second time slot based at least in part on a mapping between the physical uplink control channel, the physical downlink shared channel, and the physical downlink control channel and based at least in part on the corresponding subcarrier spacings being different; and transmit the feedback according to the codebook size in the second time slot in response to the downlink control information message, wherein the codebook size of the feedback is based at least in part on a quantity of the set of one or more physical downlink control channel monitoring occasions that occur within at least the subset of the first plurality of time slots and is based at least in part on the corresponding subcarrier spacings being different.

2. The apparatus of claim 1, wherein the instructions are further executable by the processor to cause the apparatus to:
determine a second plurality of time slots associated with the physical uplink control channel based at least in part on a first set of slot offset values, wherein the second plurality of time slots occur before the second time slot;
determine a third plurality of time slots associated with the physical downlink shared channel based at least in part on the mapping between the physical uplink control channel and the physical downlink shared channel in accordance with the corresponding subcarrier spacings; and
select a subset of the third plurality of time slots based at least in part on the subset of the third plurality of time slots overlapping with one or more of the second plurality of time slots.

3. The apparatus of claim 2, wherein the instructions to monitor the set of one or more physical downlink control channel monitoring occasions are executable by the processor to cause the apparatus to:
determine the first plurality of time slots associated with the physical downlink control channel based at least in part on a second set of slot offset values associated with the physical downlink shared channel; and
select at least the subset of the first plurality of time slots based at least in part on at least the subset of the first plurality of time slots overlapping with one or more of the subset of the third plurality of time slots.

4. The apparatus of claim 2, wherein the instructions are further executable by the processor to cause the apparatus to:
select at least a subset of the set of one or more physical downlink control channel monitoring occasions based at least in part on a last symbol of at least the subset of the set of one or more physical downlink control channel monitoring occasions and a first symbol of the third plurality of time slots associated with the physical downlink shared channel being separated by a threshold quantity of symbols.

5. The apparatus of claim 4, wherein a subcarrier spacing associated with the physical downlink control channel is less than a subcarrier spacing associated with the physical downlink shared channel.

6. The apparatus of claim 2, wherein the instructions are further executable by the processor to cause the apparatus to:
select at least a subset of the set of one or more physical downlink control channel monitoring occasions based at least in part on a last symbol of at least the subset of the set of one or more physical downlink control channel monitoring occasions and a second to last symbol of the third plurality of time slots associated with the physical downlink shared channel being separated by a threshold quantity of symbols.

7. The apparatus of claim 6, wherein a subcarrier spacing associated with the physical downlink control channel is greater than a subcarrier spacing associated with the physical downlink shared channel.

8. The apparatus of claim 1, wherein the instructions are further executable by the processor to cause the apparatus to:
determine a second plurality of time slots associated with the physical uplink control channel based at least in part on a set of slot offset values, wherein the second plurality of time slots occur before the second time slot; and
select at least the subset of the first plurality of time slots based at least in part on the subset of the first plurality of time slots overlapping with one or more of the second plurality of time slots in accordance with the corresponding subcarrier spacings.

9. The apparatus of claim 1, wherein the instructions are further executable by the processor to cause the apparatus to:
receive an indication of a plurality of slot offset values, wherein the set of one or more physical downlink control channel monitoring occasions within at least the subset of the first plurality of time slots that occur before the second time slot is based at least in part on the plurality of slot offset values.

10. The apparatus of claim 1, wherein the instructions are further executable by the processor to cause the apparatus to:
monitor, via a first component carrier, the set of one or more physical downlink control channel monitoring occasions within at least the subset of the first plurality of time slots; and
monitor the physical downlink shared channel via a second component carrier and transmitting the physical uplink control channel via a third component carrier.

11. The apparatus of claim 1, wherein each entry of the feedback corresponds to a respective physical downlink control channel monitoring occasion of the set of one or more physical downlink control channel monitoring occasions.

12. An apparatus for wireless communications at a user equipment (UE), comprising:
a processor;
memory coupled with the processor; and
instructions stored in the memory and executable by the processor to cause the apparatus to:
receive, in a first time slot, a downlink control information message indicating a first time subslot for the UE to transmit feedback according to a codebook size that is in accordance with a subslot-based uplink transmission configuration, wherein the feedback is to be transmitted in a physical uplink control channel associated with a physical downlink shared channel scheduled by a physical downlink control channel, and wherein the physical uplink control channel is scheduled as time subslots in accordance with the subslot-based uplink transmission configuration;

monitor a set of one or more physical downlink control channel monitoring occasions within at least a subset of a first plurality of time slots that occur before the first time subslot based at least in part on a mapping between the physical uplink control channel, the physical downlink shared channel, and the physical downlink control channel in accordance with the physical uplink control channel being scheduled as time subslots and in accordance with the subslot-based uplink transmission configuration; and transmit the feedback according to the codebook size in the first time subslot in response to the downlink control information message and in accordance with the subslot-based uplink transmission configuration, wherein the codebook size of the feedback is based at least in part on a quantity of the set of one or more physical downlink control channel monitoring occasions that occur within at least the subset of the first plurality of time slots.

13. The apparatus of claim 12, wherein the instructions are further executable by the processor to cause the apparatus to:

determine a first plurality of time subslots associated with the physical uplink control channel based at least in part on a set of subslot offset values, wherein the first plurality of time subslots occur before the first time subslot;

determine a second plurality of time slots associated with the physical downlink shared channel based at least in part on the mapping between the physical uplink control channel and the physical downlink shared channel in accordance with the physical uplink control channel being scheduled as time subslots; and select a subset of the second plurality of time slots based at least in part on the subset of the second plurality of time slots overlapping with one or more of the first plurality of time subslots.

14. The apparatus of claim 13, wherein the instructions to monitor the set of one or more physical downlink control channel monitoring occasions are executable by the processor to cause the apparatus to:

determine a first plurality of time slots associated with the physical downlink control channel based at least in part on a set of slot offset values; and select at least the subset of the first plurality of time slots based at least in part on at least the subset of the first plurality of time slots overlapping with one or more of the subset of the second plurality of time slots.

15. The apparatus of claim 14, wherein the instructions are further executable by the processor to cause the apparatus to:

receive, via a control message, an indication of the set of slot offset values; and select a subset of the set of slot offset values to determine the first plurality of time subslots.

16. The apparatus of claim 13, wherein the instructions are further executable by the processor to cause the apparatus to:

select at least the subset of the first plurality of time slots based at least in part on a last symbol of at least the set of one or more physical downlink control channel monitoring occasions and a last symbol of a first time subslot associated with the physical uplink control channel being separated by a threshold processing time.

17. The apparatus of claim 13, wherein the instructions are further executable by the processor to cause the apparatus to:

select at least the subset of the first plurality of time slots based at least in part on a last symbol of at least the subset of the second plurality of time slots and a last symbol of the first plurality of time subslots associated with the physical uplink control channel being separated by a threshold processing time.

18. The apparatus of claim 13, wherein the instructions are further executable by the processor to cause the apparatus to:

select at least the subset of the first plurality of time slots based at least in part on a last symbol of at least one candidate start and length indicator of a slot of the second plurality of time slots overlaps with a corresponding subslot of the first plurality of time subslots associated with the physical uplink control channel.

19. The apparatus of claim 12, wherein the instructions are further executable by the processor to cause the apparatus to:

determine a first plurality of time subslots associated with the physical uplink control channel based at least in part on a set of subslot offset values, wherein the first plurality of time slots occur before the first time subslot; and select at least the subset of the first plurality of time slots based at least in part on at least the subset of the first plurality of time slots overlapping with one or more of the subset of the first plurality of time subslots.

20. The apparatus of claim 19, wherein the selecting is based at least in part on a last symbol of a physical downlink control channel monitoring occasion of the set of one or more physical downlink control channel monitoring occasions overlapping with a corresponding time subslot of the first plurality of time subslots.

21. The apparatus of claim 12, wherein the instructions are further executable by the processor to cause the apparatus to:

receive an indication of a plurality of slot offset values, wherein the set of one or more physical downlink control channel monitoring occasions within at least the subset of the first plurality of time slots that occur before the first time subslot is based at least in part on the plurality of slot offset values.

22. The apparatus of claim 12, wherein the instructions are further executable by the processor to cause the apparatus to:

monitor, via a first component carrier, the set of one or more physical downlink control channel monitoring occasions within at least the subset of the first plurality of time slots; and monitor the physical downlink shared channel via a second component carrier and transmitting the physical uplink control channel via a third component carrier.

23. The apparatus of claim 22, wherein:

the first component carrier and the second component carrier are same or different.

24. The apparatus of claim 12, wherein each entry of the feedback corresponds to a respective physical downlink control channel monitoring occasion of the set of one or more physical downlink control channel monitoring occasions.

25. The apparatus of claim 12, wherein both the physical downlink shared channel and the physical downlink control channel are scheduled as time slots.

26. A method for wireless communications at a user equipment (UE), comprising:
- receiving, in a first time slot, a downlink control information message indicating a second time slot for the UE to transmit feedback according to a codebook size, wherein the feedback is to be transmitted in a physical uplink control channel associated with a physical downlink shared channel scheduled by a physical downlink control channel, and wherein corresponding subcarrier spacings for at least two of the physical uplink control channel, the physical downlink shared channel, and the physical downlink control channel are different;
- monitoring a set of one or more physical downlink control channel monitoring occasions within at least a subset of a first plurality of time slots that occur before the second time slot based at least in part on a mapping between the physical uplink control channel, the physical downlink shared channel, and the physical downlink control channel and based at least in part on the corresponding subcarrier spacings being different; and
- transmitting the feedback according to the codebook size in the second time slot in response to the downlink control information message, wherein the codebook size of the feedback is based at least in part on a quantity of the set of one or more physical downlink control channel monitoring occasions that occur within at least the subset of the first plurality of time slots and is based at least in part on the corresponding subcarrier spacings being different.

27. The method of claim 26, further comprising:
- determining a second plurality of time slots associated with the physical uplink control channel based at least in part on a first set of slot offset values, wherein the second plurality of time slots occur before the second time slot;
- determining a third plurality of time slots associated with the physical downlink shared channel based at least in part on the mapping between the physical uplink control channel and the physical downlink shared channel in accordance with the corresponding subcarrier spacings; and
- selecting a subset of the third plurality of time slots based at least in part on the subset of the third plurality of time slots overlapping with one or more of the second plurality of time slots.

28. A method for wireless communications at a user equipment (UE), comprising:
- receiving, in a first time slot, a downlink control information message indicating a first time subslot for the UE to transmit feedback according to a codebook size that is in accordance with a subslot-based uplink transmission configuration, wherein the feedback is to be transmitted in a physical uplink control channel associated with a physical downlink shared channel scheduled by a physical downlink control channel, and wherein the physical uplink control channel is scheduled as time subslots in accordance with the subslot-based uplink transmission configuration;
- monitoring a set of one or more physical downlink control channel monitoring occasions within at least a subset of a first plurality of time slots that occur before the first time subslot based at least in part on a mapping between the physical uplink control channel, the physical downlink shared channel, and the physical downlink control channel in accordance with the physical uplink control channel being scheduled as time subslots and in accordance with the subslot-based uplink transmission configuration; and
- transmitting the feedback according to the codebook size in the first time subslot in response to the downlink control information message and in accordance with the subslot-based uplink transmission configuration, wherein the codebook size of the feedback is based at least in part on a quantity of the set of one or more physical downlink control channel monitoring occasions that occur within at least the subset of the first plurality of time slots.

29. The method of claim 28, further comprising:
- determining a first plurality of time subslots associated with the physical uplink control channel based at least in part on a set of subslot offset values, wherein the first plurality of time subslots occur before the first time subslot;
- determining a second plurality of time slots associated with the physical downlink shared channel based at least in part on the mapping between the physical uplink control channel and the physical downlink shared channel in accordance with the physical uplink control channel being scheduled as time subslots; and
- selecting a subset of the second plurality of time slots based at least in part on the subset of the second plurality of time slots overlapping with one or more of the first plurality of time subslots.

\* \* \* \* \*